(12) United States Patent
Nishina

(10) Patent No.: US 6,718,132 B2
(45) Date of Patent: Apr. 6, 2004

(54) ZOOM LENS, CAMERA APPARATUS AND PORTABLE INFORMATION TERMINAL APPARATUS

(75) Inventor: Kiichiro Nishina, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/283,214

(22) Filed: Oct. 30, 2002

(65) Prior Publication Data

US 2003/0206736 A1 Nov. 6, 2003

(30) Foreign Application Priority Data

Oct. 30, 2001 (JP) .......................... 2001-333060
Jun. 27, 2002 (JP) .......................... 2002-188076

(51) Int. Cl.⁷ .......................... G03B 5/00; G02B 15/14; G02B 9/60
(52) U.S. Cl. .................. 396/72; 348/240.3; 359/714; 359/764; 359/684
(58) Field of Search .................. 396/72, 79; 359/714, 359/763, 764, 684; 348/240.3, 207.1, 207.11

(56) References Cited

U.S. PATENT DOCUMENTS

| | | | |
|---|---|---|---|
| 4,690,518 A | 9/1987 | Kouchiwa et al. | |
| 4,738,517 A | 4/1988 | Nishina et al. | |
| 4,753,522 A | 6/1988 | Nishina et al. | |
| 4,836,664 A | 6/1989 | Nishina | |
| 4,997,265 A | 3/1991 | Nishina | |
| 5,202,992 A * | 4/1993 | Banno et al. | 359/684 X |
| 5,311,364 A | 5/1994 | Kanoshima et al. | 359/756 |
| 5,680,254 A | 10/1997 | Ueda et al. | 359/652 |
| 5,781,324 A | 7/1998 | Nishina | 359/206 |
| 2002/0060855 A1 * | 5/2002 | Ohashi | 359/684 |

FOREIGN PATENT DOCUMENTS

| | | |
|---|---|---|
| JP | 6-180424 | 6/1994 |
| JP | 3109342 | 6/1995 |
| JP | 9-90221 | 4/1997 |

* cited by examiner

Primary Examiner—W. B. Perkey
(74) Attorney, Agent, or Firm—Oblon, Spivak, McClelland, Maier & Neustadt, P.C.

(57) ABSTRACT

A zoom lens having five lens groups arranged in succession. The zoom lens is configured such that when zooming from a short focal length end toward a long focal length end, the second lens group lens moves toward the third lens group and the fourth lens group moves toward a side of the third lens group, and the fifth lens group corrects the zooming and a shift in a position of an imaging plane of the zoom lens caused by movement of the third lens group and the fourth lens group.

66 Claims, 39 Drawing Sheets

FIG. 3
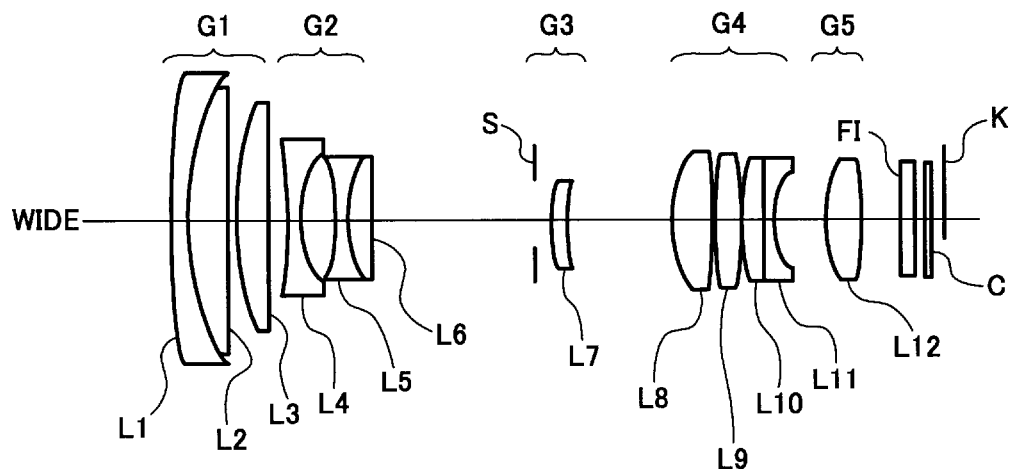
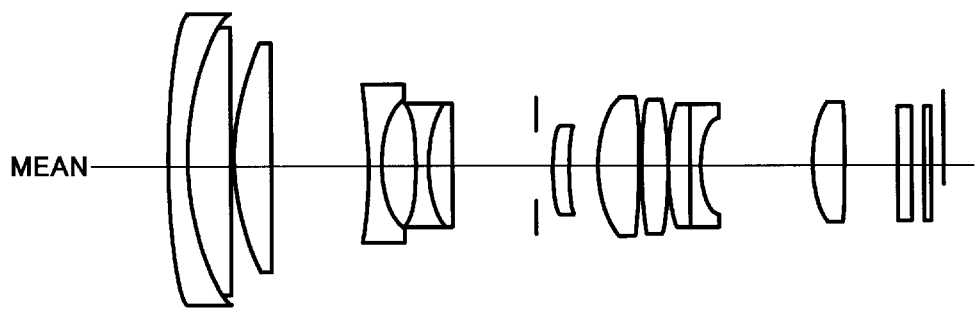
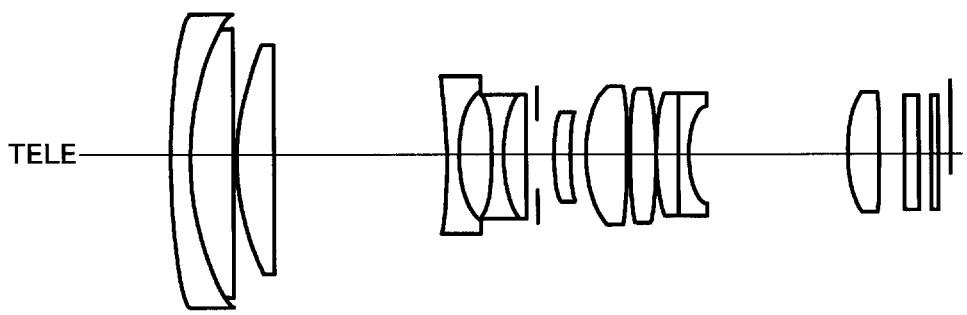

FIG. 4
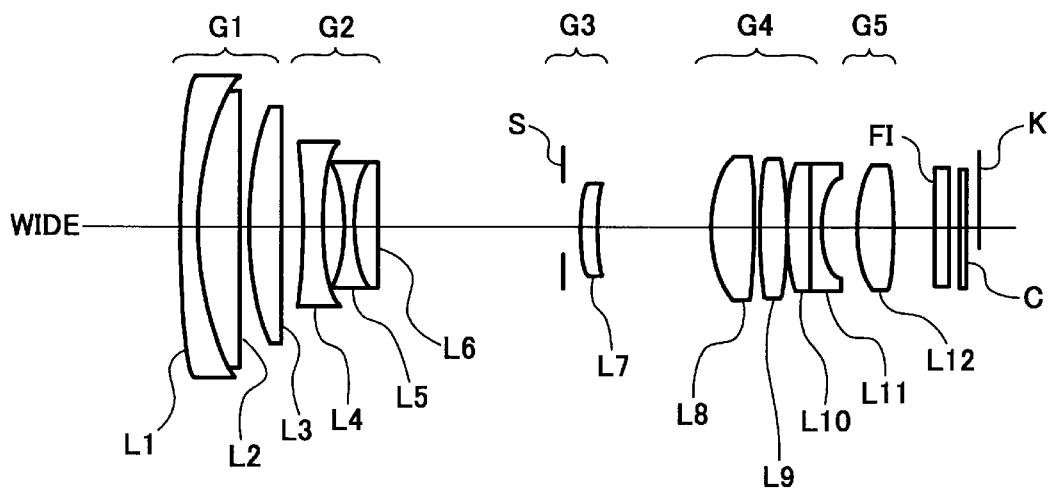
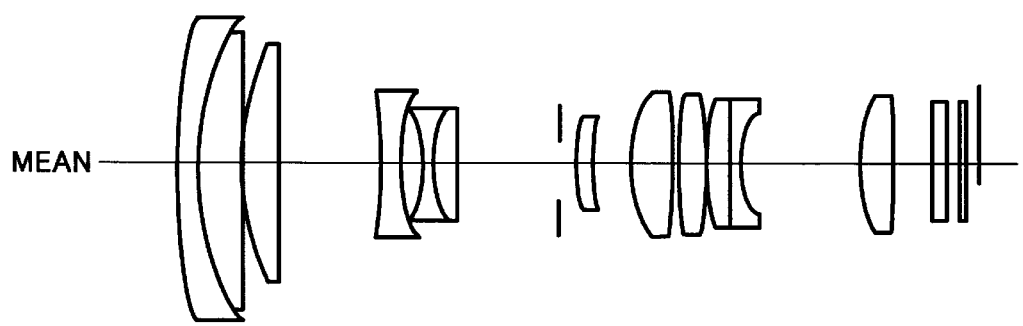
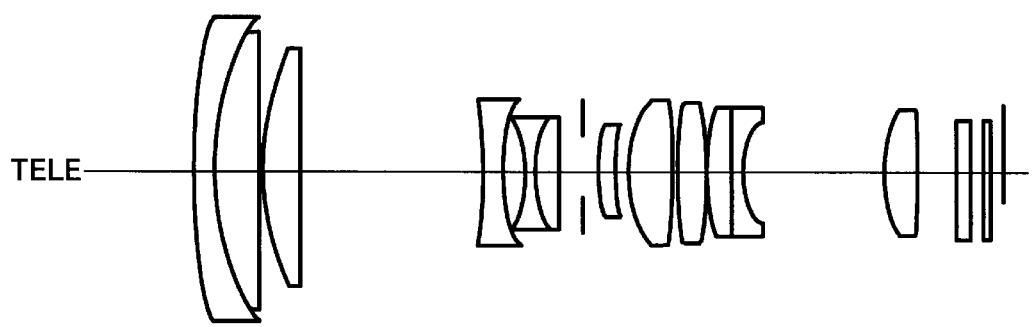

FIG. 5
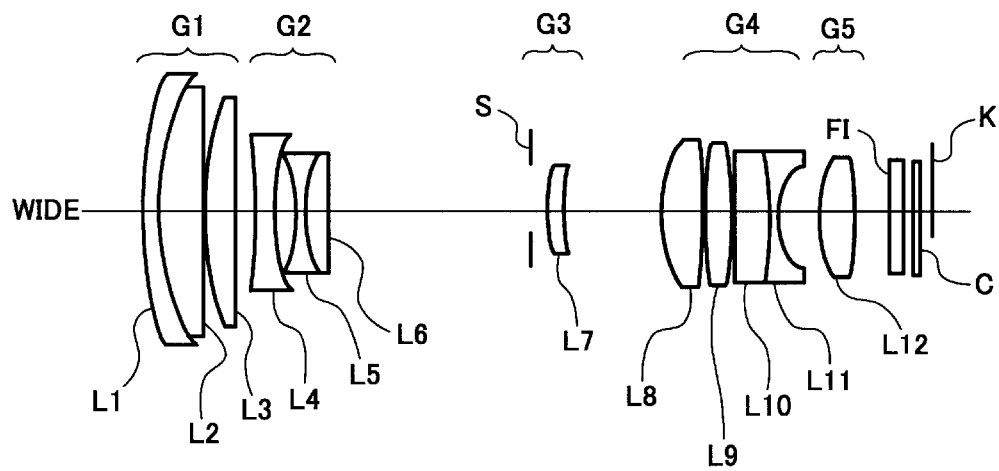
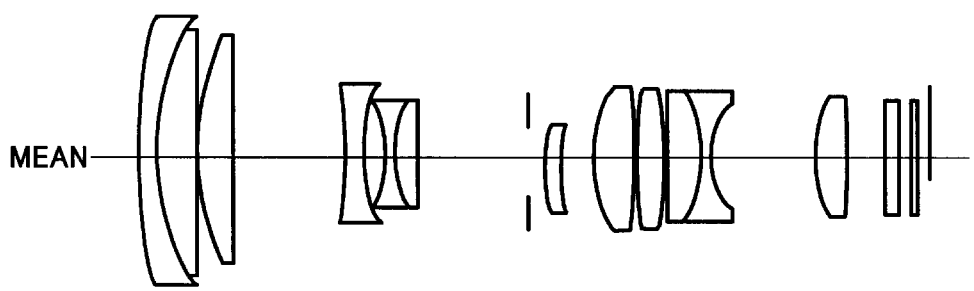
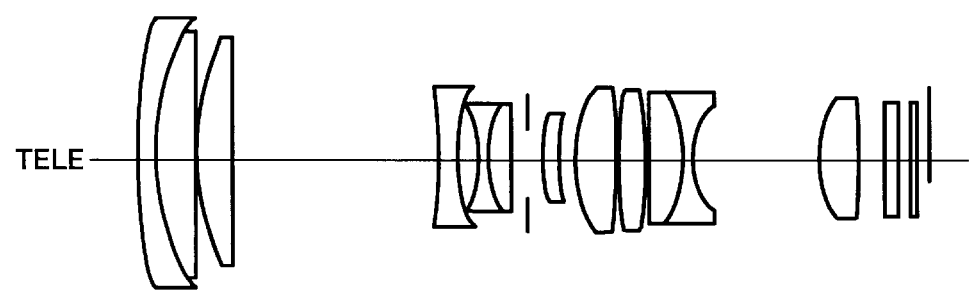

FIG. 7
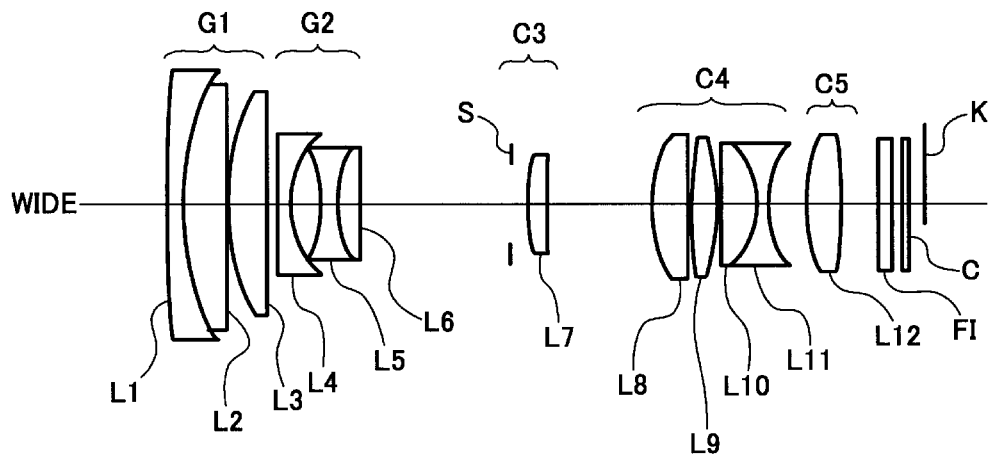
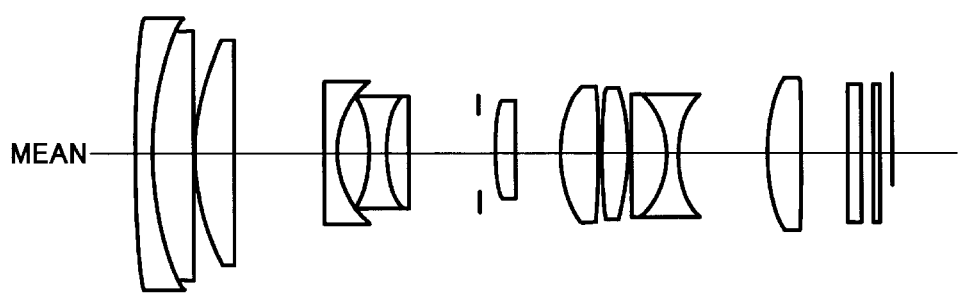
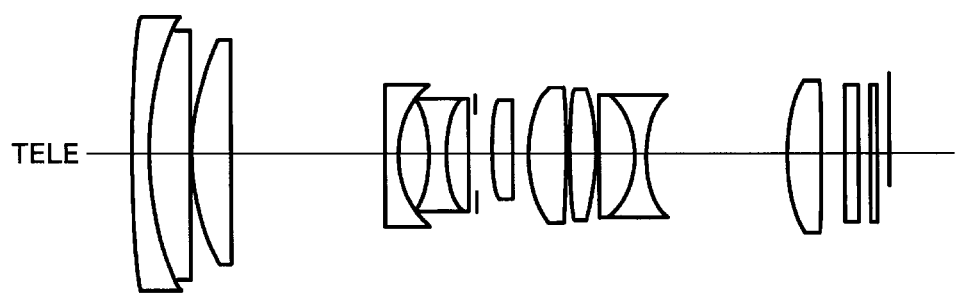

FIG. 8
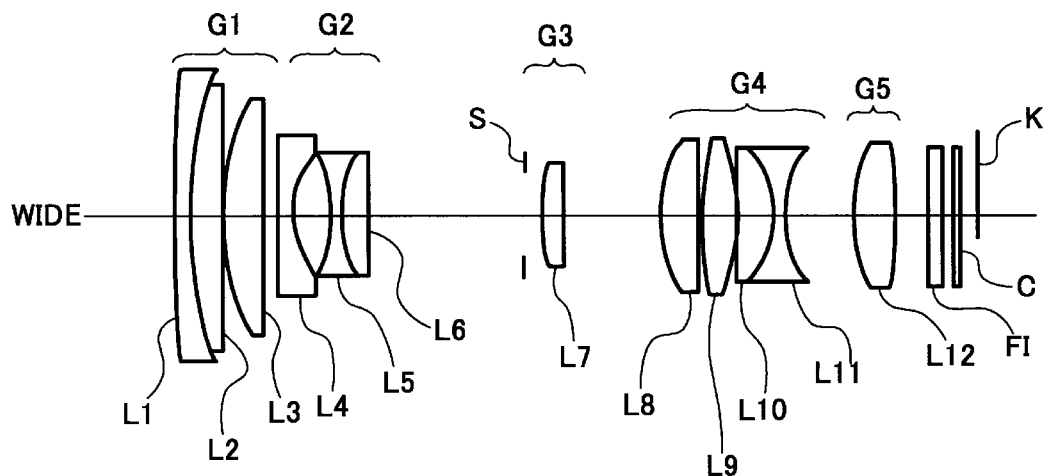
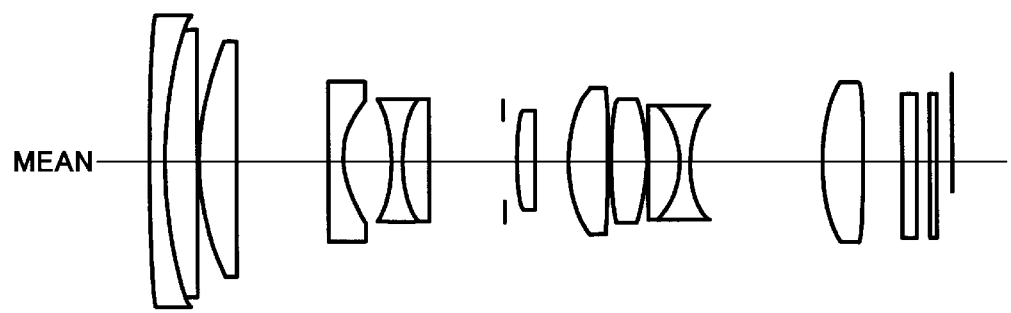
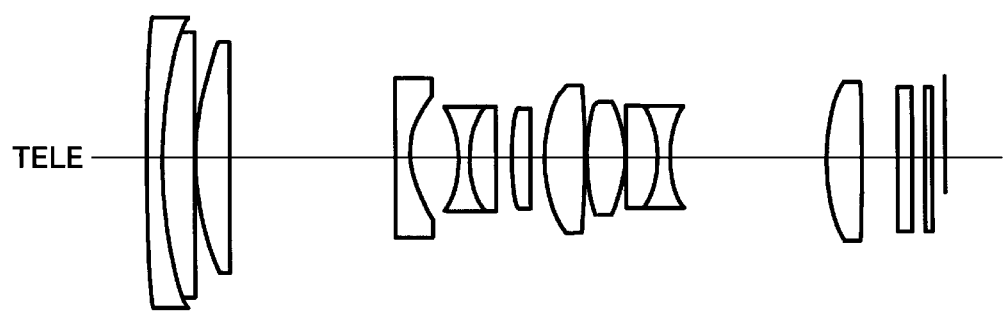

FIG. 14A
FIG. 14 | FIG. 14A
        | FIG. 14B
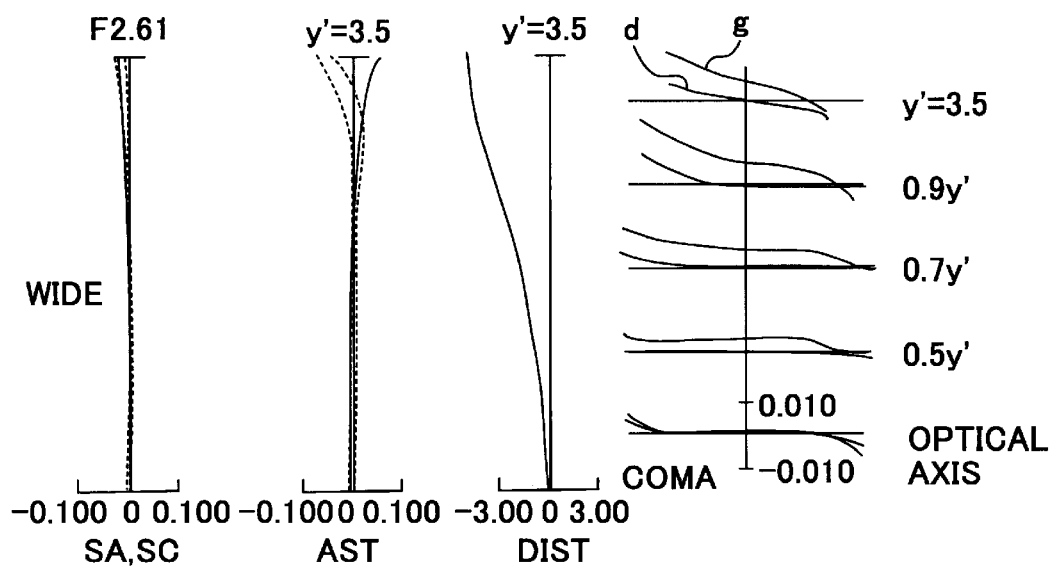
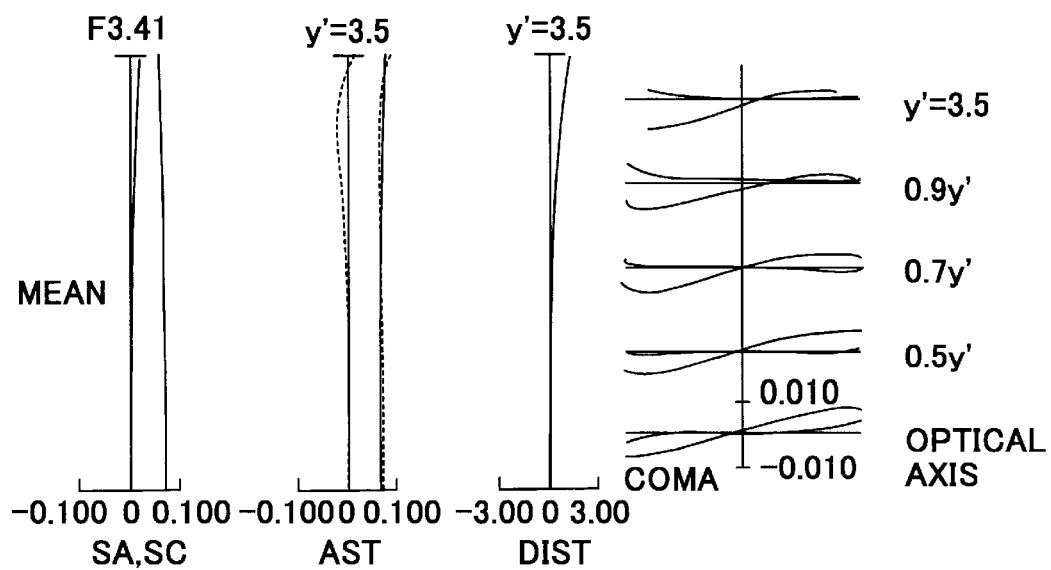

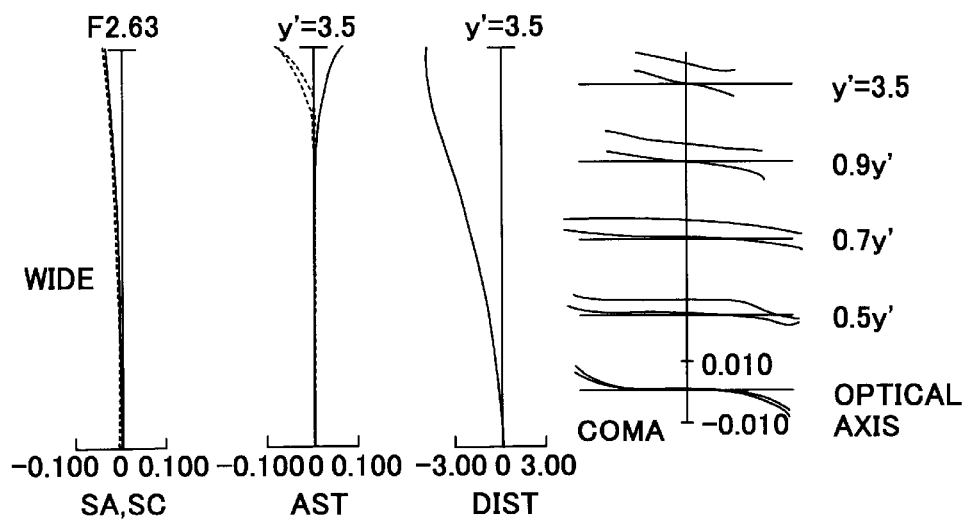
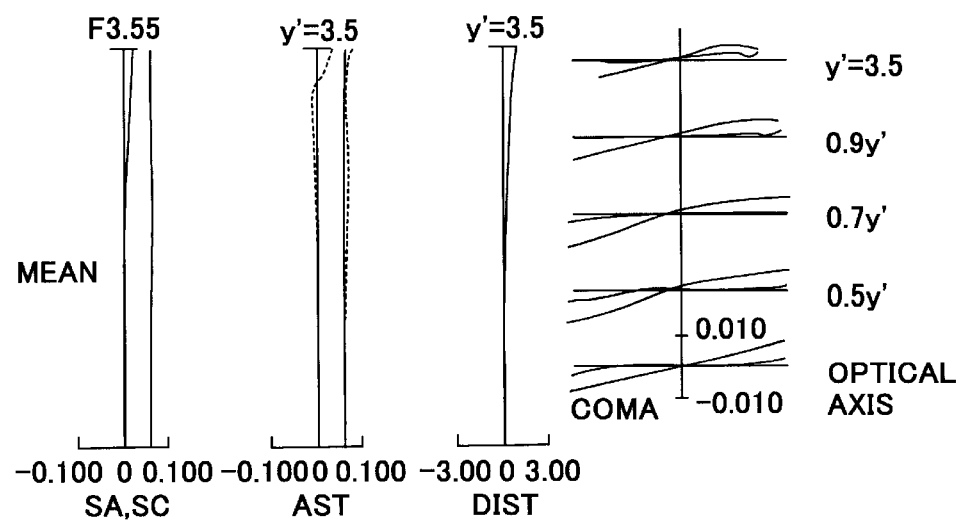
FIG. 15A

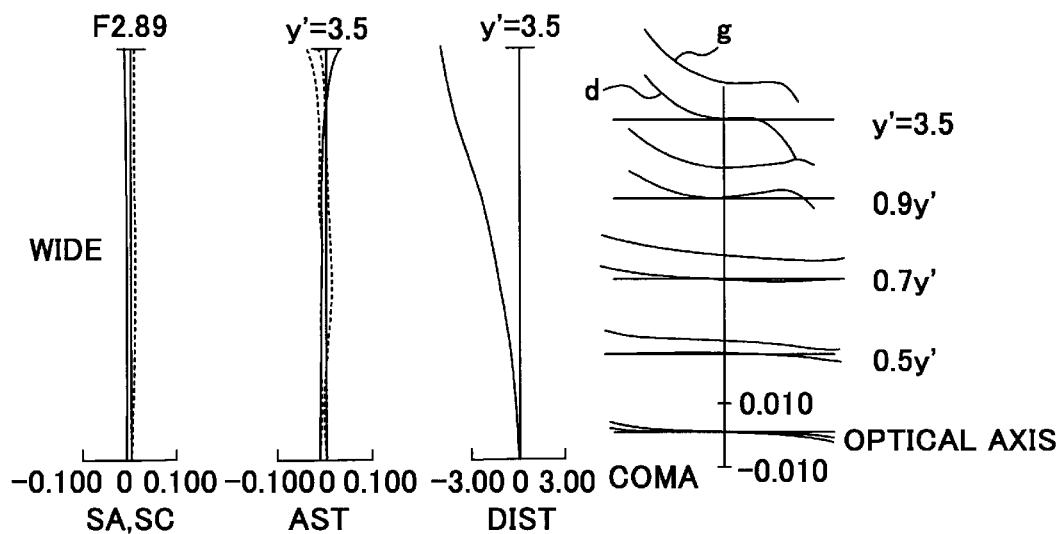
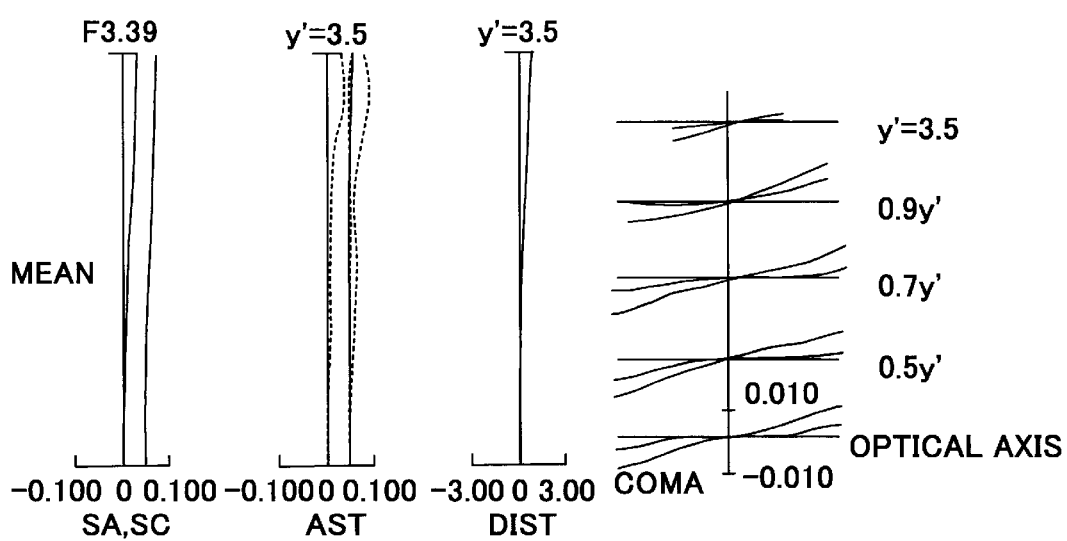
FIG. 16A

FIG. 17A
FIG. 17 | FIG. 17A |
        | FIG. 17B |
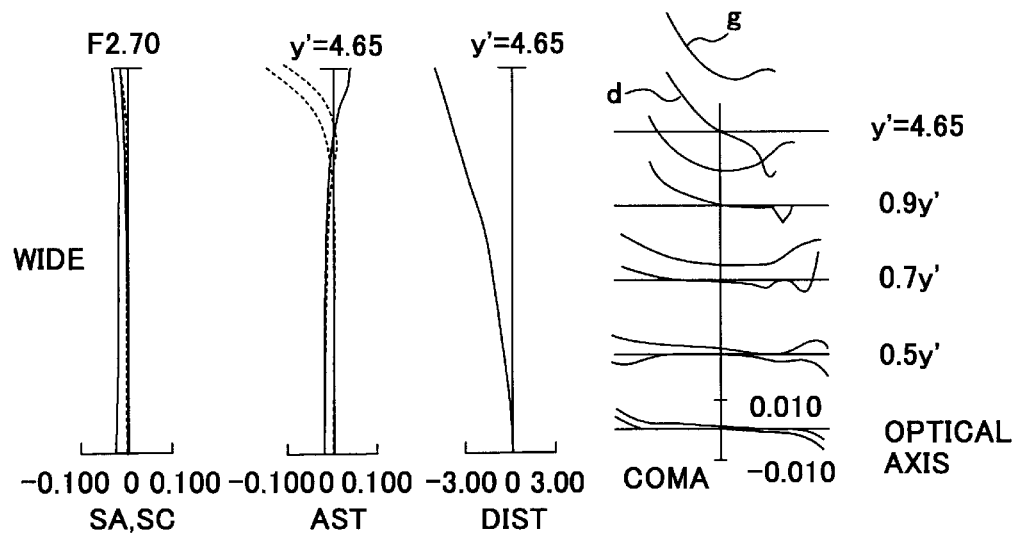
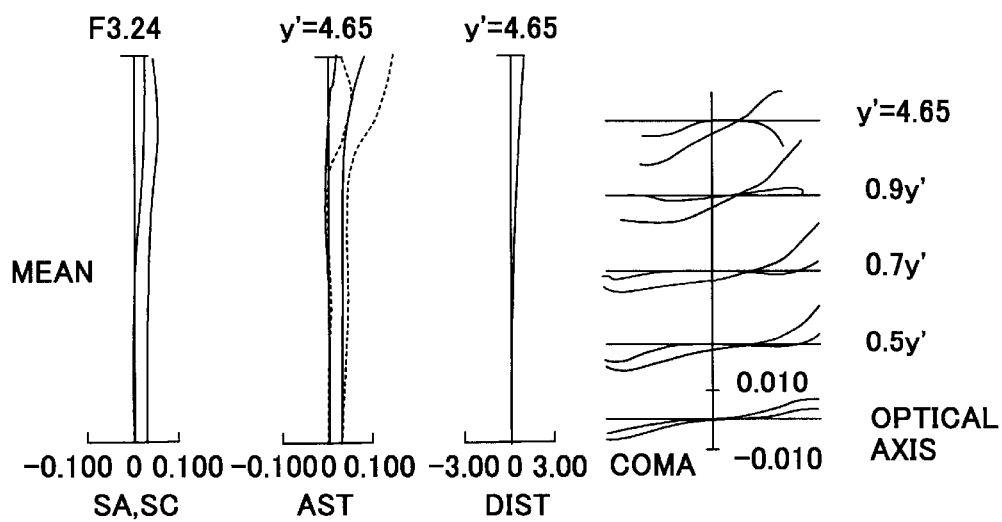

FIG. 18A
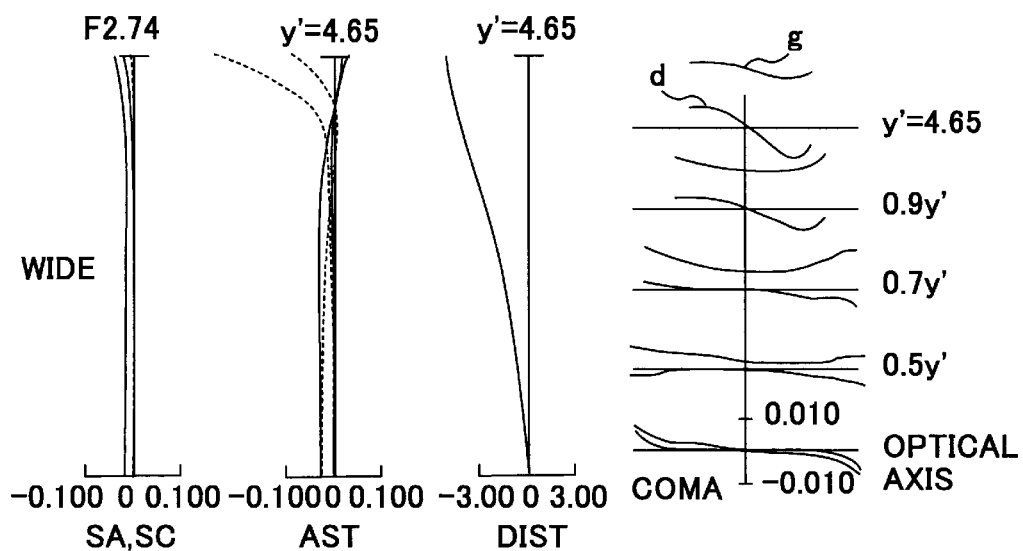
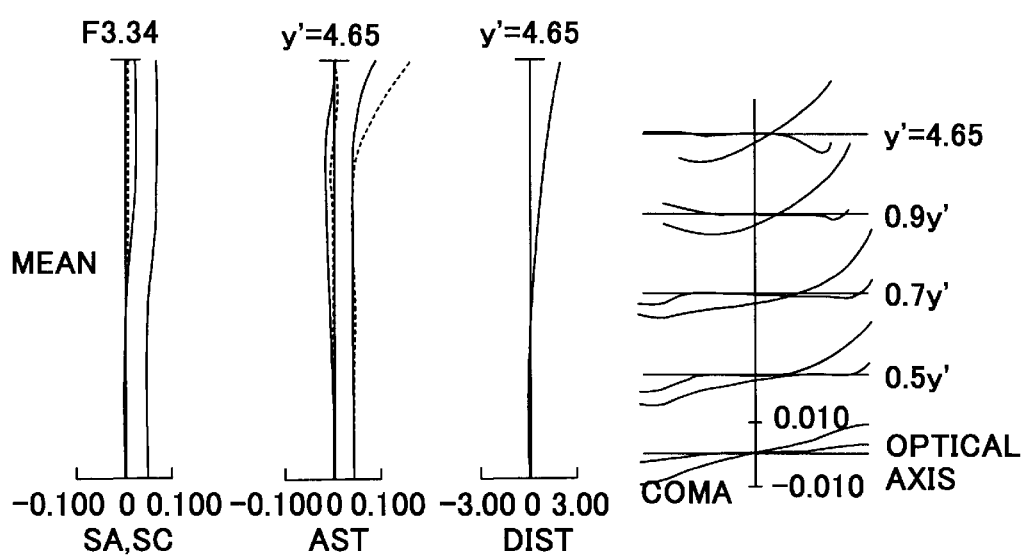

FIG. 19A
FIG. 19 | FIG. 19A / FIG. 19B
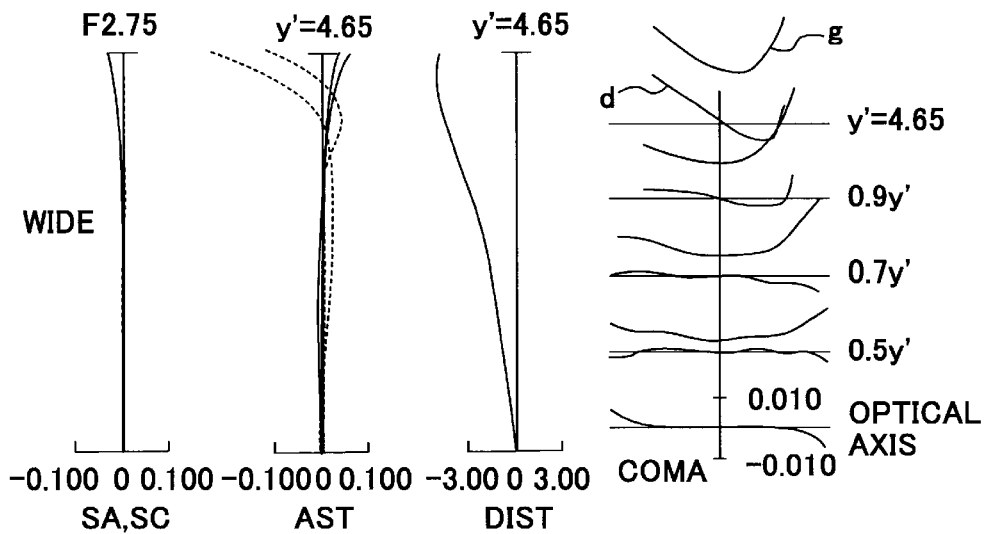
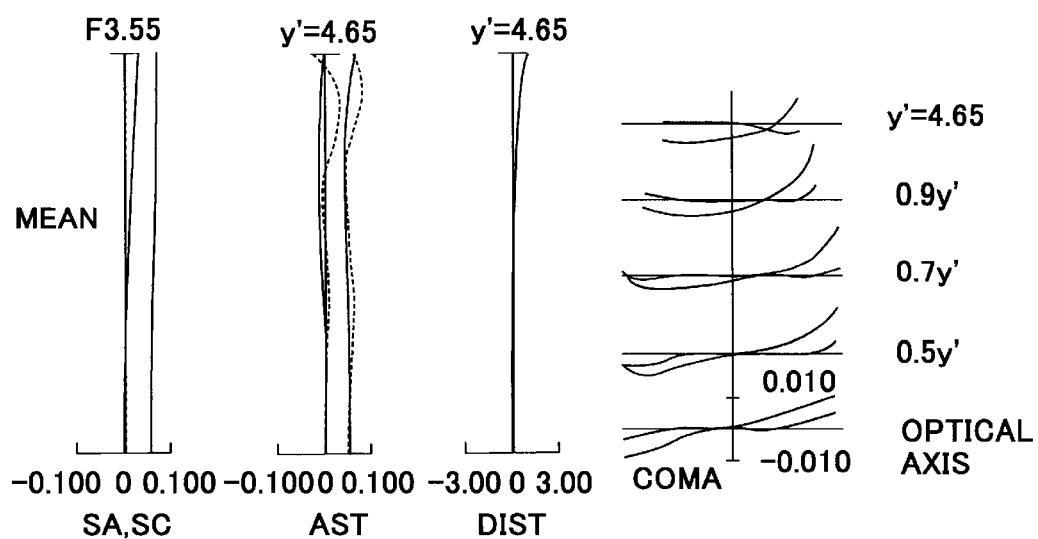

FIG. 20A
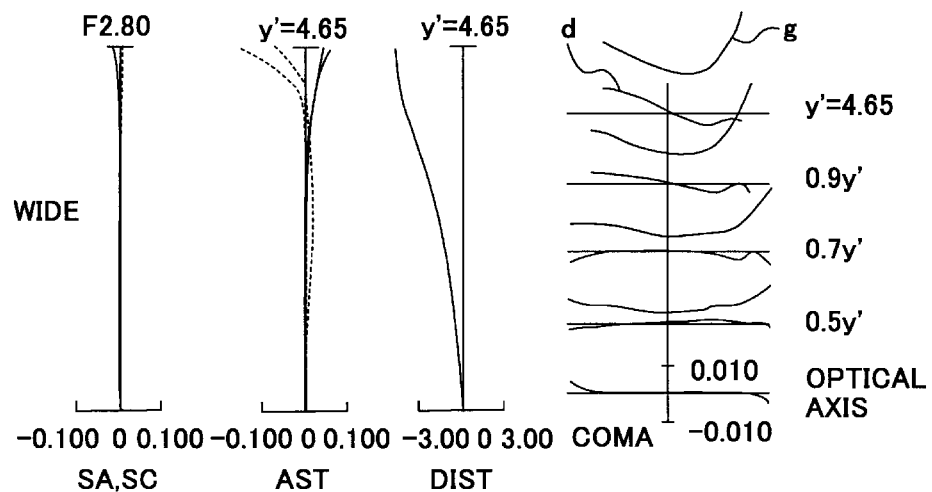
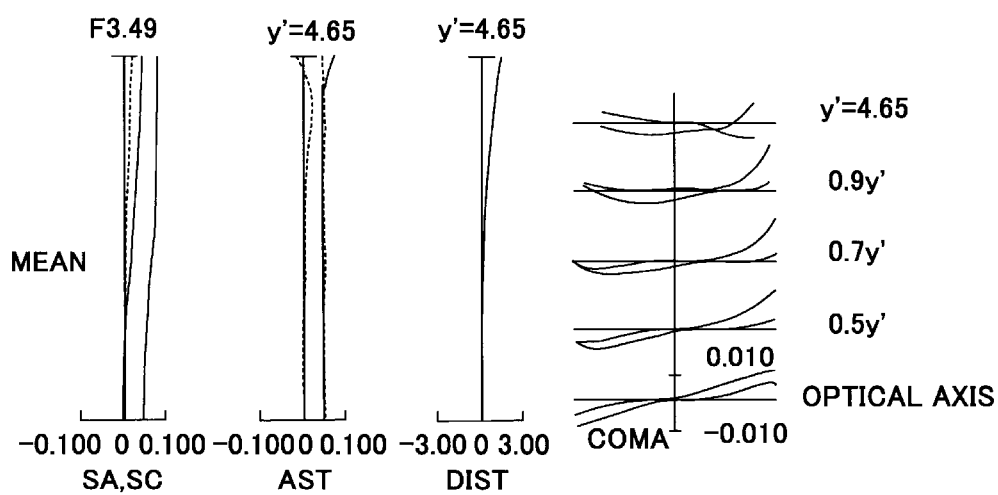

FIG. 21 | FIG. 21A / FIG. 21B
FIG. 21A
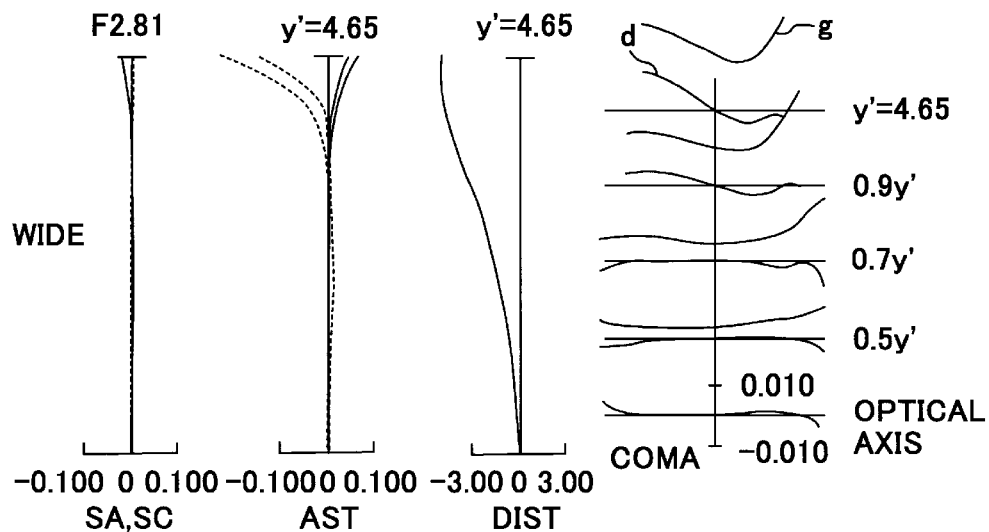
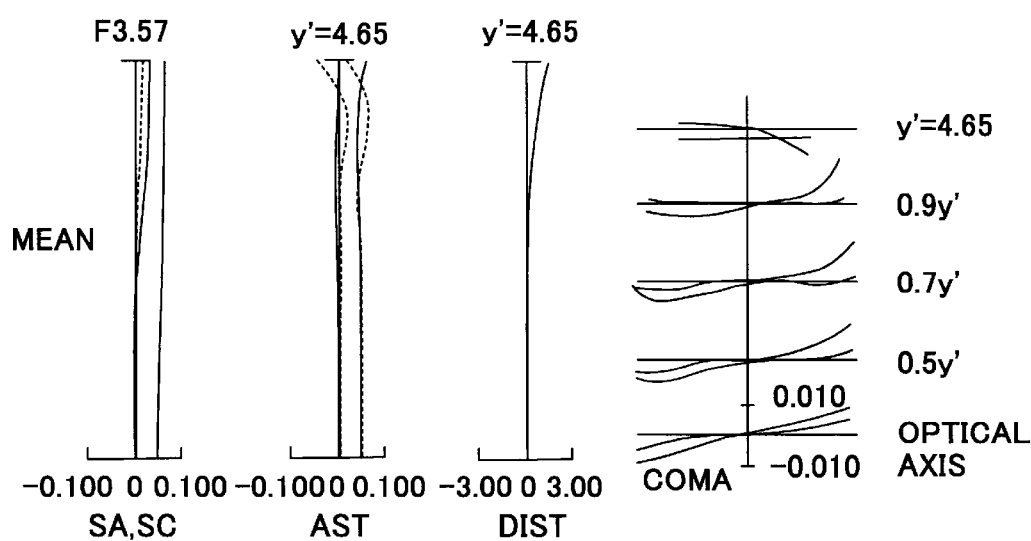

FIG. 22A
FIG. 22 | FIG. 22A |
| FIG. 22B |
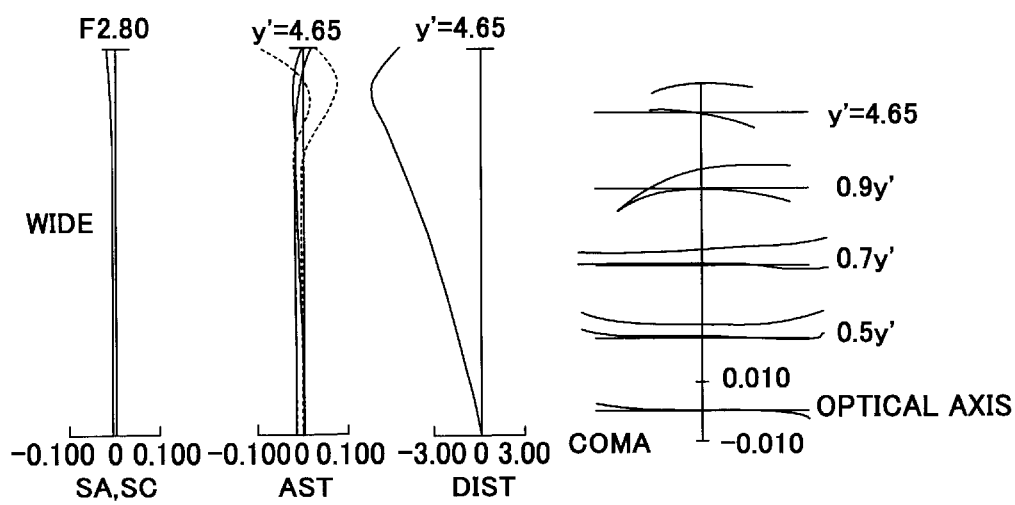
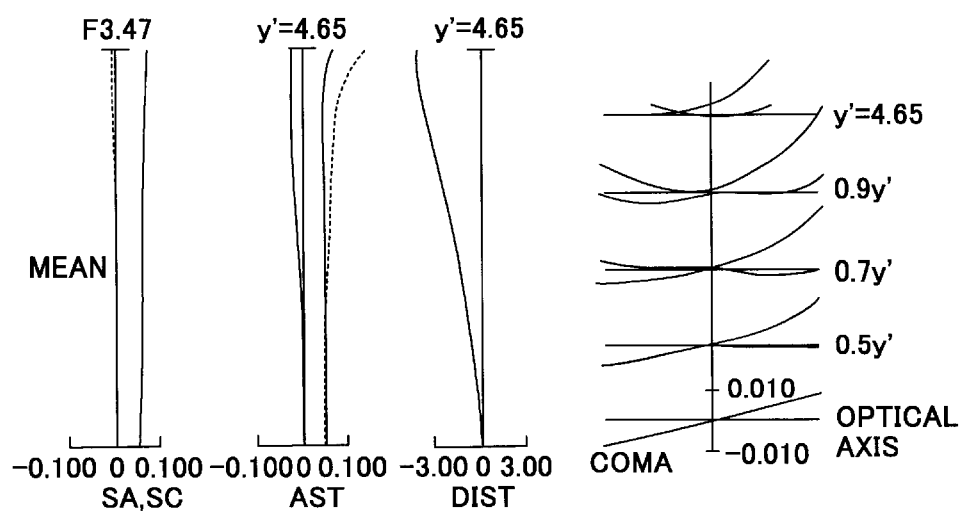

FIG. 23A
FIG. 23 | FIG. 23A |
| FIG. 23B |
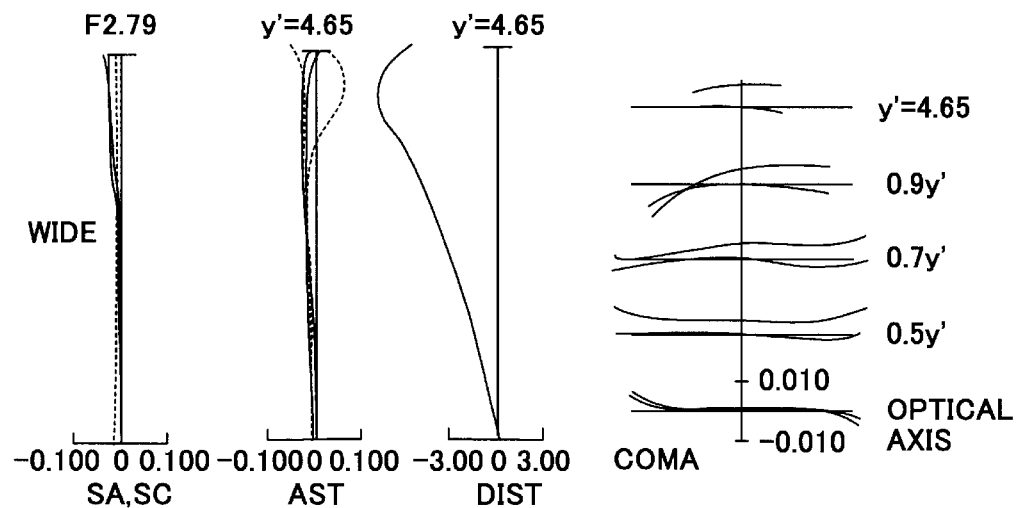
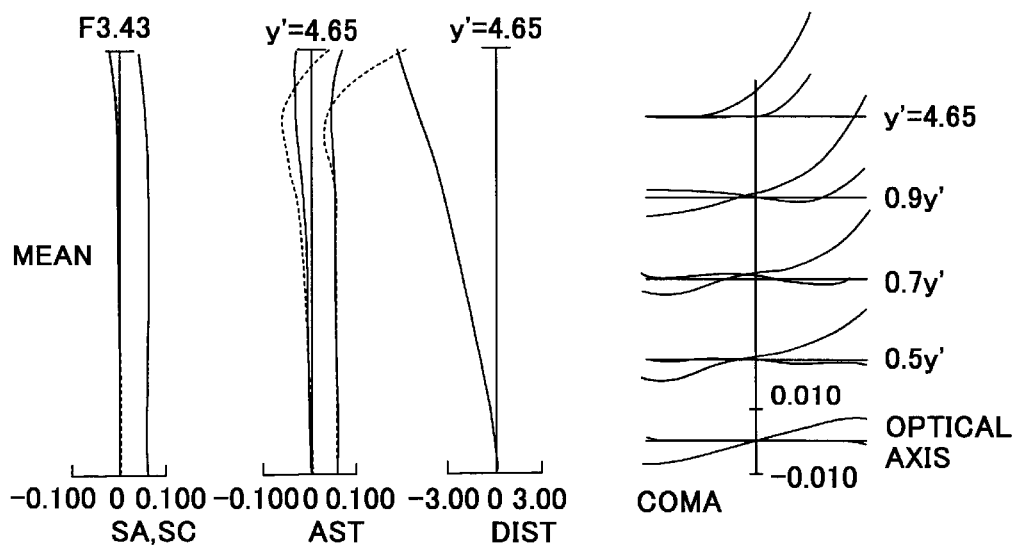

FIG. 24A
FIG. 24 | FIG. 24A
        | FIG. 24B
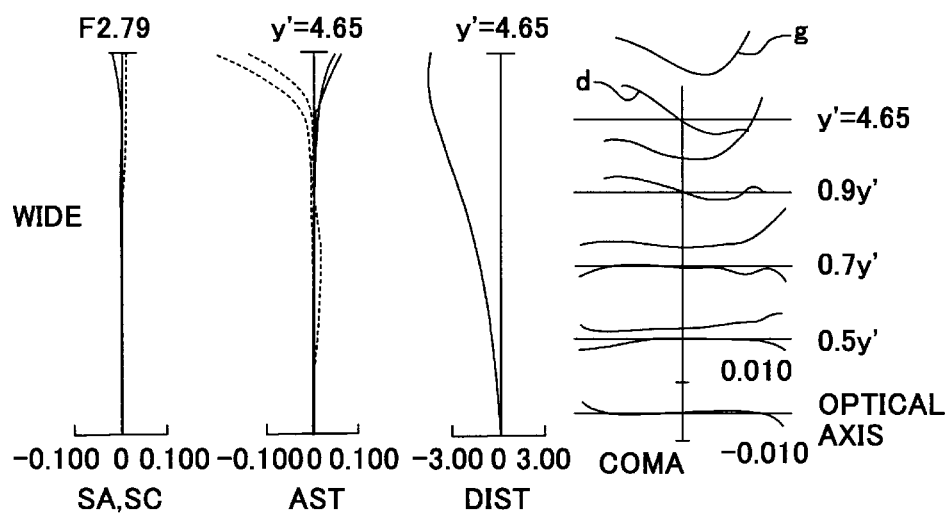
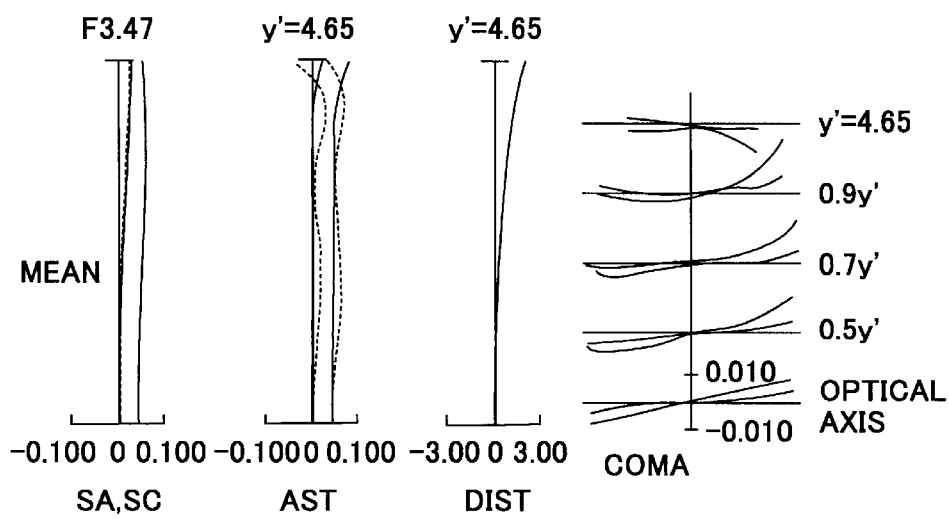

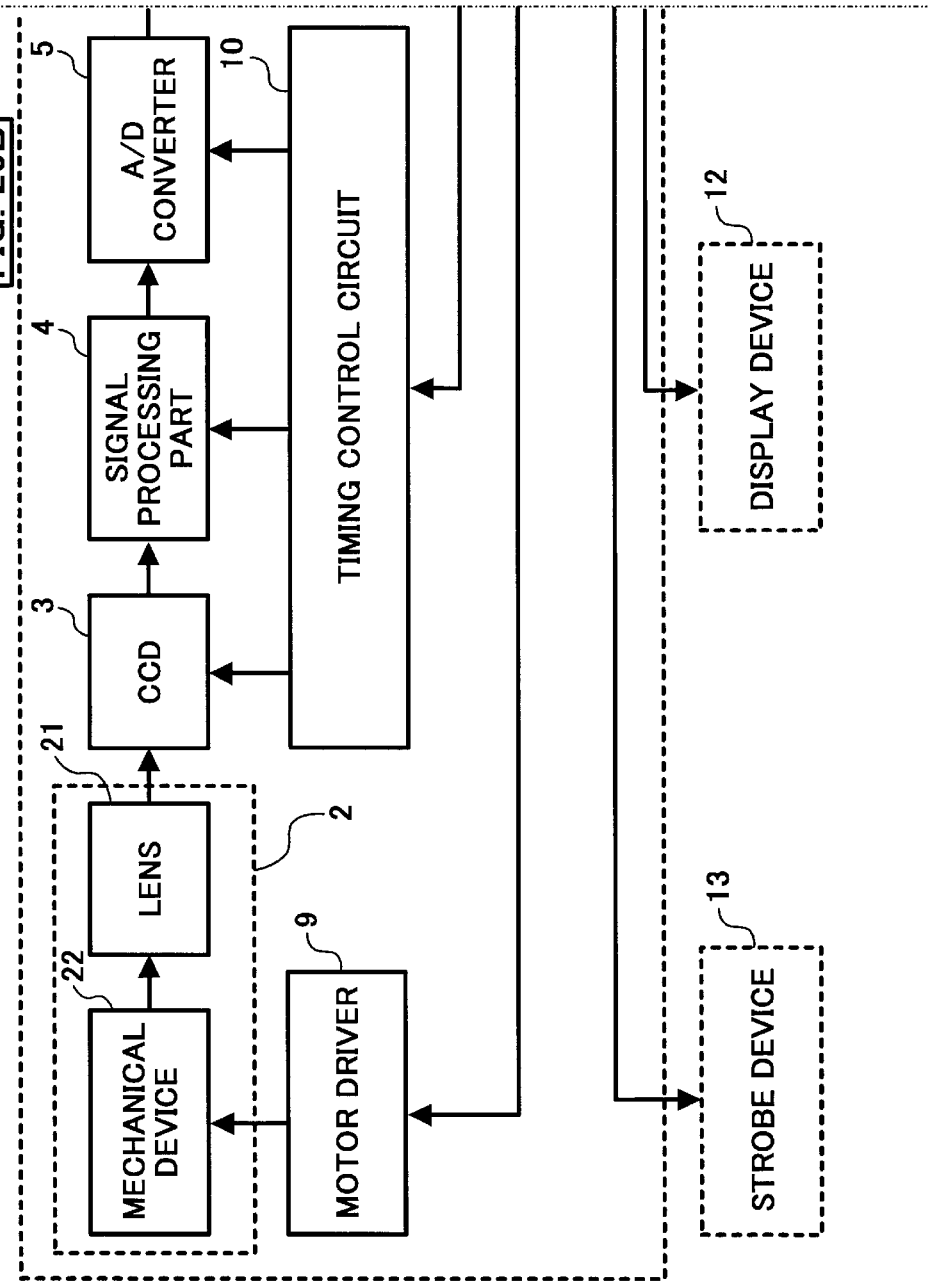

ZOOM LENS, CAMERA APPARATUS AND PORTABLE INFORMATION TERMINAL APPARATUS

BACKGROUND OF THE INVENTION

1. Field of the Invention

The present invention relates to a compact zoom lens suitable for use in video cameras and still video cameras, a camera apparatus using the zoom lens, and a portable information terminal apparatus.

2. Discussion of the Background

In a zoom lens for use in video cameras and still video cameras, recently, as demands for a higher zooming ratio, a wider field angle and a higher resolution increase, and at the same time for meeting demands for a smaller size, a lighter weight and a reduced cost, reducing the overall length and the outer diameter of the zoom lens and decreasing the number of pieces of lens composing the zoom lens are becoming imperative.

As a zoom lens for meeting the above-described demands, a type of zoom lens has been proposed, in which, in order from the object side, a first lens group having a positive refracting power, a second lens group having a negative refracting power, a third lens group having a positive refracting power, a fourth lens group having a positive refracting power, and a fifth lens group having a positive refracting power are arranged. By moving the second lens group toward the imaging plane side, zooming of the zoom lens from the short focal length end to the long focal length end is performed, and a shift in the position of an imaging plane of the zoom lens due to the movement of the second lens group for the zooming is corrected by the fourth lens group. Japanese Patent Laid-open Publication No. 6-180424, Japanese Patent Publication No. 3109342, and Japanese Patent Laid-open Publication No. 9-90221 describe examples of zoom lenses of such type. In each of the zoom lenses of these examples, a shift in the position of an imaging plane occurring in connection with zooming is corrected by movement of the fourth lens group.

Each of the zoom lenses having five lens groups described in the above publications, respectively, is configured such that the fourth lens group is moved solely for correcting a shift in the position of an imaging plane occurring in connection with zooming, and the movement of the fourth lens group does not contribute to the zooming at all. The function of zooming is mostly performed by the second lens group. For this reason, the moving amount of the second lens group for zooming is large, and as a result, the first lens group must be arranged at a distant position from an aperture diaphragm arranged in the third lens group. This leads to increasing the size of the first lens group and furthermore to increasing the overall size of the zoom lens.

SUMMARY OF THE INVENTION

The present invention has been made in view of the above-discussed and other problems and addresses the above-discussed and other problems.

Preferred embodiments of the present invention provide a novel zoom lens that has a high zooming ratio exceeding 4.5 times while being extremely small in the outer diameter and the overall length thereof and a wide field angle with a half field angle at the short focal length end of 30° or more, and that can attain a high resolution. The preferred embodiments also provide a camera apparatus using the zoom lens, and a portable information terminal apparatus using the camera apparatus.

According to a preferred embodiment of the present invention, a zoom lens includes a first lens group having a positive refracting power, a second lens group having a negative refracting power, a third lens group having a positive refracting power, a fourth lens group having a positive refracting power, and a fifth lens group having a positive refracting power. The first lens group, the second group lens, the third lens group, the fourth lens group, and the fifth lens group are arranged in succession. The zoom lens is configured such that, when zooming from a short focal length end toward a long focal length end, the second lens group lens moves toward the third lens group and the fourth lens group moves toward a side of the third lens group, and the fifth lens group corrects the zooming and a shift in a position of an imaging plane of the zoom lens caused by movement of the second lens group and the fourth lens group. When a distance from a first lens surface of the zoom lens at the long focal length end to the imaging plane is $\Sigma d$, a synthesized focal length of the first lens group through the fifth lens group is fw, and a synthesized focal length of the first lens group through the fifth lens group is ft, a following conditional formula is satisfied:

$$1.45 < \Sigma d/(ft-fw) < 2.2.$$

Thus, the above-described zoom lens is configured such that when zooming, the fourth lens group is also moved to perform a portion of the zooming and a shift in the position of the imaging plane of the zoom lane involved in the zooming is corrected by moving the fifth lens group. Thereby, the moving amount of the second lens group can be suppressed small, so that the distance of the first lens group from an aperture diaphragm can be reduced and the outer diameter of the first lens group can be made relatively small, and at the same time, the overall size of the zoom lens can be made relatively small. Further, freedom in enhancing the performance of the zoom lens is increased by moving the fifth lens group, so that enhancement of the performance of the zoom lens can be achieved.

The above conditional formula specifies an overall size of the zoom lens, and if the upper limit is exceeded, the overall length of the zoom lens will increase, the outer diameter of the first lens group will increase, the cost of the zoom lens will increase, and the size of a camera using the zoom lens will increase. If the lower limit is exceeded, the power of each lens group will be too strong, so that satisfactory imaging performance will not be obtained. For achieving a higher performance of the zoom lens, it is preferable that the zoom lens is configured such that the following conditional formula is satisfied:

$$1.6 < \Sigma d(ft-fw) < 2.2.$$

In the above-described zoom lens, the first lens group may be mounted at a fixed position. That is, the first lens group may be a fixed lens group that does not move when the zoom lens is zoomed and when a portion of lens groups moves for focusing. For realizing moving of moving lens groups of a zoom lens with a simple mechanism, it is preferable that the zoom lens is configured such that the first lens group is fixed. The first lens group has a largest outer diameter among the lens groups constituting the zoom lens, and consequently, the first lens group is relatively heavy. Accordingly, it is hard to realize moving of the first lens group with a simple mechanism and reduced power consumption. Further, if the zoom lens is configured such that focusing is performed by the first lens group, the peripheral light quantity at a short photographing distance is greatly reduced as a result of movement of the first lens group, which is undesirable. For avoiding this disadvantage, the first lens group must be made extremely large. By configuring the zoom lens such that the first lens group is fixed as above, as might be expected, the distance from the first lens surface of the zoom lens to the imaging plane is constant through the entire zooming range.

In the above-described zoom lens, an aperture diaphragm may be arranged in the vicinity of the third lens group, and in particular, it is preferable that the aperture diaphragm is arranged at a most outside position of the third lens group at the side of the second lens group. Further, the third lens group including the aperture diaphragm may be mounted at a fixed position.

Generally, a shutter is provided at the position of the aperture diaphragm. A mechanism for moving the shutter is relatively complicated. Further, if the shutter is configured to be moved, vibration at the time of driving the shutter tends to be transmitted to other parts of the zoom lens. This causes deterioration of the performance of the zoom lens, e.g. image burring. Thus, it is preferable that the third lens group including a shutter is not moved.

In the above-described zoom lens, focusing may be performed by a method of letting out the entire portion of the zoom lens, a method of moving a light receiving element such as a CCD, or a so-called internal focusing method in which lens groups other than the first lens group is moved. Specifically, in the above-described zoom lens, focusing of the zoom lens may be achieved by movement of the fifth lens group. Generally, the moving amount of a focusing lens group of a zoom lens when focusing on an object at a same photographing distance is small at the short focal length end and is greater as the focusing lens group is closer to the long focal length end. In the above-described zoom lens of the present invention, the distance between the fourth lens group and the fifth lens group is small at the short focal length end and is greater at the long focal length end. Accordingly, a space in which the fifth lens group is moved for focusing can be obtained without interfering with the fourth lens group at any zooming position. Further, the zoom lens of the present invention is configured such that a shift in the position of an imaging plane involved in zooming the zoom lens is corrected by the fifth lens group. Therefore, the zoom lens of the present invention has an advantage that a moving mechanism and a control mechanism for correcting a shift in the position of an imaging plane and those mechanisms for focusing can be combined.

The above-described zoom lens may be configured such that when a synthesized focal length of the first lens group is f1 and a synthesized focal length of the first lens group and the second lens group at the long focal length end is f12t, the following conditional formula is satisfied:

$$-1.8 < f12t/f1 < -1.1.$$

In the above conditional formula, f12t/f1 represents a zooming ratio of the second lens group at the long focal length end, and for making the overall size of the zoom lens small, it is preferable that the above conditional formula is satisfied. If the upper limit is exceeded, contribution of the second lens group to a zooming function will be excessively small, so that a change in an entrance pupil when the zoom lens is zoomed will be reduced, and when the diameter of an aperture diaphragm is fixed, a change in the F number at the long focal length end will be increased relative to that at the short focal length end. If the lower limit is exceeded, contribution of the fourth lens group to a zooming function will be excessively small, so that the power of the first lens group will be too strong and aberration in the first lens group will be excessively large, and thereby satisfactory imaging performance will not be obtained.

For further reducing the overall size of the zoom lens, it is preferable that the zoom lens is configured such that the following conditional formula is satisfied:

$$-1.7 < f12t/f1 < -1.2.$$

Further, the above-described zoom lens can be configured such that when a distance between the first lens group and the second lens group at the short focal length end is d1w, a distance between the first lens group and the second lens group at the long focal length end is d1t, a distance between the third lens group and the fourth lens group at the short focal length end is d3w, and a distance between the third lens group and the fourth lens group at the long focal length end is d3t, the following conditional formula is satisfied:

$$0.3 < (d3w-d3t)/(d1t-d1w) < 0.8.$$

The above conditional formula specifies a ratio between a moving amount of the fourth lens group and that of the second lens group when the zoom lens is zoomed. For reducing the size of the zoom lens of the present invention, one may increase the moving amount of the fourth lens group to a certain extent. If the ratio exceeds the lower limit, the moving amount of the second lens group (the denominator of the above conditional formula) will be increased or the moving amount of the fourth lens group (the numerator of the above conditional formula) will be decreased, so that a portion of a zooming function performed by the fourth lens group will be reduced, and thereby the size of the zoom lens will not be reduced. Conversely, if the ratio exceeds the upper limit, the moving amount of the fourth lens group will be increased, a portion of a zooming function performed by the fourth lens group will be increased, and a portion of the zooming function performed by the second lens group will be decreased, so that satisfactory zooming will not be performed, thereby causing deterioration in the imaging performance.

For further reducing the overall size of the zoom lens and enhancing the zooming performance, it is preferable that the following conditional formula is satisfied:

$$0.4 < (d3w-d3t)/(d1t-d1w) < 0.7.$$

Further, the above-described zoom lens may be configured such that each of the first lens group and the second lens group includes three pieces of lens, the fourth lens group includes four pieces of lens, and the fifth lens group includes one piece of lens, and such that each of the second lens group through the fifth lens group includes one or more non-spherical surfaces. For obtaining a high performance zoom lens, each aberration must be suppressed small. For correcting each aberration satisfactorily, one may increase the number of lenses constituting the zoom lens to a certain extent, and aberration in each lens must be suppressed small. However, if the number of lenses increases, the thickness of each lens group increases, so that the overall size of the zoom lens cannot be reduced, and at the same time the construction of the zoom lens is complicated, causing the cost of the zoom lens to be increased.

Therefore, in the above-described zoom lens of the present invention, each of the first lens group and the second lens group is constituted of a relatively small number of lenses, i.e., three pieces of lens, and the fourth lens group is constituted of four pieces of lens so that an effect of deterioration in the imaging performance due to decentering of each lens of the fourth lens group is decreased. Further, the fifth lens group is constituted of one piece of lens. When the fifth lens group is moved for correcting a shift in the position of an imaging plane and for focusing, because the number of lenses constituting the fifth lens group is small and thereby the fifth lens group is light, the fifth lens group can be moved by less energy. For maintaining a satisfactory imaging performance in a zoom lens constituted of a small number of lenses as described above, it is preferable that each of the second lens group through the fifth lens group has one or more non-spherical surfaces.

According to another preferred embodiment of the present invention, a zoom lens includes a first lens group having a positive refracting power, a second lens group having a negative power, a third lens group having a positive refracting power, a fourth lens group having a positive refracting power, and a fifth lens group having a positive refracting power. The first lens group, the second group lens, the third lens group, the fourth lens group, and the fifth lens group are arranged in succession. The zoom lens is configured such that when zooming from a short focal length end toward a long focal length end, at least a distance between the first lens group and the second lens group increases, and a distance between the second lens group and the third lens group and a distance between the third lens group and the fourth lens group decrease. When a distance from a first lens surface of the zoom lens to an imaging plane of the zoom lens at the long focal length end is $\Sigma d$, an image height is y', and a zooming ratio is Z, a following condition is satisfied:

$$\Sigma d/(Z \times y') < 3.5.$$

A background zoom lens including five lens groups, a first lens group having a positive power, a second lens group having a negative power, a third lens group having a positive power, a fourth lens group having positive power, and a fifth lens group having a positive power, is configured such that when zooming, the first lens group, the third lens group, and fifth lens group are fixed, the second lens group is moved, thereby zooming of the zoom lens being performed, and a shift in the position of an imaging plane of the zoom lens associated with the zooming is corrected by moving the fourth lens group. Therefore, the moving amount of the second lens group for performing the zooming is relatively large, and the first lens group must be arranged at a distant position from an aperture diaphragm arranged in the third lens group, so that the size of the first lens group is increased, thereby the overall size of the zoom lens being increased.

The immediately above-described zoom lens of the present invention is configured such that when zooming the second lens group moves toward the third lens group and at the same time the fourth lens group moves toward the third lens group, thereby the zooming being performed, and a shift in the position of the imaging plane due to movement of the second lens group and the fourth lens group is corrected by the fifth lens group. By configuring the zoom lens as above, a portion of the zooming is performed by the fourth group also, in addition to the second lens group, and a shift in the position of the imaging plane due to the zooming is corrected by the fifth lens group. Thereby, the moving amount of the second lens group can be suppressed small and the distance of the first lens group from the aperture diaphragm can be reduced, so that the outer diameter of the first lens group can be made small and the overall size of the zoom lens can be reduced, and at the same time, by moving the fifth lens group, freedom in enhancing the performance of the zoom lens is increased, so that enhancement of the performance can be achieved.

The above conditional formula specifies the overall size of the zoom lens, and if the upper limit is exceeded, the overall length of the zoom lens will increase, the outer diameter of the first lens group will increase, the cost of the zoom lens will greatly increase, and the size of a camera apparatus using the zoom lens will increase.

In the immediately above-described zoom lens, the first lens group may be mounted at a fixed position. That is, the first lens group may be a fixed lens group that does not move when the zoom lens is zoomed and when a portion of lens groups moves for focusing. For realizing moving of moving lens groups of a zoom lens with a simple mechanism, it is preferable that the zoom lens is configured such that the first lens group is fixed. The first lens group has a largest outer diameter among the lens groups constituting the zoom lens, and consequently, the first lens group is relatively heavy.

Accordingly, it is hard to realize moving of the first lens group with a simple mechanism and reduced power consumption. Further, if the zoom lens is configured such that focusing is performed by the first lens group, the peripheral light quantity at a short photographing distance is greatly reduced as a result of movement of the first lens group, which is undesirable. For avoiding this disadvantage, the first lens group must be made extremely large. By configuring the zoom lens such that the first lens group is fixed as above, as might be expected, the distance from the first lens surface of the zoom lens to the imaging plane is constant through the entire zooming range. In the immediately above-described zoom lens, an aperture diaphragm may be arranged in the vicinity of the third lens group, and in particular, it is preferable that the aperture diaphragm is arranged at a most outside position of the third lens group at a side of the second lens group. Further, it is preferable that the third lens group including the aperture diaphragm is mounted at a fixed position.

Generally, a shutter is provided at the position of the aperture diaphragm. A mechanism for moving the shutter is relatively complicated. Further, if the shutter is moved, vibration at the time of driving the shutter tends to be transmitted to other parts of the zoom lens, causing deterioration of the performance of the zoom lens, e.g. image burring. Thus, it is preferable that the third lens group including a shutter is not moved.

The immediately above-described zoom lens may be configured such that when a focal length of the second lens group is f2, a synthesized focal length of the first lens group through the fifth lens group at the short focal length end is fw, the following conditional formula is satisfied:

$$0.68 < -f2/fw < 2.0.$$

In the above conditional formula, $-f2/fw$ specifies a range of power of the second lens group, and for reducing the overall size of the zoom lens, it is preferable that the above conditional formula is satisfied. If the upper limit is exceeded, the power of the second lens group will be excessively weak, the moving amount of the second lens group when the zoom lens is moved will increase, so that the overall size of the zoom lens will not be reduced. If the lower limit is exceeded, contribution of the fourth lens group to a zooming function will be excessively small, so that the power of the first lens group will be excessively strong and aberration in the first lens group will be excessively increased, and thereby satisfactory imaging performance will not be obtained.

Further, the immediately above-described zoom lens may be configured such that focusing of the zoom lens is achieved by movement of the fifth lens group. Generally, the moving amount of a focusing lens group of a zoom lens when focusing on an object at a same photographing distance is small at the short focal length end and is greater as the focusing lens group is closer to the long focal length end. In the above-described zoom lens of the present invention, the distance between the fourth lens group and the fifth lens group is small at the short focal length end and is greater at the long focal length end. Accordingly, a space in which the fifth lens group is moved for focusing can be obtained without interfering with the fourth lens group at any zooming position. Further, the zoom lens of the present invention is configured such that a shift in the position of an imaging plane of the zoom lens involved in zooming the zoom lens is corrected by the fifth lens group. Therefore, the zoom lens of the present invention has an advantage that a moving mechanism and a control mechanism for correcting a shift in the position of an imaging plane can be combined with those mechanisms for focusing.

Furthermore, the immediately above-described zoom lens may be configured such that each of the first lens group and the second lens group includes three pieces of lens, the fourth lens group includes three or four pieces of lens, and the fifth lens group includes one piece of lens.

For obtaining a high performance zoom lens, each aberration must be suppressed small. For correcting each aberration satisfactorily, one may increase the number of lenses constituting the zoom lens to a certain extent, and aberration in each lens must be suppressed small. However, if the number of lenses constituting the zoom lens increases, the thickness of each lens group increases, so that the overall size of the zoom lens cannot be reduced, and at the same time the construction of the zoom lens is complicated and thereby the cost of the zoom lens is increased.

Therefore, in the above-described zoom lens of the present invention, each of the first lens group and the second lens group is constituted of a relatively small number of lenses, i.e., three pieces of lens, and the fourth lens group is constituted of three or four pieces of lens for reducing an effect of deterioration in the imaging performance due to decentering of each lens of the fourth lens group. Further, the fifth lens group is constituted of one piece of lens. When the fifth lens group is moved for correcting a shift in the position of an imaging plane and for focusing, because the number of lenses constituting the fifth lens group is small and thereby the fifth lens group is light, the fifth lens group can be moved by less energy.

Furthermore, each of the first lens group through the third lens group may include one or more non-spherical surfaces. By configuring the zoom lens as described above, satisfactory imaging performance can be maintained despite that the number of lenses constituting the zoom lens is relatively small.

Still further, the first lens group may be constituted of three pieces of lens, a negative lens and a first positive lens that are joined, and a second positive lens. By configuring the first lens group as above, color aberration of the first lens group can be suppressed small, and at the same time aberration at the positions outside of an optical axe can be suppressed small and the field angle can be made wide. Still further, the second lens group may be constituted of three pieces of lens, a first negative lens, and a second negative lens and a positive lens that are joined. With this configuration of the second lens group, aberration change of the second lens group when the zoom lens is zoomed can be suppressed small, color aberration of the second lens group can be suppressed small, and deterioration of the imaging performance due to decentering in the second lens group can be made small.

Each of the above-described zoom lenses of the present invention can be configured such that a diameter of an aperture diaphragm at the long focal length end is greater than a diameter of an aperture diaphragm at the short focal length end.

In recent years, for achieving high quality of a recorded image, the technology of CCDs have greatly progressed in increasing their resolutions, and a CCD having the total number of picture elements from 3 millions to 4 millions has been materialized. In order to realize both of increasing the resolution and decreasing the size of a CCD, the size of one picture element has been reduced. For example, the size of one picture element of a 1/2.7 type CCD having the total number of picture elements of 4 millions is extremely small, for example, about 2.8 $\mu$m. A zoom lens using a CCD in which the size of a picture element is extremely small as above must have a satisfactory imaging performance at an extremely high evaluation frequency such as 180 line/mm. At this time, if the F number is dark, the imaging performance is decreased because of an effect of diffraction even when no aberration exists in the zoom lens. In each of the above-described zoom lenses of the present invention, by configuring the second lens group and the fourth lens group such that contribution to zooming of the zoom lens is appropriately shared, a change in the F number at the long focal length end from that at the short focal length end is suppressed small. However, in order to increase the performance at the long focal length end at a high evaluation frequency exceeding, for example, 180 line/mm, it is preferable that the F number at the long focal length end is brighter. For this reason, in each of the above-described zoom lenses of the present invention, in order to increase the brightness at the long focal length end, the diameter of the aperture diaphragm at the long focal length end is greater than a diameter of an aperture diaphragm at the short focal length end.

For further decreasing the size of the zoom lens, it is preferable that the fourth lens group is constituted of four pieces of lens and the following two conditional formulas are satisfied:

$$2.25 < \Sigma d/(Z \times y') < 2.9 \text{ and } 0.8 < -f2/fw < 1.45.$$

Each of the above-described zoom lenses can be used for a zoom lens for projection, for example, in a liquid crystal projector, etc. In this case, a liquid crystal as an object is arranged at the fifth lens group side and a light emerged from the first lens group side is enlarged and projected on a screen as an imaging plane.

Each of the above-described zoom lenses may be configured to serve as a photographing zoom lens with the first lens group arranged at the side of an object. By arranging the first lens surface of the first lens group at the side of an object, an image of the object can be reduced and imaged on a light receiving element such as a CCD, so that a satisfactory imaging performance can be obtained.

According to another preferred embodiment of the present invention, a camera apparatus using any one of the above-described zoom lenses for a photographing zoom lens is provided.

The camera apparatus may include a device for converting a photographed image into digital information.

The camera apparatus records an image of an object via any one of the zooms lenses of the present invention configured to be used for a photographing zoom lens. The camera apparatus may be practiced as a silver film camera using a silver film for a recording medium and a digital camera or a digital video camera in which an image of an object is imaged on a light receiving element such as a CCD and information of the object is recorded as digital information. The camera apparatus thus realized is extremely compact in size, has a high zooming ratio and a high image quality, and saves energy consumption.

The above-described camera may be configured such that a light receiving element receiving an image light of an object imaged by a zoom lens has the number of picture elements equal to or greater than 3 millions. As the number of picture elements of a light receiving element increases, the density of recording an image of an object increases. By using a light receiving element having the number of picture elements equal to or greater than 3 millions, the camera apparatus can obtain a photographed image with such a quality that when the photographed image is printed by a printer, the quality of the printed image is equal to or better than that of a photographed image photographed on a silver film by a conventional silver film camera.

According to still another preferred embodiment of the present invention, a portable information terminal apparatus is provided. The portable information terminal apparatus includes any of the above-described camera apparatuses of the present invention and a communication interface for transmitting via communication data recorded by the camera apparatus for example to a personal computer. By using any of the above-described camera apparatuses of the present invention, the portable information terminal apparatus can be remarkably compact and can obtain recorded data of high quality.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 3 is a cross section illustrating a construction of a zoom lens of Example 1 of the embodiment and a positional relation of lens groups constituting the zoom lens at each zooming position;

FIG. 4 is a cross section illustrating a construction of a zoom lens of Example 2 of the embodiment and a positional relation of lens groups constituting the zoom lens at each zooming position;

FIG. 5 is a cross section illustrating a construction of a zoom lens of Example 3 of the embodiment and a positional relation of lens groups constituting the zoom lens at each zooming position;

FIG. 7 is a cross section illustrating a construction of a zoom lens of Example 5 of the embodiment and a positional relation of lens groups constituting the zoom lens at each zooming position;

FIG. 8 is a cross section illustrating a construction of a zoom lens of Example 6 of the embodiment and a positional relation of lens groups constituting the zoom lens at each zooming position;

DETAILED DESCRIPTION OF THE PREFERRED EMBODIMENTS

Figure 1:
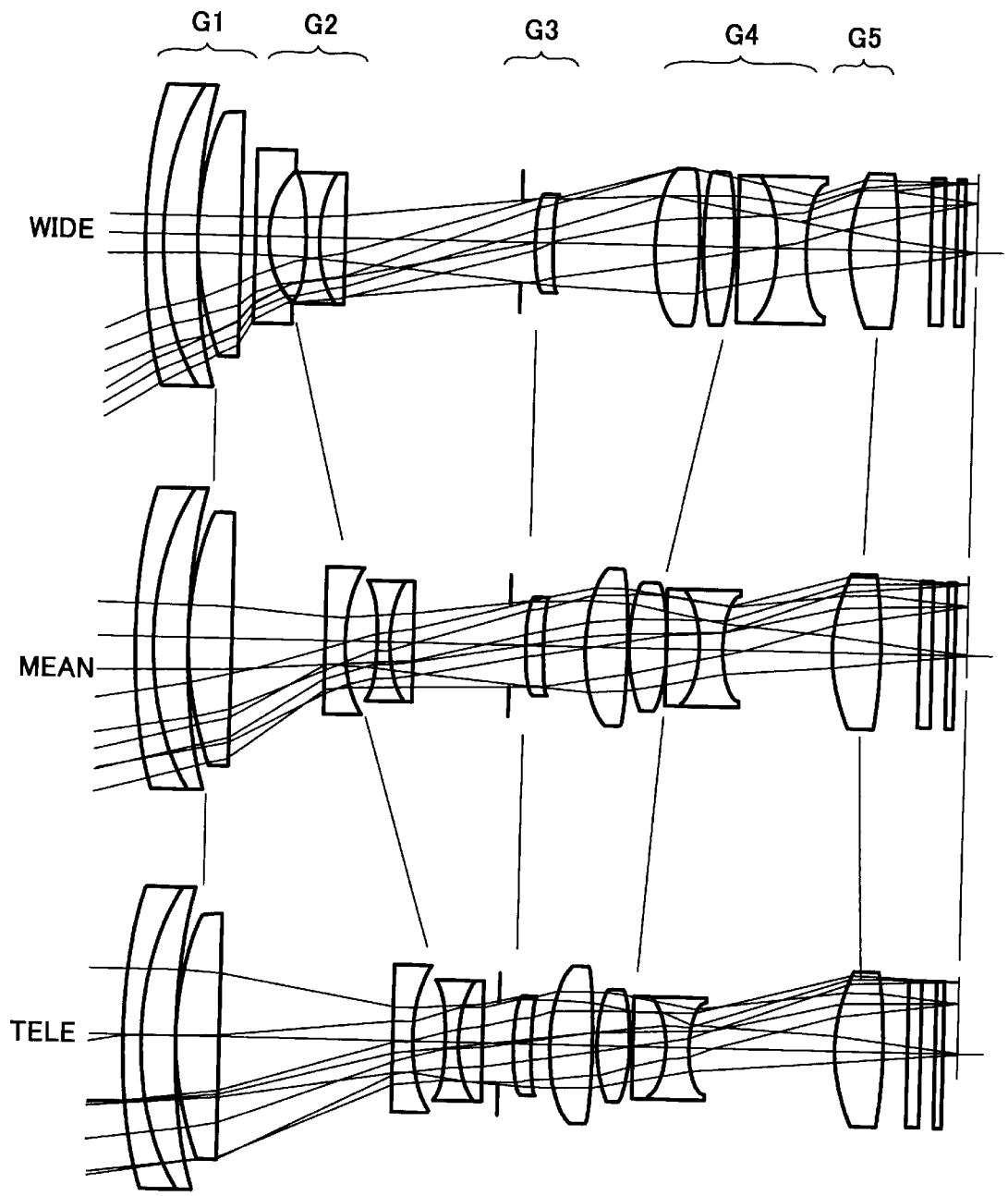
FIG. 1 is a diagram of a zoom lens according to a preferred embodiment of the present invention, illustrating a construction of the zoom lens and a positional relation of lens groups constituting the zoom lens at each zooming position.

Referring now to the drawings, wherein like reference numerals designate identical of corresponding parts throughout the several views, preferred embodiment of the present invention are described.

Figure 2:
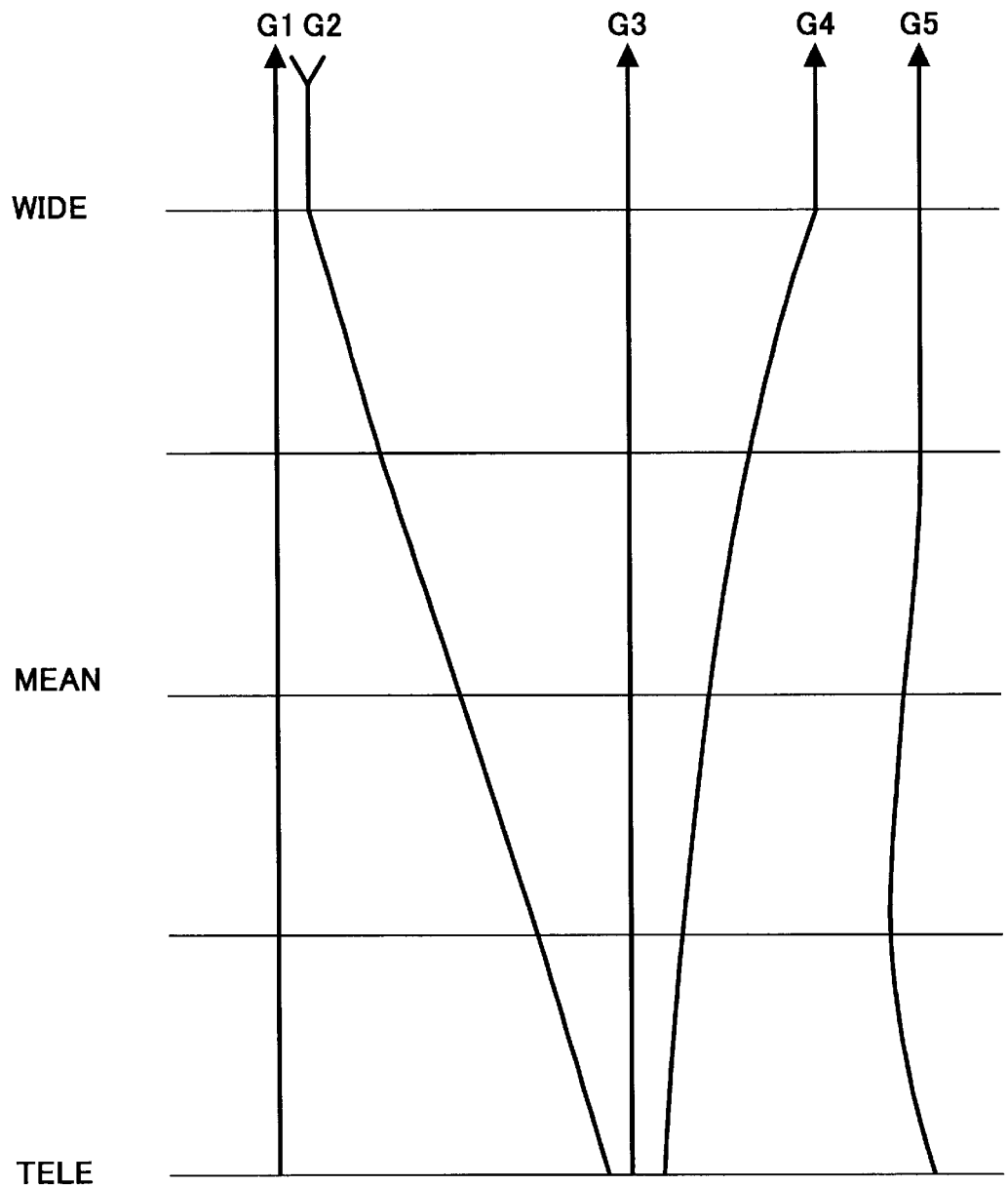
FIG. 2 is a diagram for explaining movement of each lens group of the zoom lens when the zoom lens is zoomed.
Figure 6:
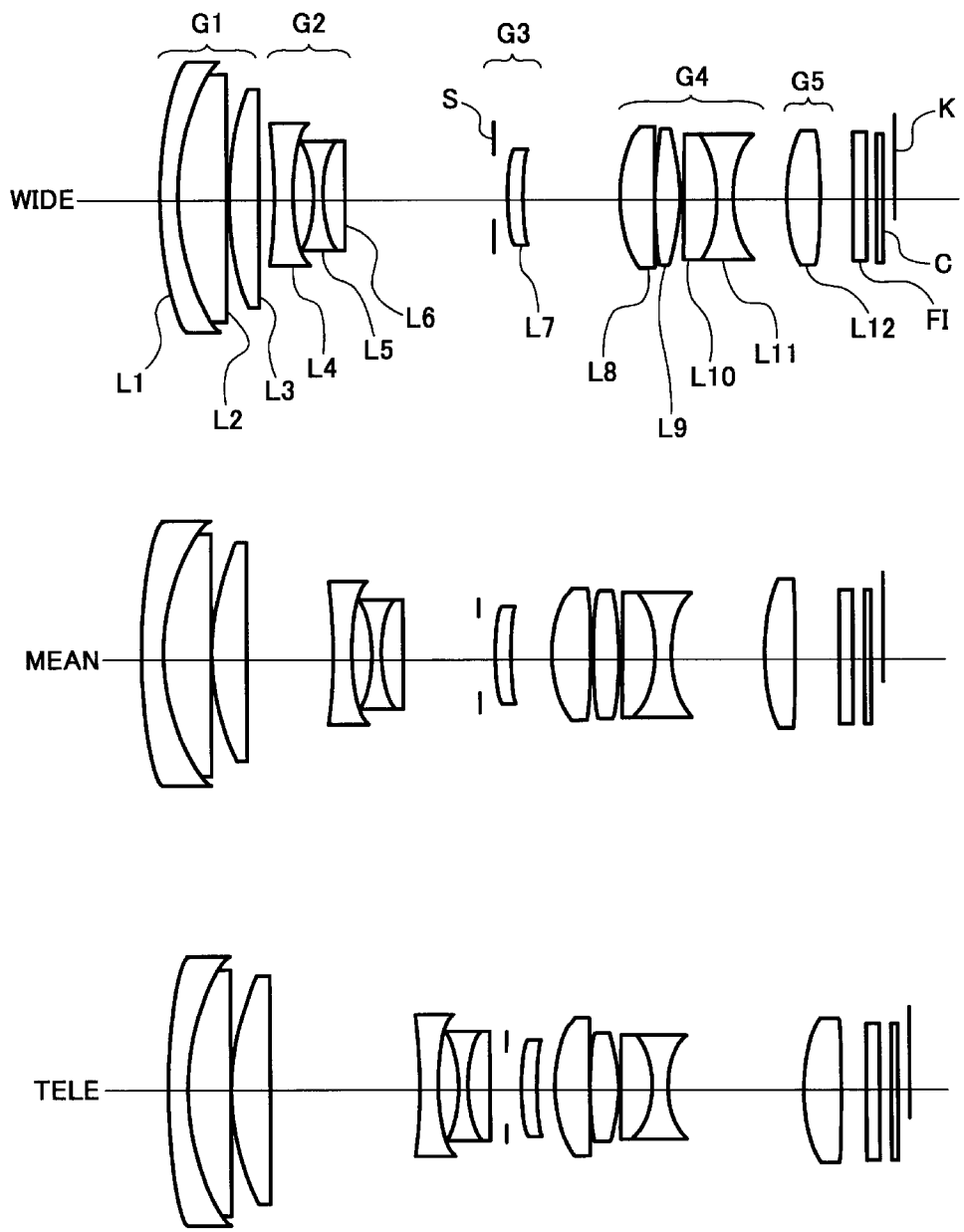
FIG. 6 is a cross section illustrating a construction of a zoom lens of Example 4 of the embodiment and a positional relation of lens groups constituting the zoom lens at each zooming position.
Figure 9:
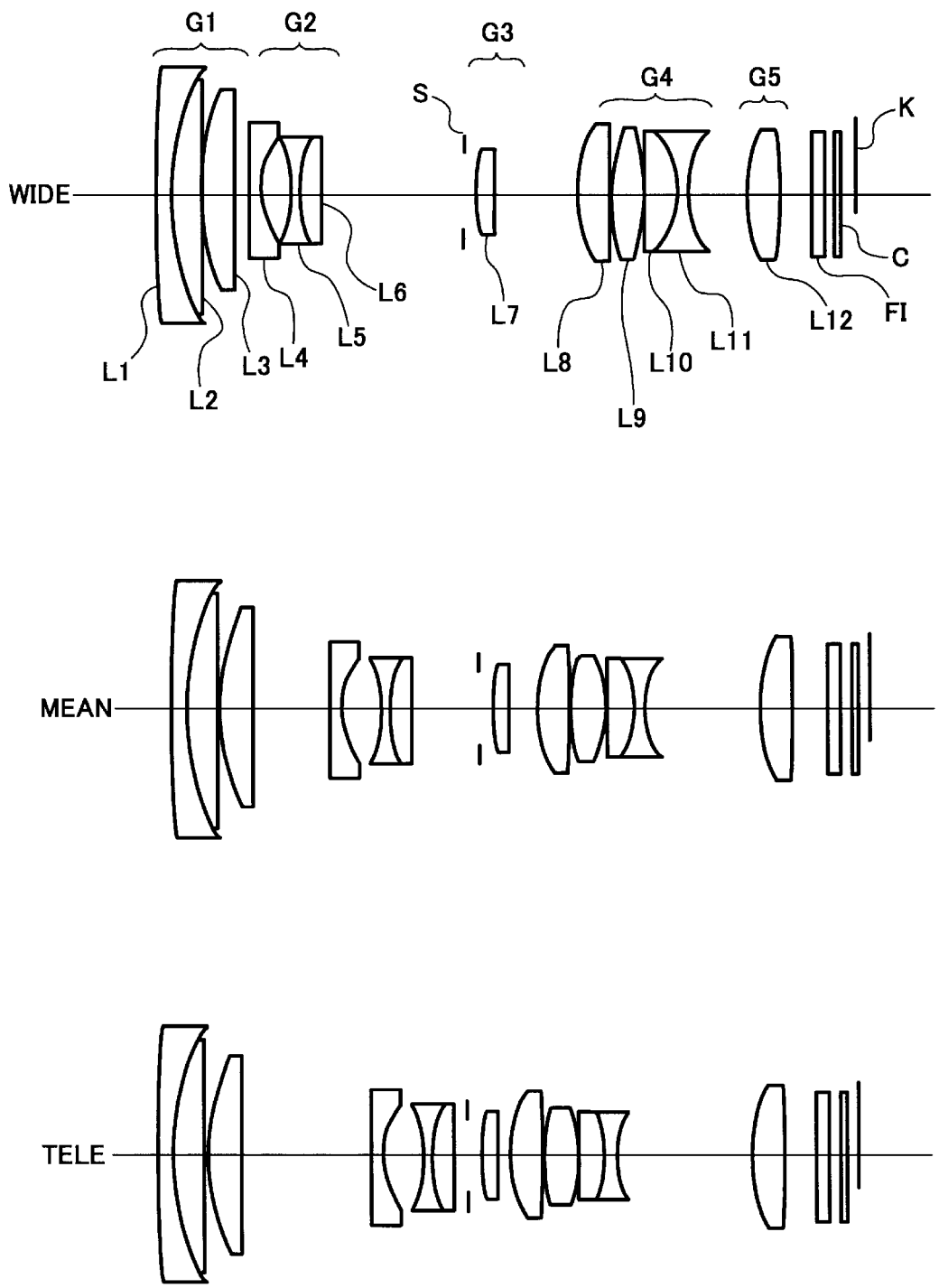
FIG. 9 is a cross section illustrating a construction of a zoom lens of Example 7 of the embodiment and a positional relation of lens groups constituting the zoom lens at each zooming position.
Figure 10:
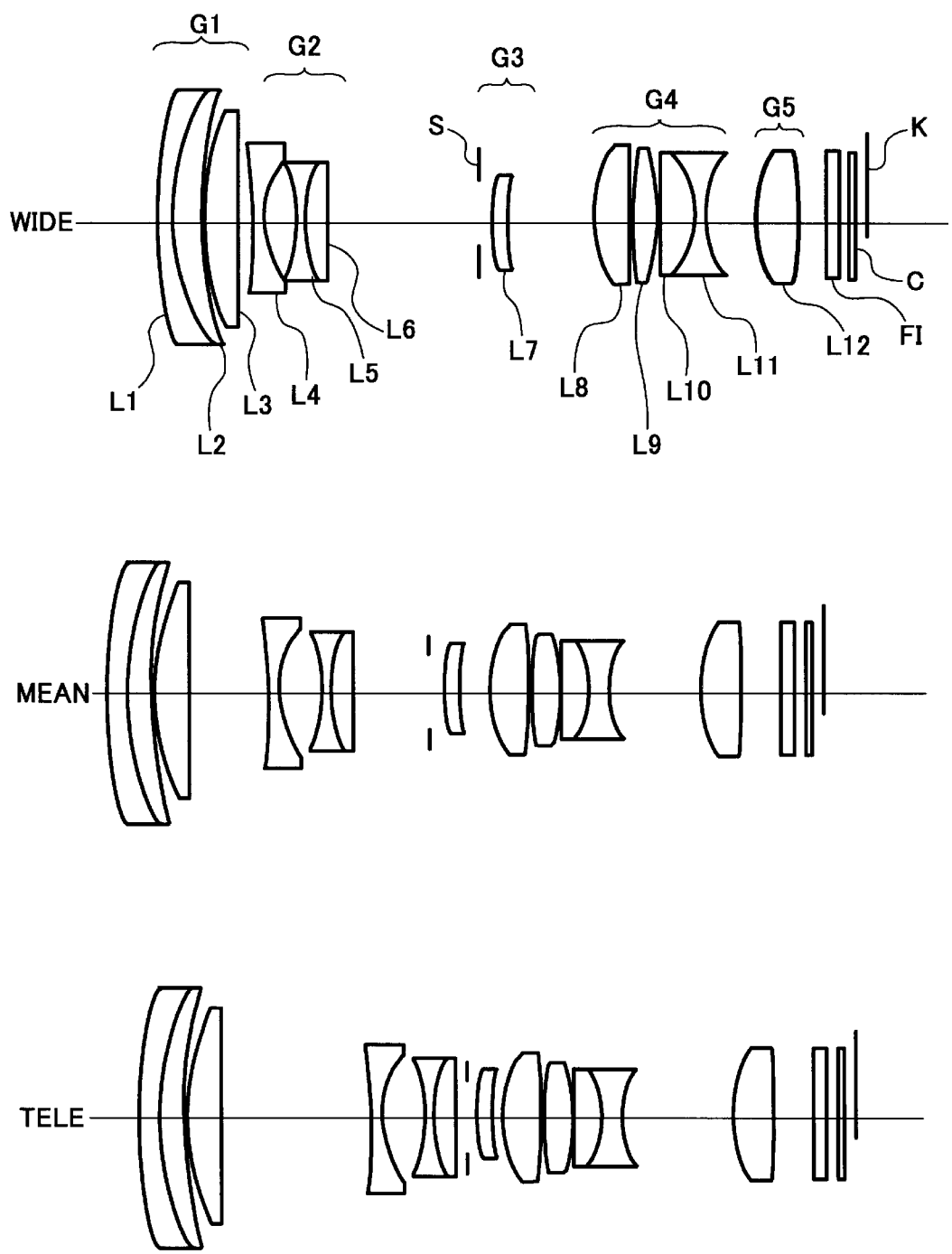
FIG. 10 is a cross section illustrating a construction of a zoom lens of Example 8 of the embodiment and a positional relation of lens groups constituting the zoom lens at each zooming position.
Figure 11:
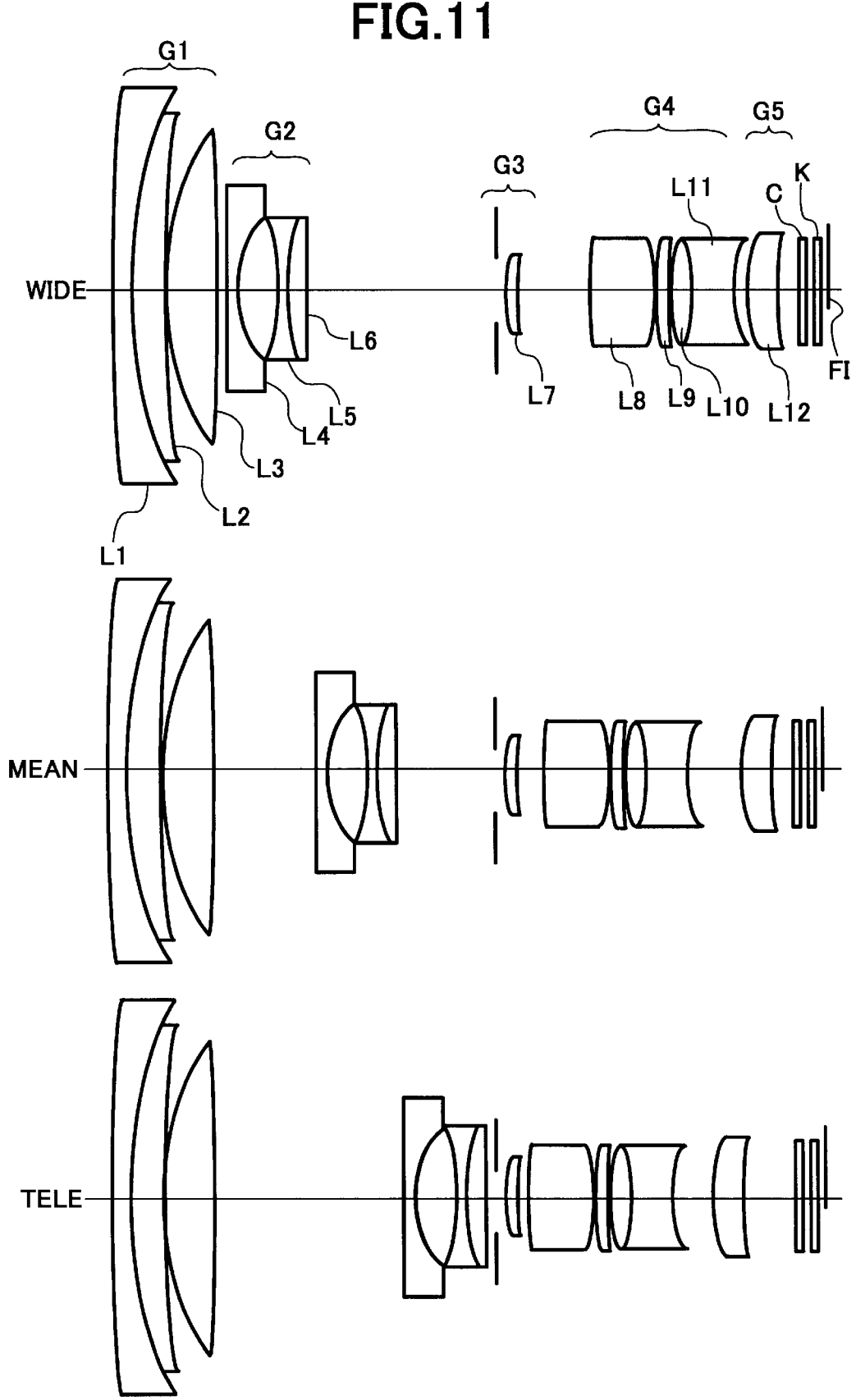
FIG. 11 is a cross section illustrating a construction of a zoom lens of Example 9 of the embodiment and a positional relation of lens groups constituting the zoom lens at each zooming position.
Figure 12:
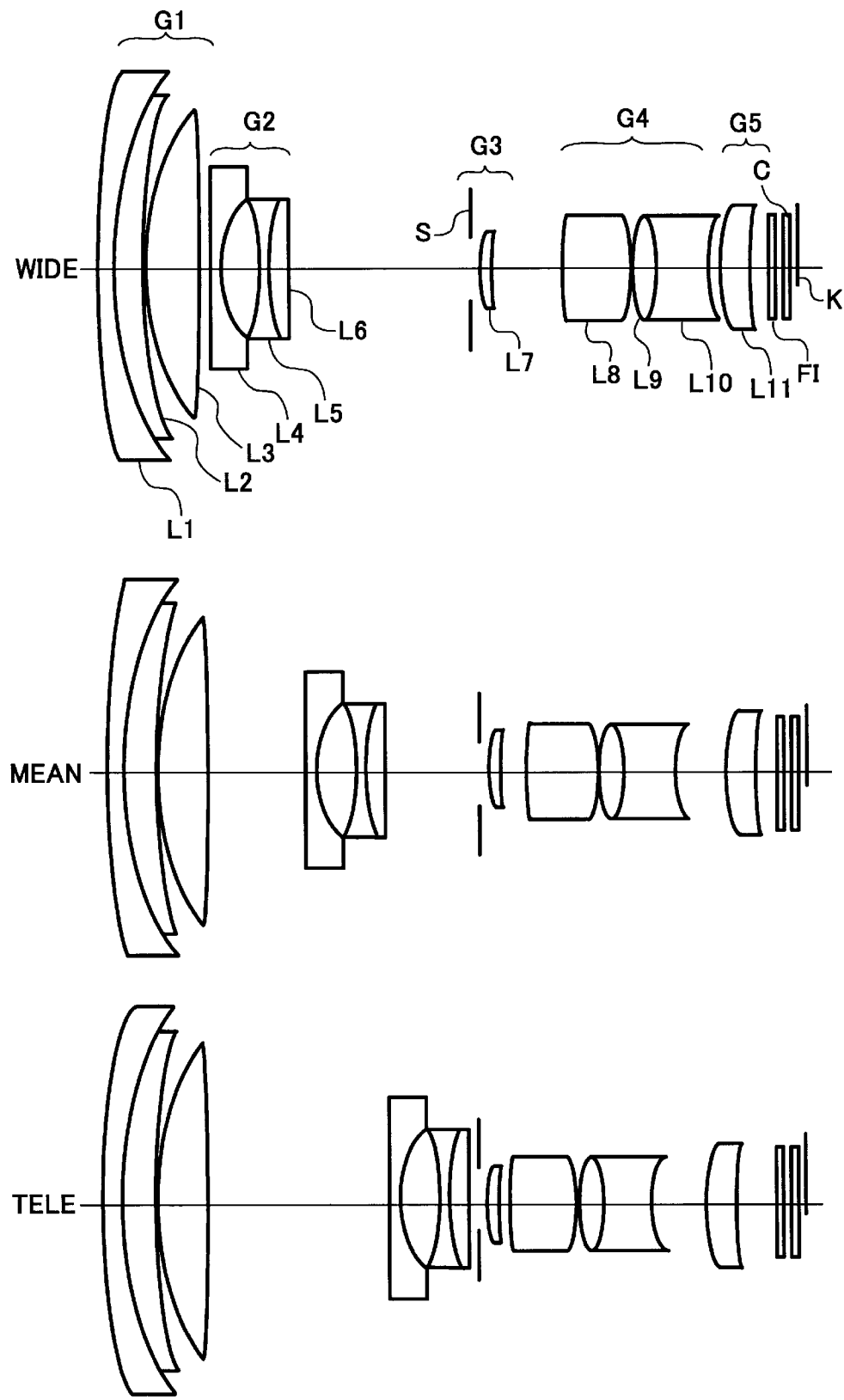
FIG. 12 is a cross section illustrating a construction of a zoom lens of Example 10 of the embodiment and a positional relation of lens groups constituting the zoom lens at each zooming position.
Figure 13:
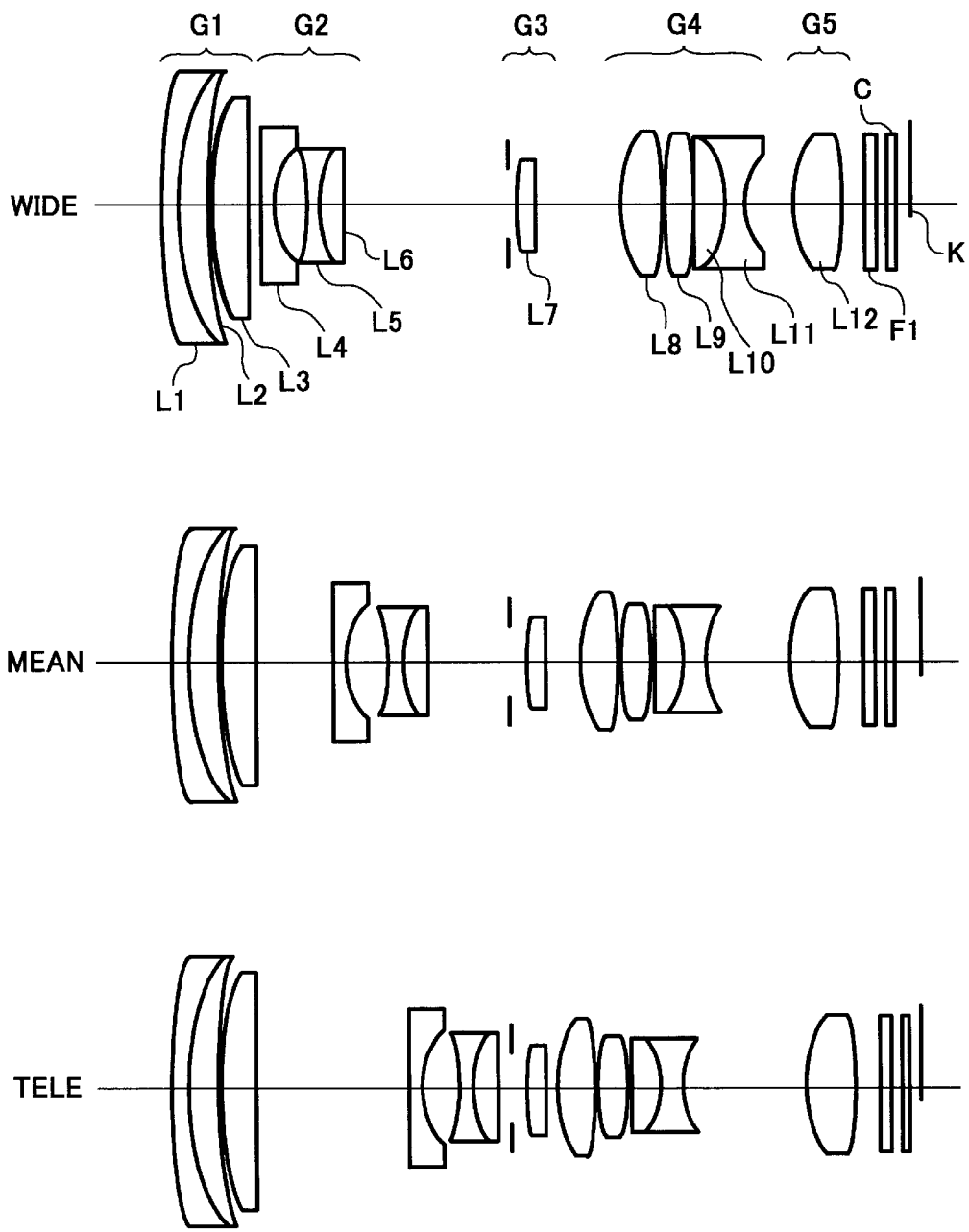
FIG. 13 is a cross section illustrating a construction of a zoom lens of Example 11 of the embodiment and a positional relation of lens groups constituting the zoom lens at each zooming position.

FIG. 1 is a diagram of a zoom lens according to a preferred embodiment of the present invention, illustrating a construction of the zoom lens (of Example 8 of the embodiment) and a positional relation of lens groups constituting the zoom lens at each zooming position. FIG. 2 is a diagram for explaining movement of each lens group of the zoom lens when the zoom lens is zoomed. FIG. 3 illustrates a construction of a zoom lens of Example 1 of the embodiment and a positional relation of lens groups constituting the zoom lens at each zooming position. FIG. 4 illustrates a construction of a zoom lens of Example 2 of the embodiment and a positional relation of lens groups constituting the zoom lens at each zooming position. FIG. 5 illustrates a construction of a zoom lens of Example 3 of the embodiment and a positional relation of lens groups constituting the zoom lens at each zooming position. FIG. 6 illustrates a construction of a zoom lens of Example 4 of the embodiment and a positional relation of lens groups constituting the zoom lens at each zooming position. FIG. 7 illustrates a construction of a zoom lens of Example 5 of the embodiment and a positional relation of lens groups constituting the zoom lens at each zooming position. FIG. 8 illustrates a construction of a zoom lens of Example 6 of the embodiment and a positional relation of lens groups constituting the zoom lens at each zooming position. FIG. 9 illustrates a construction of a zoom lens of Example 7 of the embodiment and a positional relation of lens groups constituting the zoom lens at each zooming position. FIG. 10 illustrates a construction of a zoom lens of Example 8 of the embodiment and a positional relation of lens groups constituting the zoom lens at each zooming position. FIG. 11 illustrates a construction of a zoom lens of Example 9 of the embodiment and a positional relation of lens groups constituting the zoom lens at each zooming position. FIG. 12 illustrates a construction of a zoom lens of Example 10 of the embodiment and a positional relation of lens groups constituting the zoom lens at each zooming position. FIG. 13 illustrates a construction of a zoom lens of Example 11 of the embodiment and a positional relation of lens groups constituting the zoom lens at each zooming position. In FIG. 3 through FIG. 13, symbol f1 denotes a filter, symbol C denotes a CCD cover glass, and symbol K denotes an imaging plane.

Each of the zoom lenses of Example 1 through Example 9 includes a first lens group G1 having a positive refracting power, a second lens group G2 having a negative refracting power, a third lens group G3 having a positive refracting power, a fourth lens group G4 having a positive refracting power, and a fifth lens group G5 having a positive refracting power. The first lens group G1, the second lens group G2, the third lens group G3, the fourth lens group G4, and the fifth lens group G5 are arranged in succession. Each of the zoom lenses is configured such that when zooming from the short focal length end toward the long focal length end, the second lens group G2 moves toward the third lens group G3 and the fourth lens group G4 moves toward the third lens group G3, thereby performing the zooming. A shift in the position of the imaging plane K of the zoom lens due to movement of the second lens group G2 and the fourth lens group G4 is corrected by the fifth lens group G5. Further, when the distance from a first lens surface of the zoom lens at the long focal length end to the imaging plane K is $\Sigma d$, a synthesized focal length of the first lens group G1 through the fifth lens group G5 at the short focal length end is fw, and a synthesized focal length of the first lens group G1 through the fifth lens group G5 at the long focal length end is ft, a following conditional formula is satisfied:

$$1.45 < \Sigma d/(ft-fw) < 2.2.$$

In each of the zoom lenses of Example 1 through Example 9, the first lens group G1 is mounted at a fixed position. Further, the third lens group G3 includes an aperture diaphragm S arranged at a most outside position at the side of the second lens group G2, and the third lens group G3 including the aperture diaphragm S is mounted at a fixed position.

Further, each of the zoom lenses of Example 1 through Example 9 is configured such that focusing of the zoom lens is achieved by movement of the fifth lens group G5. Furthermore, each of the zoom lenses of Example 1 through Example 9 is configured such that the first lens group G1 is positioned at the side of an object, so that the zoom lens can be used for a photographing zoom lens.

Each of the zoom lenses of Example 1 through Example 9 can be also used for a zoom lens for projection in a liquid crystal projector. In this case, a liquid crystal display as an object is arranged at the imaging plane K at the side of the fifth lens group G5 and a radiated light from the side of the first lens group G1 is enlarged by the zoom lens and projected on a screen, etc., as an imaging plane.

Each of the zoom lenses of Example 1 through Example 9 is configured to satisfy, when a synthesized focal length of the first lens group G1 is f1 and a synthesized focal length of the first lens group G1 and the second lens group G2 at the long focal length end is f12t, the following conditional formula;

$$-1.8 < f12t/f1 < -1.1.$$

Further, each of the zoom lenses of Example 1 through Example 9 is configured to satisfy, when a distance between the first lens group G1 and the second lens group G2 at the short focal length end is d1w, a distance between the first lens group G1 and the second lens group G2 at the long focal length end is d1t, a distance between the third lens group G3 and the fourth lens group G4 at the short focal length end is d3w, and a distance between the third lens group G3 and the fourth lens group G4 at the long focal length end is d3t, the following conditional formula;

$$0.3 < (d3w-d3t)/(d1t-d1w) < 0.8.$$

Each of the zoom lenses of Example 1 through Example 9 is configured such that the first lens group G1 includes three pieces of lens, a first lens L1, a second lens L2, and a third lens L3, the second lens group G2 includes three pieces of lens, a fourth lens L4, a fifth lens L5, and a sixth lens L6, the third lens group G3 includes one piece of lens, a seventh lens L7, the fourth lens group G4 includes four pieces of lens, an eighth lens L8, a ninth lens L9, a tenth lens L10, and an eleventh lens L11, the fifth lens group G5 includes one piece of lens, a twelfth lens L12, and each of the second lens group G2 through the fifth lens group G5 includes one or more non-spherical surfaces.

Further, each of the zoom lenses of Example 1 through Example 9 can be configured such that the diameter of the aperture diaphragm S at the long focal length end is greater than a diameter of an aperture diaphragm at the short focal length end. In this case, the diameter of the aperture diaphragm S may be coupled with a zooming mechanism.

Now, the zoom lenses of Example 1 through Example 9 are described. Here, symbol R denotes a radius of curvature of each surface of lenses, or a paraxial radius of curvature when the surface is non-spherical. Symbol D denotes a distance between surfaces of lenses. Symbol Nd denotes a refractive index for a "d" line, and symbol Vd denotes the Abbe number for the d line. Symbol f denotes a synthesized focal length of an entire system of a zoom lens. Symbol F denotes a F number. Symbol ω denotes a half field angle. Symbol y' denotes an image height. Symbol "Wide" denotes a short focal length end, symbol "Mean" denotes a middle focal length, and symbol "Wide" denotes a long focal length end.

Further, the shape of a non-spherical surface is expressed by the following formula;

$$X=\{(1/R) \times Y2\}/\{1+SQRT(1-(1+K) \times (Y/R)2)\}+A4 \times Y4+A6 \times Y6+A8 \times Y8+A10 \times Y10.$$

Here, symbol X represents a distance from a tangent plane at a peak of a non-spherical surface at a height Y from an optical axis, symbol Y represents a height from the optical axis, symbol R represents a paraxial radius of curvature of a non-spherical surface, and symbol K represents a cone multiplier factor, A4, A6, A8, and A10 represent non-spherical surface coefficients, and SQRPT indicates a square root. Further, in the following Tables, E-XY means 10-XY, and N denotes surface number.

FIG. 14 through FIG. 24 illustrate aberration curves with respect to Example 1 through Example 11, respectively. In these figures, symbol SA denotes a spherical aberration and symbol SC denotes a sine condition, and a solid line illustrates a spherical aberration and a dotted line indicates a sine condition. Symbol Ast denotes an astigmatism, and a solid line indicates an astigmatism in a sagittal plane and a dotted line indicates an astigmatism in a meridional plane. Symbol Dis denotes a distortion aberration and symbol Coma denotes a coma. Symbol d denotes a d line (587.56 nm), and symbol g denotes a g line (435.83 nm). Symbols of a d line and a g line are shown in figure at the long focal length end only with respect to the spherical aberration and the astigmatism, and at the short focal length end only with respect to the coma. In Example 1 through Example 11, the image height y' is 4.65 mm.

EXAMPLE 1

TABLE 1

$f = 5.799\sim38.111$, $F = 2.610\sim3.973$, $\omega = 31.113\sim5.247$

| N | R | D | Nd | Vd | Note |
|---|---|---|---|---|---|
| 1 | 43.041 | 1.200 | 1.84666 | 23.8 | First lens |
| 2 | 19.038 | 3.311 | 1.48749 | 70.4 | Second lens |
| 3 | −141.582 | 0.100 | | | |
| 4 | 20.219 | 2.140 | 1.80420 | 46.5 | Third lens |
| 5 | 174.024 | d1(variable) | | | |
| 6 | −28.196 | 0.040 | 1.51940 | 52.1 | Non-spherical surface resin layer |
| 7 | −38.550 | 0.800 | 1.76200 | 40.3 | Fourth lens |
| 8 | 6.610 | 1.799 | | | |
| 9 | −14.056 | 0.800 | 1.48749 | 70.4 | Fifth lens |
| 10 | 8.564 | 1.702 | 1.84666 | 23.8 | Sixth lens |
| 11 | 54.745 | d2(variable) | | | |
| 12 | diaphragm | 1.000 | | | |
| 13 | 9.741 | 0.040 | 1.51940 | 52.1 | Non-spherical surface resin layer |
| 14 | 9.797 | 1.148 | 1.58913 | 61.3 | Seventh lens |
| 15 | 14.533 | d3(variable) | | | |
| 16 | 7.868 | 0.080 | 1.51940 | 52.1 | Non-spherical surface resin layer |
| 17 | 8.385 | 2.889 | 1.48749 | 70.4 | Eighth lens |
| 18 | −28.071 | 0.100 | | | |
| 19 | 19.185 | 0.040 | 1.51940 | 52.1 | Non-spherical surface resin layer |
| 20 | 27.029 | 1.733 | 1.58913 | 61.3 | Ninth lens |
| 21 | −27.646 | 0.100 | | | |
| 22 | 17.156 | 1.285 | 1.67270 | 32.2 | Tenth lens |
| 23 | 35.334 | 0.800 | 1.84666 | 23.8 | Eleventh lens |
| 24 | 5.477 | d4(variable) | | | |
| 25 | 10.730 | 1.988 | 1.48749 | 70.4 | Twelfth lens |
| 26 | −56.429 | 0.040 | 1.51940 | 52.1 | Non-spherical surface resin layer |
| 27 | −81.532 | d5(variable) | | | |
| 28 | 0.0 | 0.927 | 1.54892 | 69.3 | Filter |
| 29 | 0.0 | 0.800 | | | |
| 30 | 0.0 | 0.500 | 1.50000 | 64.0 | CCD cover glass |
| 31 | 0.0 | 0.99 | | | |

TABLE 2 non-spherical surface coefficient:

| N | K | A4 | A6 | A8 | A10 |
|---|---|---|---|---|---|
| 6 | 0.0 | 2.47529E−04 | −3.50886E−06 | 7.03335E−08 | −7.84536E−10 |
| 13 | −2.94642 | 2.55415E−04 | −8.63166E−06 | 7.23626E−07 | −3.09544E−08 |
| 16 | −1.03315 | 2.11610E−05 | 3.63732E−06 | −1.37529E−07 | 9.73975E−10 |
| 19 | −12.59912 | −1.51880E−04 | −7.71000E−06 | 1.89496E−07 | 1.91522E−10 |
| 27 | 0.0 | −1.21598E−04 | −2.05635E−06 | 5.32282E−08 | 6.57147E−10 |

TABLE 3 variable distance:

| | f | d1 | d2 | d3 | d4 | d5 |
|---|---|---|---|---|---|---|
| Wide | 5.799 | 1.435 | 12.196 | 7.251 | 3.870 | 2.886 |
| Mean | 14.804 | 7.345 | 6.286 | 2.686 | 7.768 | 3.552 |
| Tele | 38.111 | 12.581 | 1.051 | 1.010 | 11.253 | 1.744 |

TABLE 4 parameter values of the conditional formula:

| | |
|---|---|
| $\Sigma d/(ft-fw)$ | 1.671 |
| f12t/f1 | −1.635 |
| (d3w−d3t)/(d1t−d1w) | 0.560 |
| $\Sigma d/(Z \times y')$ | 2.348 |
| −f2/fw | 1.143 |

Figure 14B:
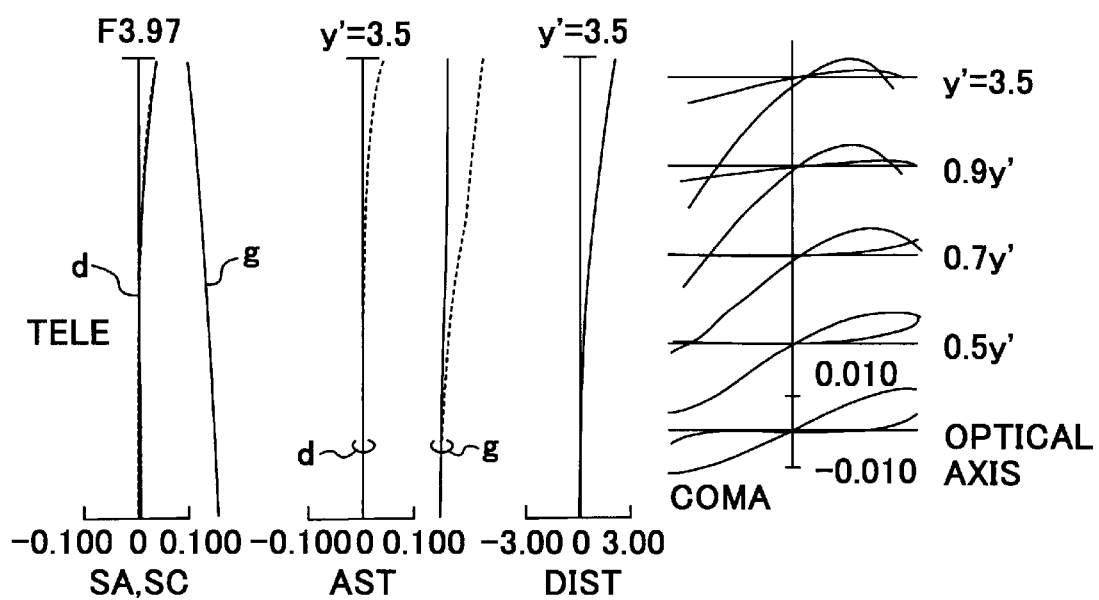
FIG. 14 is a diagram illustrating aberration curves at respective zooming positions of the zoom lens of Example 1.

The construction of the zoom lens of Example1 is illustrated in FIG. 3, and the aberration curves are illustrated in FIG. 14.

EXAMPLE 2

TABLE 5

$f = 5.496\sim31.029$, $F = 2.630\sim3.910$, $\omega = 32.489\sim6.436$

| N | R | D | Nd | Vd | Note |
|---|---|---|---|---|---|
| 1 | 31.327 | 1.200 | 1.84666 | 23.8 | First lens |
| 2 | 17.125 | 3.083 | 1.48749 | 70.4 | Second lens |
| 3 | 177.033 | 0.100 | | | |
| 4 | 21.600 | 2.134 | 1.80420 | 46.5 | Third lens |
| 5 | 255.462 | d1(variable) | | | |
| 6 | −20.730 | 0.040 | 1.51940 | 52.1 | Non-spherical surface resin layer |
| 7 | −31.238 | 0.800 | 1.80610 | 33.3 | Fourth lens |
| 8 | 6.709 | 1.904 | | | |
| 9 | −12.180 | 0.800 | 1.48749 | 70.4 | Fifth lens |
| 10 | 10.480 | 1.805 | 1.84666 | 23.8 | Sixth lens |
| 11 | −64.972 | d2(variable) | | | |
| 12 | diaphragm | 1.000 | | | |
| 13 | 11.132 | 0.040 | 1.51940 | 52.1 | Non-spherical surface resin layer |
| 14 | 11.064 | 1.129 | 1.58913 | 61.3 | Seventh lens |
| 15 | 17.841 | d3(variable) | | | |
| 16 | 8.034 | 0.080 | 1.51940 | 52.1 | Non-spherical |

TABLE 5-continued $f = 5.496\sim31.029$, $F = 2.630\sim3.910$, $\omega = 32.489\sim6.436$

TABLE 5-continued f = 5.496~31.029, F = 2.630~3.910, ω = 32.489~6.436

| N | R | D | Nd | Vd | Note |
|---|---|---|---|---|---|
| | | | | | surface resin layer |
| 17 | 8.803 | 2.757 | 1.48749 | 70.4 | Eighth lens |
| 18 | −23.535 | 0.489 | | | |
| 19 | 19.515 | 0.040 | 1.51940 | 52.1 | Non-spherical surface resin layer |
| 20 | 22.991 | 1.715 | 1.58913 | 61.3 | Ninth lens |
| 21 | −30.463 | 0.100 | | | |
| 22 | 15.964 | 1.408 | 1.64769 | 33.8 | Tenth lens |
| 23 | 71.516 | 0.800 | 1.84666 | 23.8 | Eleventh lens |
| 24 | 5.155 | d4(variable) | | | |
| 25 | 10.168 | 2.216 | 1.48749 | 70.4 | Twelfth lens |
| 26 | −30.672 | 0.040 | 1.51940 | 52.1 | Non-spherical surface resin layer |
| 27 | −37.562 | d5(variable) | | | |
| 28 | 0.0 | 0.927 | 1.54892 | 69.3 | Filter |
| 29 | 0.0 | 0.800 | | | |
| 30 | 0.0 | 0.500 | 1.50000 | 64.0 | CCD cover glass |
| 31 | 0.0 | 0.990 | | | |

TABLE 6 non-spherical surface coefficient:

| N | K | A4 | A6 | A8 | A10 |
|---|---|---|---|---|---|
| 6 | 0.00000 | 4.52605E−04 | −6.88402E−06 | 1.17635E−07 | −1.12305E−09 |
| 13 | −3.48618 | 2.15747E−04 | −1.09049E−05 | 1.31234E−06 | −6.96078E−08 |
| 16 | −1.18470 | −1.54271E−05 | 1.52593E−06 | −1.63490E−07 | 9.46817E−10 |
| 19 | −10.36925 | −1.14874E−04 | −4.06197E−06 | 2.81367E−07 | −6.45640E−10 |
| 27 | 0.00000 | −1.36885E−04 | −4.79430E−06 | 2.58969E−07 | −4.22551E−09 |

TABLE 7 variable distance:

| | f | d1 | d2 | d3 | d4 | d5 |
|---|---|---|---|---|---|---|
| Wide | 5.496 | 1.476 | 12.182 | 7.287 | 2.499 | 2.659 |
| Mean | 13.193 | 7.030 | 6.629 | 2.468 | 7.461 | 2.515 |
| Tele | 31.029 | 12.668 | 0.990 | 1.010 | 9.022 | 2.413 |

TABLE 8 parameter values of the conditional formula:

| | |
|---|---|
| Σd/(ft−fw) | 2.076 |
| f12t/f1 | −1.396 |
| (d3w−d3t)/(d1t−d1w) | 0.561 |
| Σd/(Z × y') | 2.682 |
| −f2/fw | 1.305 |

Figure 15B:
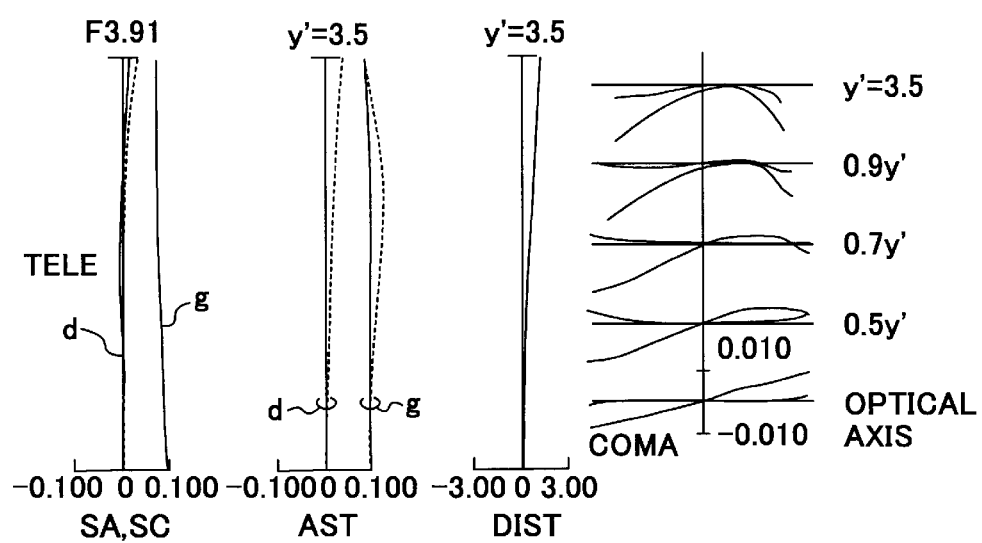
FIG. 15 is a diagram illustrating aberration curves at respective zooming positions of the zoom lens of Example 2.

The construction of the zoom lens of Example 2 is illustrated in FIG. 4, and the aberration curves are illustrated in FIG. 15.

EXAMPLE 3

TABLE 9 f = 5.919~33.448, F=2.893~3.342, ω = 30.597~5.974

| N | R | D | Nd | Vd | Note |
|---|---|---|---|---|---|
| 1 | 26.775 | 1.200 | 1.84666 | 23.8 | First lens |
| 2 | 17.574 | 3.074 | 1.48749 | 70.4 | Second lens |
| 3 | 185.582 | 0.100 | | | |
| 4 | 25.927 | 2.080 | 1.72916 | 54.7 | Third lens |
| 5 | 229.083 | d1(variable) | | | |
| 6 | −31.934 | 0.040 | 1.51940 | 52.1 | Non-spherical surface resin layer |
| 7 | −45.433 | 0.800 | 1.80610 | 33.3 | Fourth lens |
| 8 | 7.198 | 2.003 | | | |
| 9 | −12.589 | 0.800 | 1.48749 | 70.4 | Fifth lens |
| 10 | 10.383 | 1.818 | 1.84666 | 23.8 | Sixth lens |
| 11 | −129.968 | d2(variable) | | | |
| 12 | diaphragm | 1.000 | | | |
| 13 | 12.124 | 0.040 | 1.51940 | 52.1 | Non-spherical surface resin layer |
| 14 | 12.016 | 1.264 | 1.48749 | 70.4 | Seventh lens |
| 15 | 33.618 | d3(variable) | | | |

TABLE 9-continued f = 5.919~33.448, F=2.893~3.342, ω = 30.597~5.974

| N | R | D | Nd | Vd | Note |
|---|---|---|---|---|---|
| 16 | 8.250 | 0.040 | 1.51940 | 52.1 | Non-spherical surface resin layer |
| 17 | 8.301 | 2.730 | 1.48749 | 70.4 | Eighth lens |
| 18 | −51.352 | 0.388 | | | |
| 19 | 22.209 | 1.771 | 1.58313 | 59.5 | Ninth lens |
| 20 | −18.512 | 0.100 | | | |
| 21 | 121.290 | 2.306 | 1.77250 | 49.6 | Tenth lens |
| 22 | −12.334 | 0.800 | 1.71736 | 29.5 | Eleventh lens |
| 23 | 5.530 | d4(variable) | | | |
| 24 | 9.624 | 0.040 | 1.51940 | 52.1 | Non-spherical surface resin layer |
| 25 | 9.255 | 2.595 | 1.51823 | 59.0 | Twelfth lens |
| 26 | −68.652 | d5(variable) | | | |
| 27 | 0.000 | 0.927 | 1.54892 | 69.3 | Filter |
| 28 | 0.0 | 0.800 | | | |
| 29 | 0.0 | 0.500 | 1.50000 | 64.0 | CCD cover glass |
| 30 | 0.0 | 0.990 | | | |

TABLE 10 non-spherical surface coefficient:

| N | K | A4 | A6 | A8 | A10 |
|---|---|---|---|---|---|
| 6 | 0.00000 | 2.06128E−04 | −9.12096E−07 | −4.30561E−08 | 1.09813E−09 |
| 13 | −3.98950 | 1.89732E−04 | −6.50497E−06 | 5.10027E−07 | −1.95031E−08 |
| 16 | −0.64394 | 8.51623E−05 | 1.80838E−06 | −2.98161E−08 | 2.28622E−09 |
| 19 | −28.48660 | −1.01774E−04 | −1.04454E−05 | 1.60236E−07 | −3.04227E−09 |
| 24 | −0.03639 | 7.11396E−05 | 7.22409E−06 | −4.57801E−07 | 1.20054E−08 |

TABLE 11 variable distance:

| | f | d1 | d2 | d3 | d4 | d5 |
|---|---|---|---|---|---|---|
| Wide | 5.919 | 1.383 | 13.898 | 6.684 | 2.501 | 2.327 |
| Mean | 13.989 | 7.918 | 7.363 | 2.189 | 7.080 | 2.244 |
| Tele | 33.448 | 14.291 | 0.990 | 1.010 | 8.758 | 1.745 |

TABLE 12 parameter values of the conditional formula:

| | |
|---|---|
| Σd/(ft−fw) | 1.998 |
| f12t/f1 | −1.467 |
| (d3w−d3t)/(d1t−d1w) | 0.440 |
| Σd/(Z × y') | 2.781 |
| −f2/fw | 1.323 |

Figure 16B:
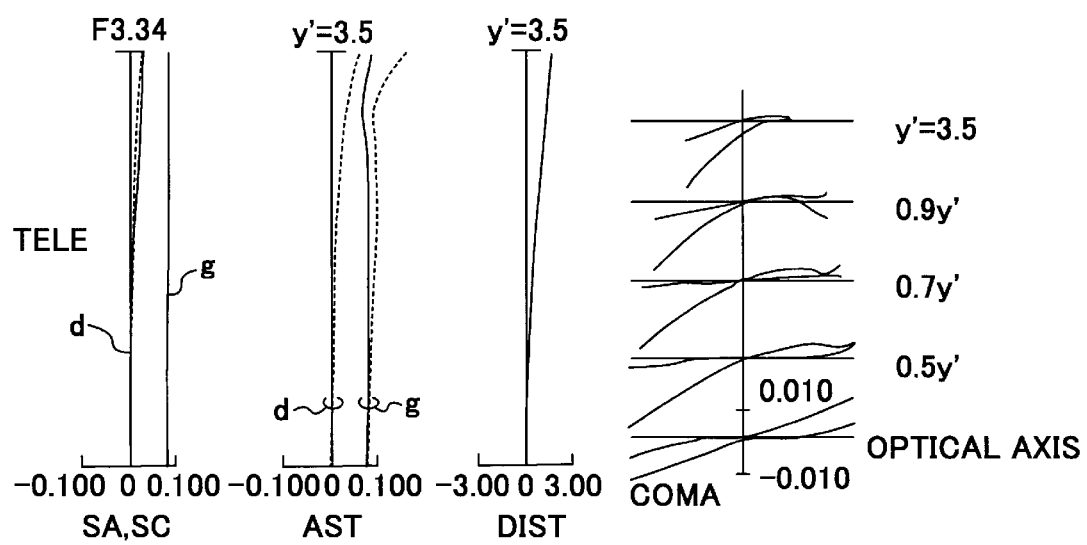
FIG. 16 is a diagram illustrating aberration curves at respective zooming positions of the zoom lens of Example 3.

The construction of the zoom lens of Example 3 is illustrated in FIG. 5, and the aberration curves are illustrated in FIG. 16.

EXAMPLE 4

TABLE 13

$f = 7.595 \sim 35.700, F = 2.704 \sim 3.709, \omega = 31.476 \sim 7.421$

| N | R | D | Nd | Vd | Note |
|---|---|---|---|---|---|
| 1 | 32.055 | 1.200 | 1.84666 | 23.8 | First lens |
| 2 | 15.924 | 3.380 | 1.48749 | 70.4 | Second lens |
| 3 | 119.270 | 0.100 | | | |
| 4 | 19.177 | 2.564 | 1.83500 | 43.0 | Third lens |
| 5 | 189.651 | d1(variable) | | | |
| 6 | −49.582 | 0.040 | 1.51940 | 52.1 | Non-spherical surface resin layer |
| 7 | −76.252 | 0.800 | 1.83400 | 37.3 | Fourth lens |
| 8 | 6.907 | 1.912 | | | |
| 9 | −12.244 | 0.800 | 1.48749 | 70.4 | Fifth lens |
| 10 | 9.724 | 1.642 | 1.84666 | 23.8 | Sixth lens |
| 11 | 210.552 | d2(variable) | | | |
| 12 | diaphragm | 1.000 | | | |
| 13 | 12.252 | 0.040 | 1.51940 | 52.1 | Non-spherical surface resin layer |
| 14 | 12.361 | 1.327 | 1.48749 | 70.4 | Seventh lens |
| 15 | 51.633 | d3(variable) | | | |
| 16 | 8.443 | 0.080 | 1.51940 | 52.1 | Non-spherical surface resin layer |
| 17 | 8.130 | 2.634 | 1.48749 | 70.4 | Eighth lens |
| 18 | −3715.338 | 0.100 | | | |
| 19 | 16.423 | 2.141 | 1.58913 | 61.3 | Ninth lens |
| 20 | −12.735 | 0.100 | | | |
| 21 | 176.172 | 2.413 | 1.73400 | 51.1 | Tenth lens |
| 22 | −6.882 | 0.815 | 1.80610 | 33.3 | Eleventh lens |
| 23 | 6.309 | d4(variable) | | | |
| 24 | 12.715 | 0.040 | 1.51940 | 52.1 | Non-spherical surface resin layer |
| 25 | 11.978 | 2.493 | 1.51742 | 52.2 | Twelfth lens |
| 26 | −61.960 | d5(variable) | | | |
| 27 | 0.000 | 0.927 | 1.54892 | 69.3 | Filter |
| 28 | 0.0 | 0.800 | | | |
| 29 | 0.0 | 0.500 | 1.50000 | 64.0 | CCD cover glass |
| 30 | 0.0 | 0.990 | | | |

TABLE 14 non-spherical surface coefficient:

| N | K | A4 | A6 | A8 | A10 |
|---|---|---|---|---|---|
| 6 | 0.00000 | 1.63442E−04 | −1.36224E−06 | −1.65713E−08 | 7.89957E−10 |
| 13 | −3.13064 | 1.01247E−04 | −3.91250E−06 | 5.13542E−07 | −1.08121E−08 |
| 16 | −0.29473 | 1.62021E−04 | 1.18078E−06 | −1.42046E−07 | 6.10836E−09 |
| 19 | −13.82162 | −2.73543E−04 | −1.26291E−05 | 3.30630E−07 | −7.50756E−09 |
| 24 | 0.07825 | 6.58815E−05 | 2.62084E−06 | −7.92326E−08 | 1.21465E−09 |

TABLE 15 variable distance:

|      | f      | d1     | d2     | d3    | d4     | d5    |
|------|--------|--------|--------|-------|--------|-------|
| Wide | 7.595  | 1.283  | 10.869 | 6.509 | 4.148  | 2.393 |
| Mean | 16.138 | 6.437  | 5.715  | 2.903 | 7.089  | 3.058 |
| Tele | 35.700 | 11.142 | 1.009  | 1.010 | 10.288 | 1.752 |

TABLE 16 parameter values of the conditional formula:

| | |
|---|---|
| $\Sigma d/(ft - fw)$ | 1.921 |
| $f12t/f1$ | −1.389 |
| $(d3w - d3t)/(d1t - d1w)$ | 0.558 |
| $\Sigma d/(Z \times y')$ | 2.471 |
| $-f2/fw$ | 0.927 |

Figure 17B:
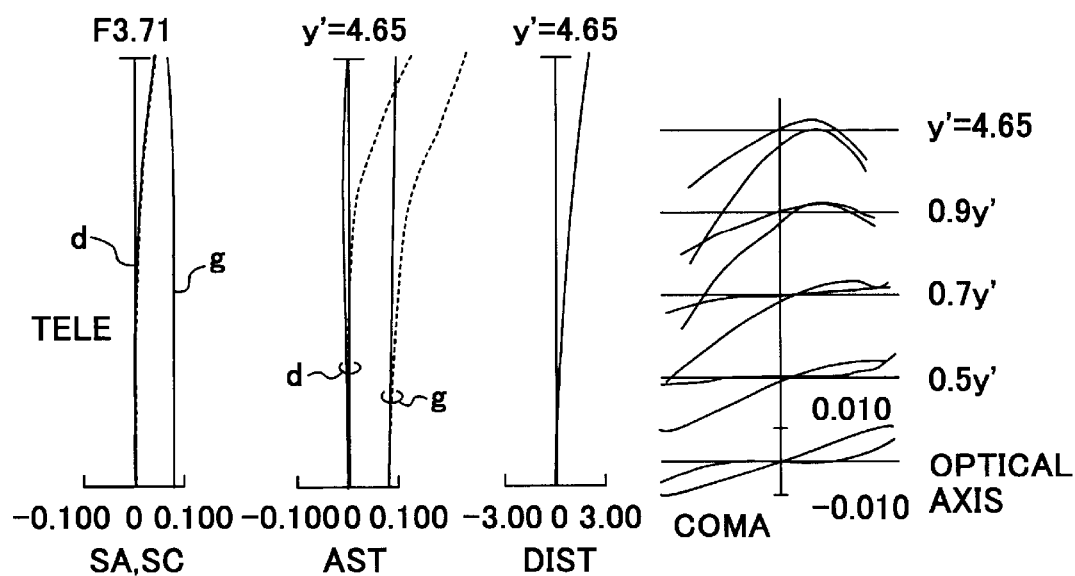
FIG. 17 is a diagram illustrating aberration curves at respective zooming positions of the zoom lens of Example 4.

The construction of the zoom lens of Example 4 is illustrated in FIG. 6, and the aberration curves are illustrated in FIG. 17.

EXAMPLE 5

TABLE 17

$f = 7.170\sim33.688, F = 2.737\sim3.871, \omega = 32.966\sim7.859$

| N  | R         | D           | Nd      | Vd   | Note |
|----|-----------|-------------|---------|------|------|
| 1  | 130.503   | 1.200       | 1.84666 | 23.8 | First lens |
| 2  | 23.226    | 2.837       | 1.48749 | 70.4 | Second lens |
| 3  | −404.423  | 0.100       |         |      | |
| 4  | 18.852    | 0.040       | 1.51940 | 52.1 | Non-spherical surface resin layer |
| 5  | 19.175    | 2.805       | 1.83500 | 43.0 | Third lens |
| 6  | −350.917  | d1(variable)|         |      | |
| 7  | −104.258  | 0.040       | 1.51940 | 52.1 | Non-spherical surface resin layer |
| 8  | −241.841  | 0.800       | 1.83400 | 37.3 | Fourth lens |
| 9  | 6.881     | 2.047       |         |      | |
| 10 | −11.080   | 0.0800      | 1.48749 | 70.4 | Fifth lens |
| 11 | 10.353    | 1.685       | 1.84666 | 23.8 | Sixth lens |
| 12 | 0.000     | d2(variable)|         |      | |
| 13 | diaphragm | 1.000       |         |      | |
| 14 | 12.255    | 0.040       | 1.51940 | 52.1 | Non-spherical surface resin layer |
| 15 | 8.764     | 1.569       | 1.48749 | 70.4 | Seventh lens |
| 16 | 84.710    | d3(variable)|         |      | |
| 17 | 8.306     | 2.796       | 1.48749 | 70.4 | Eighth lens |
| 18 | −72.425   | 0.256       |         |      | |
| 19 | 20.256    | 2.130       | 1.58913 | 61.3 | Ninth lens |
| 20 | −12.766   | 0.100       |         |      | |
| 21 | −131.946  | 2.561       | 1.73400 | 51.1 | Tenth lens |
| 22 | −6.707    | 0.800       | 1.80610 | 33.3 | Eleventh lens |
| 23 | 6.320     | d4(variable)|         |      | |
| 24 | 12.674    | 0.080       | 1.51940 | 52.1 | Non-spherical surface resin layer |
| 25 | 11.936    | 2.423       | 1.51742 | 52.2 | Twelfth lens |
| 26 | −73.067   | d5(variable)|         |      | |
| 27 | 0.000     | 0.927       | 1.54892 | 69.3 | Filter |
| 28 | 0.0       | 0.800       |         |      | |
| 29 | 0.0       | 0.500       | 1.50000 | 64.0 | CCD cover glass |
| 30 | 0.0       | 0.990       |         |      | |

TABLE 18 non-spherical surface coefficient:

| N  | K        | A4           | A6           | A8           | A10          |
|----|----------|--------------|--------------|--------------|--------------|
| 4  | −0.32043 | −8.87884E−06 | −1.14685E−08 | −3.39906E−10 | 2.05579E−12  |
| 7  | 0.00000  | 1.48773E−04  | −3.74802E−06 | 9.59504E−08  | −1.34029E−09 |
| 14 | −2.95553 | 1.07483E−04  | −3.82108E−06 | 3.20149E−07  | −1.19761E−08 |
| 19 | −21.71796| −2.76275E−04 | −1.31731E−05 | 1.89378E−07  | −4.94556E−09 |
| 20 | −0.03829 | 9.21558E−06  | −2.59936E−06 | −1.88757E−07 | −7.95035E−10 |
| 24 | 0.01205  | 6.85989E−05  | 2.41929E−06  | −8.7989E−08  | 1.29775E−09  |

TABLE 19 variable distance:

|      | f      | d1     | d2     | d3    | d4     | d5    |
|------|--------|--------|--------|-------|--------|-------|
| Wide | 7.170  | 1.000  | 11.073 | 7.267 | 2.638  | 2.897 |
| Mean | 16.947 | 6.617  | 5.456  | 3.242 | 6.303  | 3.257 |
| Tele | 33.688 | 11.083 | 1.010  | 1.010 | 10.044 | 1.748 |

TABLE 20 parameter values of the conditional formula:

| | |
|---|---|
| Σd/(ft − fw) | 2.036 |
| f12t/f1 | −1.324 |

TABLE 20 parameter values of the conditional formula:

| | |
|---|---|
| (d3w − d3t)/(d1t − d1w) | 0.621 |
| Σd/(Z x y') | 2.471 |
| −f2/fw | 1.024 |

Figure 18B:
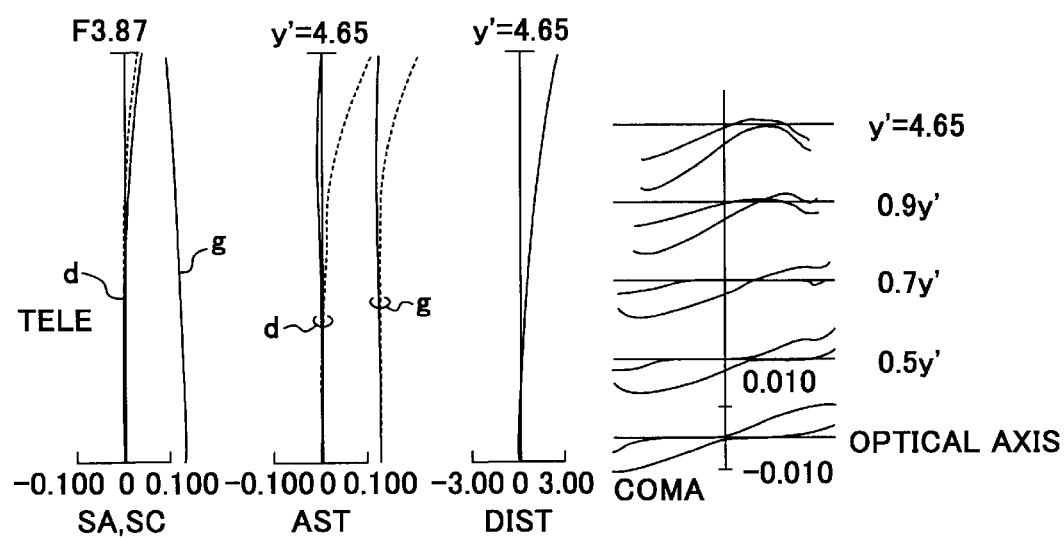
FIG. 18 is a diagram illustrating aberration curves at respective zooming positions of the zoom lens of Example 5.

The construction of the zoom lens of Example 5 is illustrated in FIG. 7, and the aberration curves are illustrated in FIG. 18.

EXAMPLE 6

TABLE 21

$f = 7.350\sim34.568$, $F = 2.752\sim3.861$, $\omega = 32.319\sim7.661$

| N | R | D | Nd | Vd | Note |
|---|---|---|---|---|---|
| 1 | 75.201 | 1.200 | 1.84666 | 23.8 | First lens |
| 2 | 25.353 | 2.261 | 1.62041 | 60.3 | Second lens |
| 3 | 106.637 | 0.100 | | | |
| 4 | 19.454 | 0.040 | 1.51940 | 52.1 | Non-spherical surface resin layer |
| 5 | 19.967 | 2.753 | 1.72916 | 54.7 | Third lens |
| 6 | −144.880 | d1(variable) | | | |
| 7 | −101.235 | 0.040 | 1.51940 | 52.1 | Non-spherical surface resin layer |
| 8 | −159.978 | 0.800 | 1.83400 | 37.3 | Fourth lens |
| 9 | 6.883 | 2.324 | | | |
| 10 | −12.356 | 0.800 | 1.48749 | 70.4 | Fifth lens |
| 11 | 9.176 | 1.806 | 1.80518 | 25.5 | Sixth lens |
| 12 | 564.525 | d2(variable) | | | |
| 13 | diaphragm | 1.000 | | | |
| 14 | 17.798 | 0.040 | 1.51940 | 52.1 | Non-spherical surface resin layer |
| 15 | 17.361 | 1.217 | 1.48749 | 70.4 | Seventh lens |
| 16 | 106.313 | d3(variable) | | | |
| 17 | 8.660 | 0.040 | 1.51940 | 52.1 | Non-spherical surface resin layer |
| 18 | 9.600 | 2.651 | 1.48749 | 70.4 | Eighth lens |
| 19 | −61.154 | 0.100 | | | |
| 20 | 14.254 | 2.704 | 1.58913 | 61.3 | Ninth lens |
| 21 | −12.070 | 0.100 | | | |
| 22 | −68.163 | 2.130 | 1.77250 | 49.6 | Tenth lens |
| 23 | −7.650 | 0.800 | 1.80610 | 33.3 | Eleventh lens |
| 24 | 5.772 | d4(variable) | | | |
| 25 | 12.018 | 0.080 | 1.51940 | 52.1 | Non-spherical surface resin layer |
| 26 | 11.290 | 2.856 | 1.48749 | 70.4 | Twelfth lens |
| 27 | −36.271 | d5(variable) | | | |

TABLE 21-continued $f = 7.350\sim34.568$, $F = 2.752\sim3.861$, $\omega = 32.319\sim7.661$

| N | R | D | Nd | Vd | Note |
|---|---|---|---|---|---|
| 28 | 0.0 | 0.927 | 1.54892 | 69.3 | Filter |
| 29 | 0.0 | 0.800 | | | |
| 30 | 0.0 | 0.500 | 1.50000 | 64.0 | CCD cover glass |
| 31 | 0.0 | 0.990 | | | |

TABLE 22 non-spherical surface coefficient:

| N | K | A4 | A6 | A8 | A10 |
|---|---|---|---|---|---|
| 4 | −0.35429 | −9.11747E−06 | −6.29514E−08 | 4.31692E−10 | −2.93982E−12 |
| 7 | 0.00000 | 9.05116E−05 | −1.72172E−06 | 2.31258E−08 | −2.95845E−10 |
| 14 | −3.94910 | 6.95288E−05 | −5.39196E−06 | 3.34741E−07 | −8.93753E−09 |
| 17 | −1.05943 | −6.86900E−07 | 9.45894E−07 | −1.59002E−07 | 1.20429E−09 |
| 20 | −2.10346 | −5.0281E−05 | 2.48786E−06 | −2.4259E−08 | 3.14395E−09 |
| 21 | −4.43306 | 0.000105935 | −2.411E−07 | −1.3786E−07 | 3.94068E−09 |
| 25 | −0.02729 | 8.55632E−05 | 2.14341E−06 | −1.06558E−07 | 1.59037E−09 |

TABLE 23 variable distance:

| | f | d1 | d2 | d3 | d4 | d5 |
|---|---|---|---|---|---|---|
| Wide | 7.350 | 1.000 | 11.250 | 6.820 | 4.618 | 2.252 |
| Mean | 16.172 | 6.115 | 6.135 | 2.251 | 8.827 | 2.612 |
| Tele | 34.568 | 11.262 | 0.988 | 1.019 | 10.512 | 2.159 |

TABLE 24 parameter values of the conditional formula:

| | |
|---|---|
| Σd/(ft − fw) | 2.021 |
| f12t/f1 | −1.392 |
| (d3w − d3t)/(d1t − d1w) | 0.565 |
| Σd/(Z x y') | 2.515 |
| −f2/fw | 1.017 |

Figure 19B:
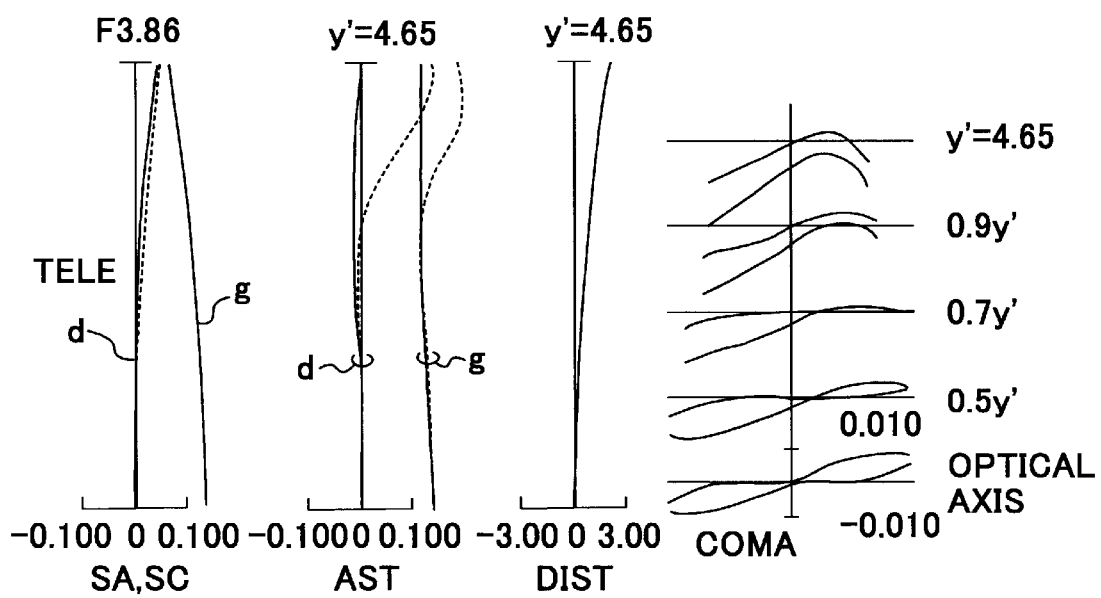
FIG. 19 is a diagram illustrating aberration curves at respective zooming positions of the zoom lens of Example 6.

The construction of the zoom lens of Example 6 is illustrated in FIG. 8, and the aberration curves are illustrated in FIG. 19.

EXAMPLE 7

TABLE 25

$f = 7.723\sim36.282$, $F = 2.797\sim3.898$, $\omega = 31.053\sim7.303$

| N | R | D | Nd | Vd | Note |
|---|---|---|---|---|---|
| 1 | 49.797 | 1.200 | 1.84666 | 23.8 | First lens |
| 2 | 21.817 | 2.219 | 1.62041 | 60.3 | Second lens |
| 3 | 62.402 | 0.100 | | | |
| 4 | 19.435 | 0.040 | 1.51940 | 52.1 | Non-spherical surface resin layer |
| 5 | 19.853 | 2.807 | 1.72916 | 54.7 | Third lens |
| 6 | −158.545 | d1(variable) | | | |

TABLE 25-continued f = 7.723~36.282, F = 2.797~3.898, ω = 31.053~7.303

| N | R | D | Nd | Vd | Note |
|---|---|---|---|---|---|
| 7 | −83.516 | 0.040 | 1.51940 | 52.1 | Non-spherical surface resin layer |
| 8 | −125.642 | 0.800 | 1.83400 | 37.3 | Fourth lens |
| 9 | 7.050 | 2.394 | | | |
| 10 | −13.304 | 0.800 | 1.48749 | 70.4 | Fifth lens |
| 11 | 9.248 | 1.862 | 1.80518 | 25.5 | Sixth lens |
| 12 | 275.529 | d2(variable) | | | |
| 13 | diaphragm | 1.000 | | | |
| 14 | 87.593 | 0.040 | 1.51940 | 52.1 | Non-spherical surface resin layer |
| 15 | 18.156 | 1.234 | 1.48749 | 70.4 | Seventh lens |
| 16 | 160.349 | d3(variable) | | | |
| 17 | 8.518 | 0.040 | 1.51940 | 52.1 | Non-spherical surface resin layer |
| 18 | 9.215 | 2.866 | 1.48749 | 70.4 | Eighth lens |
| 19 | −57.466 | 0.100 | | | |
| 20 | 14.144 | 2.646 | 1.58913 | 61.3 | Ninth lens |
| 21 | −13.070 | 0.100 | | | |
| 22 | −55.638 | 2.061 | 1.77250 | 49.6 | Tenth lens |
| 23 | −8.222 | 0.802 | 1.80610 | 33.3 | Eleventh lens |
| 24 | 5.896 | d4(variable) | | | |
| 25 | 12.020 | 0.080 | 1.51940 | 52.1 | Non-spherical surface resin layer |
| 26 | 11.383 | 3.683 | 1.48749 | 70.4 | Twelfth lens |
| 27 | −37.631 | d5(variable) | | | |
| 28 | 0.0 | 0.927 | 1.54892 | 69.3 | Filter |
| 29 | 0.0 | 0.800 | | | |
| 30 | 0.0 | 0.500 | 1.50000 | 64.0 | CCD cover glass |
| 31 | 0.0 | 0.990 | | | |

TABLE 26 non-spherical surface coefficient:

| N | K | A4 | A6 | A8 | A10 |
|---|---|---|---|---|---|
| 4 | −0.33625 | −8.10669E−06 | −5.99060E−08 | 3.80716E−10 | −2.34989E−12 |
| 7 | 0.00000 | 1.02368E−04 | −2.44629E−06 | 5.29615E−08 | −6.57833E−10 |
| 14 | −4.85445 | 6.35848E−05 | −5.5302E−07 | −1.8991E−07 | 1.07493E−08 |
| 17 | −1.06762 | 2.27487E−06 | 2.35789E−06 | −7.205E−08 | 7.52775E−10 |
| 21 | −7.33160 | 1.52640E−04 | −1.13419E−06 | −4.45159E−08 | 6.89536E−10 |
| 25 | −0.15499 | 8.66173E−05 | 1.63737E−06 | −9.85262E−08 | 1.62684E−09 |

TABLE 27 variable distance:

| | f | d1 | d2 | d3 | d4 | d5 |
|---|---|---|---|---|---|---|
| Wide | 7.723 | 1.000 | 11.329 | 6.736 | 4.212 | 2.345 |
| Mean | 15.069 | 5.893 | 6.435 | 2.544 | 7.923 | 2.825 |
| Tele | 36.282 | 11.323 | 1.006 | 1.010 | 10.547 | 1.736 |

TABLE 28 parameter values of the conditional formula:

| | |
|---|---|
| Σd/(ft − fw) | 1.952 |
| f12t/f1 | −1.477 |
| (d3w − d3t)/(d1t − d1w) | 0.555 |
| Σd/(Z x y') | 2.552 |
| −f2/fw | 0.983 |

Figure 20B:
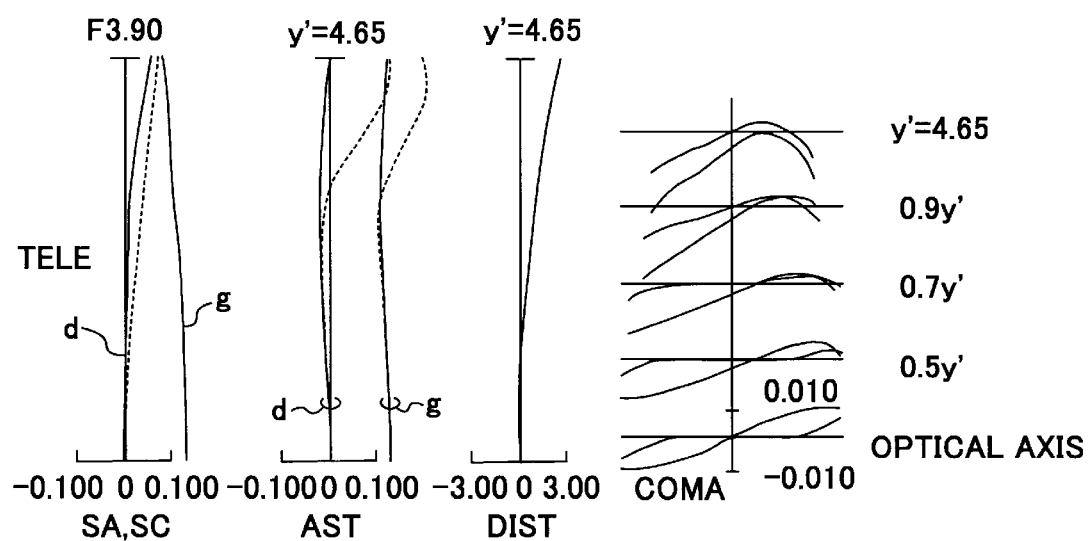
FIG. 20 is a diagram illustrating aberration curves at respective zooming positions of the zoom lens of Example 7.

The construction of the zoom lens of Example 7 is illustrated in FIG. 9, and the aberration curves are illustrated in FIG. 20.

EXAMPLE 8

TABLE 29 f = 7.435~34.930, F = 2.806~4.025, ω = 32.023~7.583

| N | R | D | Nd | Vd | Note |
|---|---|---|---|---|---|
| 1 | 39.039 | 1.200 | 1.84666 | 23.8 | First lens |
| 2 | 19.608 | 2.186 | 1.62041 | 60.3 | Second lens |
| 3 | 38.055 | 0.100 | | | |
| 4 | 19.092 | 0.040 | 1.51940 | 52.1 | Non-spherical surface resin layer |
| 5 | 19.621 | 2.992 | 1.72916 | 54.7 | Third lens |
| 6 | −139.892 | d1(variable) | | | |
| 7 | −59.538 | 0.040 | 1.51940 | 52.1 | Non-spherical surface resin layer |
| 8 | −90.088 | 0.800 | 1.83400 | 37.3 | Fourth lens |
| 9 | 7.288 | 2.427 | | | |
| 10 | −14.597 | 0.835 | 1.48749 | 70.4 | Fifth lens |
| 11 | 9.669 | 1.897 | 1.80518 | 25.5 | Sixth lens |
| 12 | −30287.998 | d2(variable) | | | |
| 13 | Diaphragm | 1.000 | | | |
| 14 | 13.442 | 0.040 | 1.51940 | 52.1 | Non-spherical surface resin layer |
| 15 | 13.284 | 1.154 | 1.48749 | 70.4 | Seventh lens |
| 16 | 24.525 | d3(variable) | | | |
| 17 | 8.750 | 2.923 | 1.48749 | 70.4 | Eighth lens |
| 18 | −29.084 | 0.100 | | | |
| 19 | 15.202 | 2.490 | 1.58913 | 61.3 | Ninth lens |
| 20 | −14.402 | 0.100 | | | |
| 21 | −66.558 | 2.049 | 1.77250 | 49.6 | Tenth lens |

TABLE 29-continued f = 7.435~34.930, F = 2.806~4.025, ω = 32.023~7.583

| N | R | D | Nd | Vd | Note |
|---|---|---|---|---|---|
| 22 | −8.350 | 1.542 | 1.80610 | 33.3 | Eleventh lens |
| 23 | 5.887 | d4(variable) | | | |
| 24 | 11.590 | 0.080 | 1.51940 | 52.1 | Non-spherical surface resin layer |
| 25 | 10.967 | 3.295 | 1.48749 | 70.4 | Twelfth lens |
| 26 | −41.067 | d5(variable) | | | |
| 27 | 0.000 | 0.927 | 1.54892 | 69.3 | Filter |
| 28 | 0.0 | 0.800 | | | |
| 29 | 0.0 | 0.500 | 1.50000 | 64.0 | CCD cover glass |
| 30 | 0.0 | 0.990 | | | |

TABLE 30 non-spherical surface coefficient:

| N | K | A4 | A6 | A8 | A10 |
|---|---|---|---|---|---|
| 4 | −0.33840 | −8.16702E−06 | −6.83542E−08 | 5.01190E−10 | −2.99601E−12 |
| 7 | 0.00000 | 0.000135267 | −2.9502E−06 | 6.64739E−08 | −7.9286E−10 |
| 14 | −3.13741 | 0.000103101 | −1.7393E−06 | −6.7796E−08 | 6.72154E−09 |
| 17 | −1.23838 | −2.90971E−05 | 1.99782E−06 | −7.63156E−08 | 8.21115E−10 |
| 20 | −7.69343 | 1.34716E−04 | −1.11390E−06 | −4.77502E−08 | 7.36021E−10 |
| 24 | −0.12190 | 9.12560E−05 | 2.41138E−06 | −1.39770E−07 | 2.43613E−09 |

TABLE 31 variable distance:

| f | d1 | d2 | d3 | d4 | d5 |
|---|---|---|---|---|---|
| Wide | 7.435 | 1.000 | 11.605 | 6.554 | 3.705 | 2.129 |
| Mean | 15.965 | 6.285 | 6.320 | 2.573 | 7.148 | 2.667 |
| Tele | 34.930 | 11.615 | 0.990 | 1.010 | 9.646 | 1.732 |

TABLE 32 parameter values of the conditional formula:

| | |
|---|---|
| Σd/(ft−fw) | 2.019 |
| fl2t/fl | −1.451 |
| (d3w−d3t)/(dlt−dlw) | 0.522 |
| Σd/(Z × y') | 2.541 |
| −f2/fw | 1.078 |

Figure 21B:
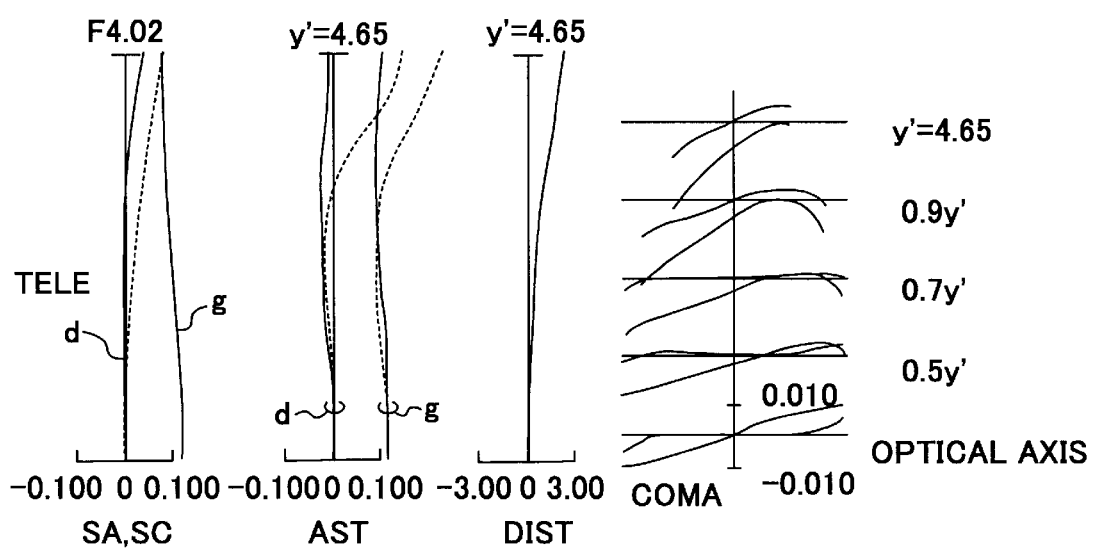
FIG. 21 is a diagram illustrating aberration curves at respective zooming positions of the zoom lens of Example 8.

The construction of the zoom lens of Example 8 is illustrated in FIG. 10, and the aberration curves are illustrated in FIG. 21.

EXAMPLE 9

TABLE 33

$f = 5.847 \sim 29.235, F = 2.797 \sim 3.685, \omega = 38.49 \sim 9.04$

| N | R | D | Nd | Vd | Note |
|---|---|---|---|---|---|
| 1 | 116.295 | 2.000 | 1.75677 | 32.3 | First lens |
| 2 | 32.400 | 3.617 | 1.48700 | 70.4 | Second lens |
| 3 | 90.213 | 0.100 | | | |
| 4 | 21.604 | 5.493 | 1.57081 | 63.2 | Third lens |
| 5 | −191.613 | d1(variable) | | | |
| 6 | −117.926 | 0.800 | 1.80386 | 37.0 | Fourth lens |
| 7 | 8.531 | 4.472 | | | |
| 8 | −15.502 | 0.800 | 1.48700 | 70.4 | Fifth lens |
| 9 | −8.007 | 2.360 | 1.84700 | 23.8 | Sixth lens |
| 10 | −78.902 | d2(variable) | | | |
| 11 | 0.000 | 1.000 | | | |
| 12 | 10.432 | 0.040 | 1.51940 | 52.1 | Non-spherical surface resin layer |
| 13 | 9.434 | 1.227 | 1.54292 | 65.2 | Seventh lens |
| 14 | 16.887 | d3(variable) | | | |
| 15 | 22.010 | 6.817 | 1.48700 | 70.4 | Eighth lens |
| 16 | −18.362 | 0.100 | | | |
| 17 | 23.596 | 1.410 | 1.69304 | 54.1 | Ninth lens |
| 18 | 184.808 | 0.100 | | | |
| 19 | 11.785 | 2.577 | 1.48700 | 70.4 | Tenth lens |
| 20 | −14.867 | 4.109 | 1.84191 | 29.3 | Eleventh lens |
| 21 | 8.572 | d4(variable) | | | |
| 22 | 10.300 | 3.292 | 1.74803 | 50.8 | Twelfth lens |
| 23 | 29.834 | d5(variable) | | | |
| 24 | 0.000 | 0.927 | 1.54892 | 69.3 | Filter |
| 25 | 0.000 | 0.800 | | | |
| 26 | 0.000 | 0.500 | 1.50000 | 64.0 | CCD cover glass |
| 27 | 0.000 | 0.000 | | | |

TABLE 34 non-spherical surface coefficient:

| N | K | A4 | A6 | A8 | A10 |
|---|---|---|---|---|---|
| 4 | −0.19853 | −6.52478E−06 | −7.50313E−09 | −3.47208E−11 | 4.04015E−14 |
| 6 | 62.83109 | 1.15620E−04 | −8.97499E−07 | 6.63622E−09 | −2.86861E−11 |
| 12 | −2.48628 | 1.44484E−04 | −6.75823E−07 | 4.55433E−09 | −7.16329E−10 |

TABLE 35 variable distance:

| | f | d1 | d2 | d3 | d4 | d5 |
|---|---|---|---|---|---|---|
| Wide | 5.847 | 1.000 | 19.676 | 7.347 | 1.419 | 2.037 |
| Mean | 12.979 | 10.426 | 10.270 | 2.732 | 5.671 | 2.385 |
| Tele | 29.235 | 19.656 | 1.000 | 1.040 | 4.167 | 5.592 |

TABLE 36 parameter values of the conditional formula:

| | |
|---|---|
| $\Sigma d/(Z \times y')$ | 3.226 |
| $-f2/fw$ | 1.740 |

Figure 22B:
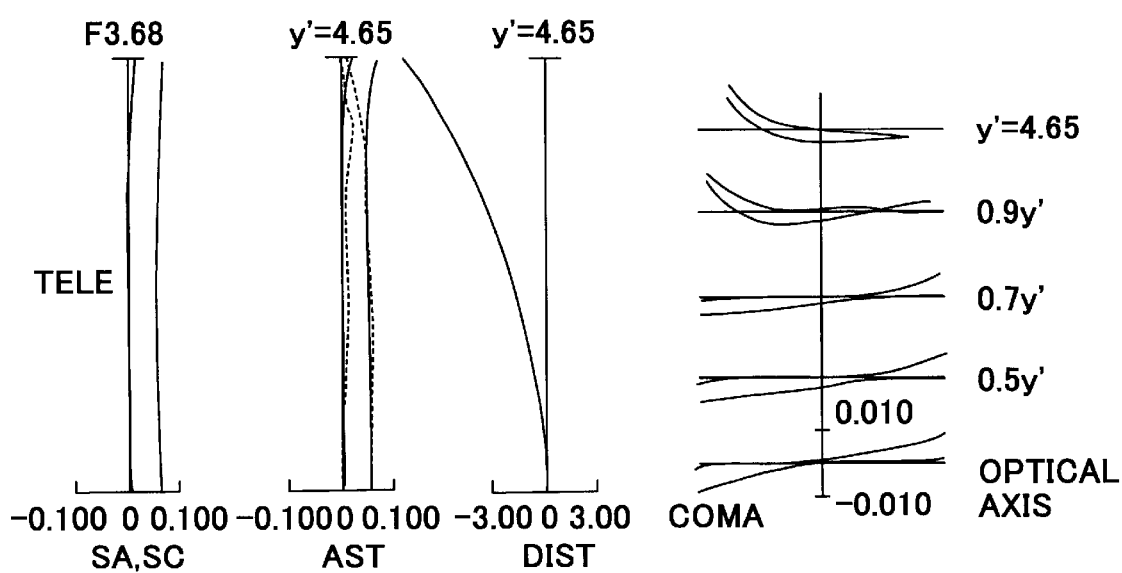
FIG. 22 is a diagram illustrating aberration curves at respective zooming positions of the zoom lens of Example 9.

The construction of the zoom lens of Example 9 is illustrated in FIG. 11, and the aberration curves are illustrated in FIG. 22.

EXAMPLE 10

TABLE 37

$f = 6.030 \sim 30.148, F = 2.791 \sim 3.656, \omega = 37.64 \sim 8.77, y' = 4.65$

| N | R | D | Nd | Vd | Note |
|---|---|---|---|---|---|
| 1 | 63.803 | 2.000 | 1.81097 | 31.0 | First lens |
| 2 | 28.876 | 3.365 | 1.48700 | 70.4 | Second lens |
| 3 | 54.576 | 0.100 | | | |
| 4 | 20.848 | 5.634 | 1.58712 | 62.1 | Third lens |
| 5 | -294.613 | d1(variable) | | | |
| 6 | -131.646 | 0.800 | 1.81166 | 36.3 | Fourth lens |
| 7 | 8.490 | 4.482 | | | |
| 8 | -18.706 | 0.800 | 1.48700 | 70.4 | Fifth lens |
| 9 | 15.586 | 2.468 | 1.84700 | 23.8 | Sixth lens |
| 10 | -171.904 | d2(variable) | | | |
| 11 | 0.000 | 1.000 | | | |
| 12 | 11.383 | 0.040 | 1.51940 | 52.1 | Non-spherical surface resin layer |
| 13 | 11.291 | 1.212 | 1.48700 | 70.4 | Seventh lens |
| 14 | 24.245 | d3(variable) | | | |
| 15 | 32.135 | 7.377 | 1.82467 | 43.9 | Eighth lens |
| 16 | -19.362 | 0.100 | | | |
| 17 | 11.704 | 2.690 | 1.50333 | 68.7 | Ninth lens |
| 18 | -12.781 | 5.315 | 1.84457 | 26.1 | Tenth lens |
| 19 | 9.069 | d4(variable) | | | |
| 20 | 10.021 | 3.594 | 1.77300 | 49.6 | Eleventh lens |
| 21 | 33.303 | d5(variable) | | | |
| 22 | 0.000 | 0.927 | 1.54892 | 69.3 | Filter |
| 23 | 0.000 | 0.800 | | | |
| 24 | 0.000 | 0.500 | 1.50000 | 64.0 | CCD cover glass |
| 25 | 0.000 | 0.990 | | | |

TABLE 38 non-spherical surface coefficient:

| N | K | A4 | A6 | A8 | A10 |
|---|---|---|---|---|---|
| 4 | -0.18390 | -5.93384E-06 | -8.25984E-09 | -2.66810E-11 | -1.57227E-15 |
| 6 | 78.74298 | 9.99536E-05 | -7.18770E-07 | 4.98815E-09 | -1.99274E-11 |
| 12 | -2.90185 | 1.20528E-04 | 2.21640E-06 | -4.04302E-07 | 1.94453E-08 |

TABLE 39 variable distance:

| | f | d1 | d2 | d3 | d4 | d5 |
|---|---|---|---|---|---|---|
| Wide | 6.030 | 1.000 | 19.282 | 7.625 | 0.910 | 2.002 |
| Mean | 13.401 | 10.330 | 9.971 | 2.939 | 5.322 | 2.259 |
| Tele | 30.148 | 19.282 | 1.000 | 1.029 | 5.345 | 4.153 |

TABLE 40 parameter values of the conditional formula:

| | |
|---|---|
| $\Sigma d/(Z \times y')$ | 3.226 |
| $-f2/fw$ | 1.722 |

Figure 23B:
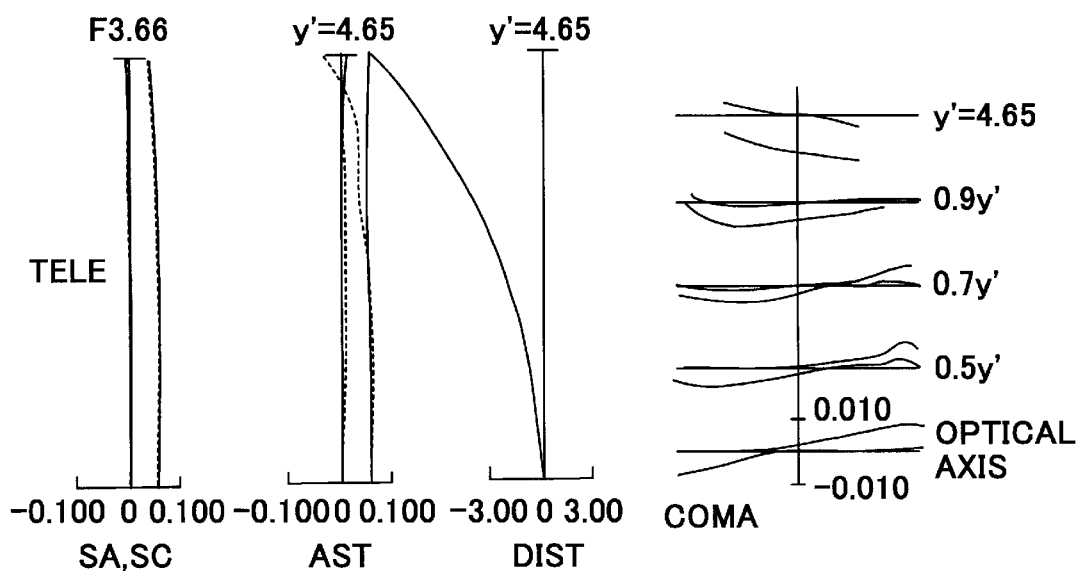
FIG. 23 is a diagram illustrating aberration curves at respective zooming positions of the zoom lens of Example 10.

The construction of the zoom lens of Example 10 is illustrated in FIG. 12, and the aberration curves are illustrated in FIG. 23. In the zoom lenses of Example 1 through Example 10, two types of non-spherical surface are used, a so-called hybrid non-spherical surface which is formed by providing a thin resin layer onto a glass lens so as to be formed in a non-spherical shape, and a so-called glass non-spherical surface in which a surface of a glass lens itself is formed in a non-spherical shape. It is needless to say that any type of non-spherical surface may be used in the zoom lenses of the present invention so long as a non-spherical surface effect can be obtained. In the zoom lenses of Example 1 through Example 10, each hybrid non-spherical surface can be changed to a glass non-spherical surface, and vice versa.

The following Example 11 illustrates a zoom lens of Example 8 in which the hybrid non-spherical surface of the twelfth lens has been changed to a glass non-spherical surface.

EXAMPLE 11

TABLE 41

$f = 7.406 \sim 34.806, F = 2.793 \sim 4.014, \omega = 32.123 \sim 7.610$

| N | R | D | Nd | Vd | Note |
|---|---|---|---|---|---|
| 1 | 39.039 | 1.200 | 1.84666 | 23.8 | First lens |
| 2 | 19.608 | 2.186 | 1.62041 | 60.3 | Second lens |
| 3 | 38.055 | 0.100 | | | |
| 4 | 19.092 | 0.040 | 1.51940 | 52.1 | Non-spherical surface resin layer |
| 5 | 19.621 | 2.992 | 1.72916 | 54.7 | Third lens |
| 6 | -139.892 | d1(variable) | | | |
| 7 | -59.538 | 0.040 | 1.51940 | 52.1 | Non-spherical surface resin layer |

TABLE 41-continued f = 7.406 ~ 34.806, F = 2.793 ~ 4.014, ω = 32.123 ~ 7.610

| N | R | D | Nd | Vd | Note |
|---|---|---|---|---|---|
| 8 | −90.088 | 0.800 | 1.83400 | 37.3 | Fourth lens |
| 9 | 7.288 | 2.427 | | | |
| 10 | −14.597 | 0.835 | 1.48749 | 70.4 | Fifth lens |
| 11 | 9.669 | 1.897 | 1.80518 | 25.5 | Sixth lens |
| 12 | −30287.998 | d2(variable) | | | |
| 13 | Diaphragm | 1.000 | | | |
| 14 | 13.442 | 0.040 | 1.51940 | 52.1 | Non-spherical surface resin layer |
| 15 | 13.284 | 1.154 | 1.48749 | 70.4 | Seventh lens |
| 16 | 24.525 | d3(variable) | | | |
| 17 | 8.750 | 2.923 | 1.48749 | 70.4 | Eighth lens |
| 18 | −29.084 | 0.100 | | | |
| 19 | 15.202 | 2.490 | 1.58913 | 61.3 | Ninth lens |
| 20 | −14.402 | 0.100 | | | |
| 21 | −66.558 | 2.049 | 1.77250 | 49.6 | Tenth lens |
| 22 | −8.350 | 1.542 | 1.80610 | 33.3 | Eleventh lens |
| 23 | 5.887 | d4(variable) | | | |
| 24 | 11.708 | 3.489 | 1.48749 | 70.4 | Twelfth lens |
| 25 | −39.832 | d5(variable) | | | |
| 26 | 0.000 | 0.827 | 1.64892 | 69.3 | Filter |
| 27 | 0.0 | 0.800 | | | |
| 28 | 0.0 | 0.500 | 1.50000 | 64.0 | CCD cover glass |
| 29 | 0.0 | 0.990 | | | |

TABLE 42 non-spherical surface coefficient:

| N | K | A4 | A6 | A8 | A10 |
|---|---|---|---|---|---|
| 4 | −0.33840 | −8.16702E−06 | −6.83542E−08 | 5.01190E−10 | −2.99601E−12 |
| 7 | 0.00000 | 0.000135267 | −2.9502E−06 | 6.64739E−08 | −7.9286E−10 |
| 14 | −3.13741 | 0.00010301 | −1.7393E−06 | −6.7796E−08 | 6.72154E−09 |
| 17 | −1.23838 | −2.90971E−05 | 1.99782E−06 | −7.63156E−08 | 8.21115E−10 |
| 20 | −7.69343 | 1.34716E−04 | −1.11390E−06 | −4.77502E−08 | 7.36021E−10 |
| 24 | −0.15276 | 7.48987E−05 | 5.45133E−06 | −2.92926E−07 | 5.07897E−09 |

TABLE 43 variable distance:

| | f | d1 | d2 | d3 | d4 | d5 |
|---|---|---|---|---|---|---|
| Wide | 7.406 | 1.000 | 11.590 | 6.594 | 3.589 | 2.113 |
| Mean | 15.940 | 6.514 | 6.075 | 2.908 | 6.538 | 2.662 |
| Tele | 34.806 | 11.610 | 1.000 | 1.000 | 9.555 | 1.710 |

TABLE 44 parameter values of the conditional formula:

| Σd/(ft-fw) | 2.025 |
|---|---|
| fl2t/fl | −1.447 |
| (d3w−d3t)/(dlt−dlw) | 0.527 |
| Σd/(Z × y') | 2.540 |
| −f2/fw | 1.082 |

Figure 24B:
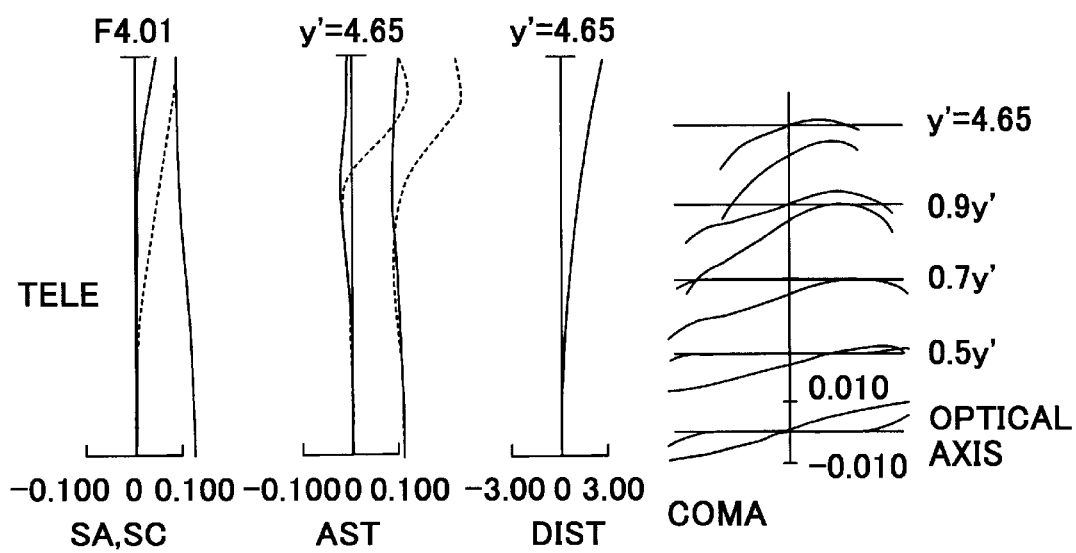
FIG. 24 is a diagram illustrating aberration curves at respective zooming positions of the zoom lens of Example 11.

The construction of the zoom lens of Example 11 is illustrated in FIG. 13, and the aberration curves are illustrated in FIG. 24. Further, it is needless to say that in the zoom lenses of Example 1 through Example 11, all of the non-spherical surfaces can be glass non-spherical surfaces or hybrid non-spherical surfaces.

Example 3 illustrates an exemplary zoom lens in which the diameter of the aperture diaphragm at the long focal length end is made larger than a diameter of an aperture diaphragm at the short focal length end and the F number at the long focal length end is made small.

Every zoom lenses of Example 1 through Example 11 have a relatively wide field angle with a half field angle equal to or exceeding 30° at the short focal length end despite that the number of lenses constituting each zoom lens is relatively small, i.e., 12, and the size of each zoom lens is extremely small, and are satisfactory in performance through the entire range of zooming despite that the zooming ratio is relatively high, i.e., about 4.5 times or more.

Figure 25:
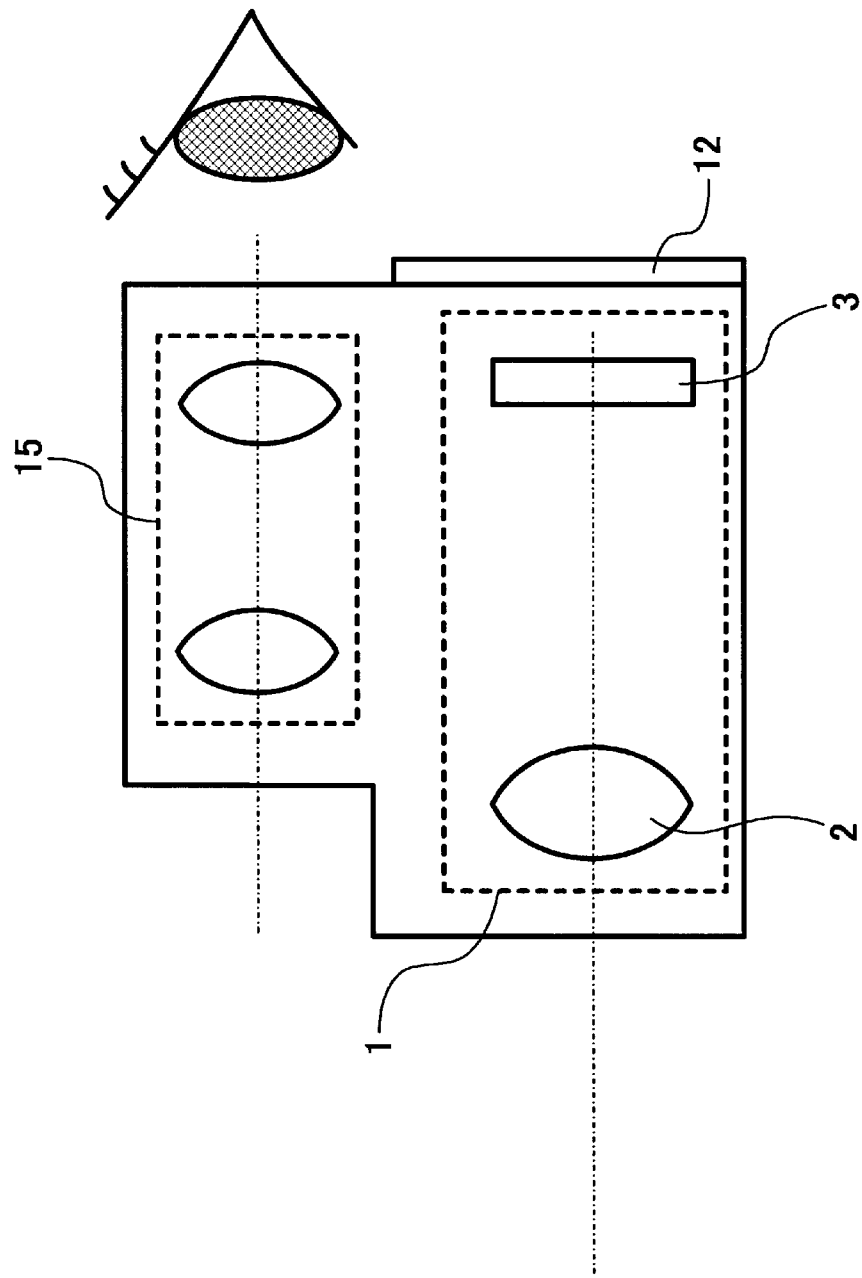
FIG. 25 is a diagram illustrating a concept of a digital camera using a zoom lens of the present invention, according to an embodiment of the present invention.

FIG. 25 illustrates a concept of a digital camera according to an embodiment of the present invention, using a zoom lens of the present invention. A photographing device 1 includes a photographing zoom optical system 2 photographing an object, and a photographing element 3, such as a CCD, a CMOS sensor, etc., photo-electrically converting an image of the object imaged by the photographing zoom optical system 2. A finder optical system 15 for observing a photographing range may be provided. Further, a display device 12 for displaying a photographing range, e.g. a liquid crystal display (LCD) device, may be provided.

Figure 26B:
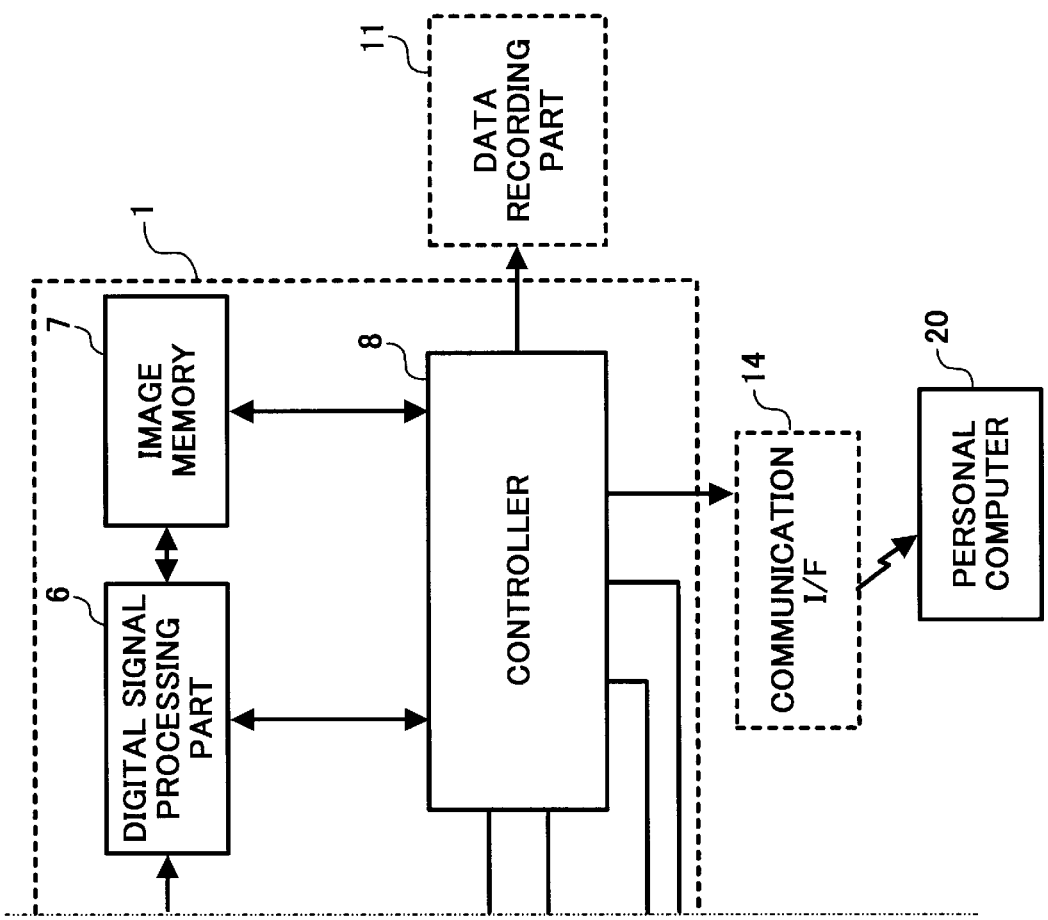
FIG. 26 is a diagram illustrating an exemplary control system of a photographing device of the digital camera, and a concept of a portable information terminal apparatus according to an embodiment of the present invention.

FIG. 26 illustrates an exemplary control system of the photographing device 1. The photographing zoom optical system 2 includes a photographing zoom lens 21 according to any of Example 1 through Example 11, and a mechanical device 22. The mechanical device 22 includes for example an auto-focusing mechanism, a mechanical shutter mechanism, and a zooming mechanism for changing distances between lens groups of the zoom lens 21.

An image of an object is imaged by the photographing zoom optical system 2 on the CCD 3 as the photographing element, and is photo-electrically converted, after color separation by a filter (not shown) arranged on the CCD 3, into analogue image signals of red, green and blue. The analogue signals outputted from the CCD 3 are processed at a signal processing part 4. For example, noise of the image signals is reduced by a correlation double sampling (CDS) circuit (not shown), and the level of the image signals is adjusted by an automatic gain control (AGC) circuit (not shown).

The image signals are then converted to digital image data of an optimal sampling frequency at an A/D converter 5.

The image data is then processed at a digital signal processing part 6. For example, white balancing adjustment for adjusting gains of red and green and separation of the image data into color difference data and brightness data are performed.

The image data is then temporarily stored in an image memory 7.

A controller 8 includes a CPU, a ROM, a RAM, etc., and the CPU performs controlling of the whole system according to a program stored in the ROM using the RAM as a working area. For example, a motor driver 9 drives the mechanical device 22 of the photographing zoom optical system 2 according to a control signal from the controller 8. A timing control circuit 10 performs control of timings of generation of a drive control signal for the CCD 3, signal processing at the signal processing part 4, and A/D conversion at the A/D converter 5.

The digital camera in this example includes a data recording part 11 for recording a photographed image in a recording medium, such as a flash memory card, etc. The digital camera further includes the display device 12 for displaying a photographing range, e.g. a liquid crystal display (LCD) device, as described earlier.

Further, the digital camera may include a strobe device 13 for photographing a dark object. When an object is dark, by illuminating the object by the strobe device 13, photographing of the dark object is enabled.

FIG. 26 further illustrates a concept of a portable information terminal apparatus according to an embodiment of the present invention. As illustrated in figure, the portable information terminal apparatus includes the above-described digital camera apparatus of the present invention and a communication I/F 14 for transmitting data recorded by the digital camera to a personal computer 20, for example, via communication. Thus, by incorporating a communication function into a digital camera of the present invention, a compact, light, inexpensive, and energy saving information terminal apparatus is realized.

Figure 27:
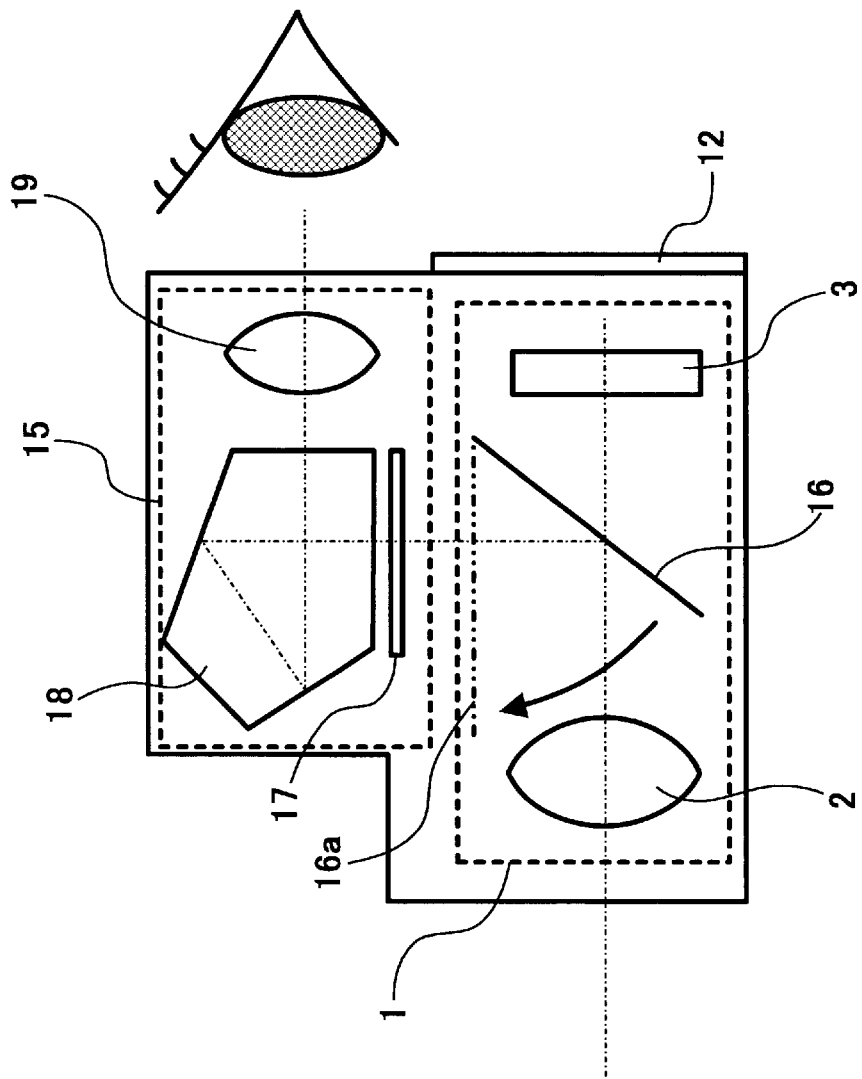
FIG. 27 is a diagram illustrating a concept of a single lens reflex type camera using a zoom lens of the present invention.

FIG. 27 illustrates a major part of a single lens reflex type digital camera according to an embodiment of the present invention. The photographing zoom optical system 2 includes any of the zoom lenses of Example 1 through Example 11, and the CCD 3 is arranged via a focal plane type shutter (not shown) in a predetermined position at a rear side of the optical system 2.

A mirror 16 is arranged between the shutter and the photographing zoom optical system 2. The mirror 16 is normally supported at the angle of 45° relative to an optical axis of the optical system 2 so that a light flux passing the photographing zoom optical system 2 is reflected by a reflecting surface of the mirror 16 upward to serve as an observing light flux. When photographing, the mirror 16 is moved upward to the position illustrated by a dotted line 16a, and thereby a light flux passing the photographing zoom optical system 2 advances straight to serve as a photographing light flux imaging an image of a photographed object on the CCD 3.

A focal point plate 17 is arranged above the mirror 16 and an incident surface of a pentagonal prism 18 is arranged above the focal point plate 17. An eyepiece lens 19 is arranged at the rear of an emerging surface of the pentagonal prism 18, so that an erect image of an object having no parallax can be observed through the eyepiece lens 19.

A part of the mirror 16 can be a half mirror surface for separating a distance measuring light flux, and a known auto-focusing optical system may be provided at the rear of the mirror 16. Further, by arranging a silver film instead of the CCD 3, a single lens reflex camera using a silver film can be realized.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Applications NO. 2001-333060 and No. 2002-188076 filed in the Japanese Patent Office on Oct. 30, 2001 and Jun. 27, 2002, respectively, and the entire contents of which are hereby incorporated by reference.

What is claimed is:

1. A zoom lens, comprising:

a first lens group having a positive refracting power;

a second lens group having a negative refracting power;

a third lens group having a positive refracting power;

a fourth lens group having a positive refracting power; and a fifth lens group having a positive refracting power, wherein the first lens group, the second group lens, the third lens group, the fourth lens group, and the fifth lens group are arranged in succession, wherein the zoom lens is configured such that when zooming from a short focal length end toward a long focal length end, the second lens group lens moves toward the third lens group and the fourth lens group moves toward a side of the third lens group, and the fifth lens group corrects the zooming and a shift in a position of an imaging plane of the zoom lens caused by movement of the second lens group and the fourth lens group, and wherein when a distance from a first lens surface of the zoom lens to the imaging plane of the zoom lens at the long focal length end is $\Sigma d$, a synthesized focal length of the first lens group through the fifth lens group is fw, and a synthesized focal length of the first lens group through the fifth lens group is ft, a following conditional formula is satisfied:

$$1.45 < \Sigma d/(ft-fw) < 2.2.$$

2. The zoom lens according to claim 1, wherein the first lens group is mounted at a fixed position.

3. The zoom lens according to claim 1, wherein the third lens group is mounted at a fixed position and includes an aperture diaphragm arranged at an outermost position at a side of the second lens group.

4. The zoom lens according to claim 1, wherein focusing of the zoom lens is achieved by movement of the fifth lens group.

5. The zoom lens according to claim 1, wherein when a synthesized focal length of the first lens group is f1 and a synthesized focal length of the first lens group and the second lens group at the long focal length end is f12t, a following conditional formula is satisfied:

$$-1.8 < f12t/f1 < -1.1.$$

6. The zoom lens according to claim 1, wherein when a distance between the first lens group and the second lens group at the short focal length end is d1w, a distance between the first lens group and the second lens group at the long focal length end is d1t, a distance between the third lens group and the fourth lens group at the short focal length end is d3w, and a distance between the third lens group and the fourth lens group at the long focal length end is d3t, a following conditional formula is satisfied:

$$0.3 < (d3w-d3t)/(d1t-d1w) < 0.8.$$

7. The zoom lens according to claim 1, wherein each of the first lens group and the second lens group includes three pieces of lens, the fourth lens group includes four pieces of lens, and the fifth lens group includes one piece of lens, and wherein each of the second lens group through the fifth lens group includes one or more non-spherical surfaces.

8. The zoom lens according to claim 1, wherein a diameter of an aperture diaphragm at the long focal length end is greater than a diameter of an aperture diaphragm at the short focal length end.

9. The zoom lens according to claim 1, wherein the zooms lens is configured to serve as a photographing zoom lens with the first lens group arranged at a side of an object.

10. A zoom lens comprising:

a first lens group having a positive refracting power;

a second lens group having a negative refracting power;

a third lens group having a positive refracting power;

a fourth lens group having a positive refracting power; and a fifth lens group having a positive refracting power, wherein the first lens group, the second group lens, the third lens group, the fourth lens group, and the fifth lens group are arranged in succession, wherein the zoom lens is configured such that when zooming from a short focal length end toward a long focal length end, at least a distance between the first lens group and the second lens group increases, and a distance between the second lens group and the third lens group and a distance between the third lens group and the fourth lens group decrease, and wherein when a distance from a first lens surface of the zoom lens to an imaging plane of the zoom lens at the long focal length end is $\Sigma d$, an image height is y', and a zooming ratio is Z, a following conditional formula is satisfied:

$$\Sigma d/(Z \times y') < 3.5.$$

11. The zoom lens according to claim 10, wherein the first lens group is mounted at a fixed position.

12. The zoom lens according to claim 10, wherein the third lens group is mounted at a fixed position and includes an aperture diaphragm arranged at an outermost position at a side of the second lens group.

13. The zoom lens according to claim 10, wherein when a focal length of the second lens group is f2, a synthesized focal length of the first lens group through the fifth lens group at the short focal length end is fw, a following conditional formula is satisfied:

$$0.68 < -f2/fw < 2.0.$$

14. The zoom lens according to claim 10, wherein focusing of the zoom lens is achieved by movement of the fifth lens group.

15. The zoom lens according to claim 10, wherein each of the first lens group and the second lens group includes three pieces of lens, the fourth lens group includes three or four pieces of lens, and the fifth lens group includes one piece of lens.

16. The zoom lens according to claim 15, wherein each of the first lens group through the third lens group includes one or more non-spherical surfaces.

17. The zoom lens according to claim 15, wherein the first lens group includes a negative lens and a first positive lens that are joined, and a second positive lens.

18. The zoom lens according to claim 15, wherein the second lens group includes a first negative lens, and a second negative lens and a positive lens that are joined.

19. The zoom lens according to claim 10, wherein a diameter of an aperture diaphragm at the long focal length end is greater than a diameter of an aperture diaphragm at the short focal length end.

20. The zoom lens according to claim 10, wherein the zooms lens is configured to serve as a photographing zoom lens with the first lens group arranged at a side of an object.

21. A camera apparatus comprising:

a photographing zoom optical system imaging an image of an object; and a light receiving element receiving a light of the image of the object imaged by the photographing zoom optical system, wherein the photographing zoom optical system includes a zoom lens having a first lens group having a positive refracting power, a second lens group having a negative refracting power, a third lens group having a positive refracting power, a fourth lens group having a positive refracting power, and a fifth lens group having a positive refracting power, wherein the first lens group, the second group lens, the third lens group, the fourth lens group, and the fifth lens group are arranged in succession, wherein the zooms lens is configured to serve as a photographing zoom lens with the first lens group arranged at a side of the object, and wherein the zoom lens is configured such that when zooming from a short focal length end toward a long focal length end, the second lens group lens moves toward the third lens group and the fourth lens group moves toward a side of the third lens group, and the fifth lens group corrects the zooming and a shift in a position of an imaging plane of the zoom lens caused by movement of the second lens group and the fourth lens group, and when a distance from a first lens surface of the zoom lens to the imaging plane of the zoom lens at the long focal length end is $\Sigma d$, a synthesized focal length of the first lens group through the fifth lens group is fw, and a synthesized focal length of the first lens group through the fifth lens group is ft, a following conditional formula is satisfied:

$$1.45 < \Sigma d/(ft - fw) < 2.2.$$

22. The camera apparatus according to claim 21, wherein the zoom lens is configured such that the first lens group is mounted at a fixed position.

23. The camera apparatus according to claim 21, wherein the zoom lens is configured such that the third lens group of the zoom lens is mounted at a fixed position and includes an aperture diaphragm arranged at an outermost position at a side of the second lens group.

24. The camera apparatus according to claim 21, wherein the zoom lens is configured such that focusing of the zoom lens is achieved by movement of the fifth lens group.

25. The camera apparatus according to claim 21, wherein the zoom lens is configured such that when a synthesized focal length of the first lens group is f1 and a synthesized focal length of the first lens group and the second lens group at the long focal length end is f12t, a following conditional formula is satisfied:

$$-1.8 < f12t/f1 < -1.1.$$

26. The camera apparatus according to claim 21,
wherein the zoom lens is configured such that when a distance between the first lens group and the second lens group at the short focal length end is d1w, a distance between the first lens group and the second lens group at the long focal length end is d1t, a distance between the third lens group and the fourth lens group at the short focal length end is d3w, and a distance between the third lens group and the fourth lens group at the long focal length end is d3t, a following conditional formula is satisfied:

$$0.3 < (d3w-d3t)/(d1t-d1w) < 0.8.$$

27. The camera apparatus according to claim 21,
wherein the zoom lens is configured such that each of the first lens group and the second lens group includes three pieces of lens, the fourth lens group includes four pieces of lens, the fifth lens group includes one piece of lens, and each of the second lens group through the fifth lens group includes one or more non-spherical surfaces.

28. The camera apparatus according to claim 21,
wherein the zoom lens is configured such that a diameter of an aperture diaphragm at the long focal length end is greater than a diameter of an aperture diaphragm at the short focal length end.

29. The camera apparatus according to claim 21, further comprising:
a device configured to convert the light of the image of the object received by the light receiving element into digital information.

30. The camera apparatus according to claim 21,
wherein the light receiving element has a number of picture elements equal to or greater than 3 millions.

31. A camera apparatus comprising:
a photographing zoom optical system imaging an image of an object; and
a light receiving element receiving a light of the image of the object imaged by the photographing zoom optical system,
wherein the photographing zoom optical system includes a zoom lens having
a first lens group having a positive refracting power;
a second lens group having a negative refracting power;
a third lens group having a positive refracting power;
a fourth lens group having a positive refracting power; and
a fifth lens group having a positive refracting power,
wherein the first lens group, the second group lens, the third lens group, the fourth lens group, and the fifth lens group are arranged in succession,
wherein the zooms lens is configured to serve as a photographing zoom lens with the first lens group arranged at a side of the object, and
wherein the zoom lens is configured such that when zooming from a short focal length end toward a long focal length end, at least a distance between the first lens group and the second lens group increases, and a distance between the second lens group and the third lens group and a distance between the third lens group and the fourth lens group decrease, and when a distance from a first lens surface of the zoom lens to an imaging plane of the zoom lens at the long focal length end is Σd, an image height is y', and a zooming ratio is Z, a following conditional formula is satisfied:

$$\Sigma d/(Z \times y') < 3.5.$$

32. The camera apparatus according to claim 31,
wherein the zoom lens is configured such that the first lens group is mounted at a fixed position.

33. The camera apparatus according to claim 31,
wherein the zoom lens is configured such that the third lens group is mounted at a fixed position and includes an aperture diaphragm arranged at an outermost position at a side of the second lens group.

34. The camera apparatus according to claim 31,
wherein the zoom lens is configured such that when a focal length of the second lens group is f2 and a synthesized focal length of the first lens group through the fifth lens group at the short focal length end is fw, a following conditional formula is satisfied:

$$0.68 < -f2/fw < 2.0.$$

35. The camera apparatus according to claim 31,
wherein the zoom lens is configured such that focusing of the zoom lens is achieved by movement of the fifth lens group.

36. The camera apparatus according to claim 31,
wherein the zoom lens is configured such that each of the first lens group and the second lens group includes three pieces of lens, the fourth lens group includes three or four pieces of lens, and the fifth lens group includes one piece of lens.

37. The camera apparatus according to claim 36,
wherein the zoom lens is configured such that each of the first lens group through the third lens group includes one or more non-spherical surfaces.

38. The camera apparatus according to claim 36,
wherein the zoom lens is configured such that the first lens group includes a negative lens and a first positive lens that are joined, and a second positive lens.

39. The camera apparatus according to claim 36,
wherein the zoom lens is configured such that the second lens group includes a first negative lens, and a second negative lens and a positive lens that are joined.

40. The camera apparatus according to claim 31,
wherein the zoom lens is configured such that a diameter of an aperture diaphragm at the long focal length end is greater than a diameter of an aperture diaphragm at the short focal length end.

41. The camera apparatus according to claim 31, further comprising:
a device configured to convert the light of the image of the object received by the light receiving element into digital information.

42. The camera apparatus according to claim 31,
wherein the light receiving element has a number of picture elements equal to or greater than 3 millions.

43. A portable information terminal apparatus comprising:
a camera apparatus configured to photograph an image of an object; and
a communication interface configured to transmit via communication information of the image of the object photographed by the camera apparatus, wherein the camera apparatus includes a photographing zoom optical system imaging the image of the object, and a light receiving element receiving a light of the image of the object imaged by the photographing zoom optical system, wherein the photographing zoom optical system includes a zoom lens having a first lens group having a positive refracting power;

a second lens group having a negative refracting power;

a third lens group having a positive refracting power;

a fourth lens group having a positive refracting power; and a fifth lens group having a positive refracting power, wherein the first lens group, the second group lens, the third lens group, the fourth lens group, and the fifth lens group are arranged in succession, wherein the zooms lens is configured to serve as a photographing zoom lens with the first lens group arranged at a side of the object, and wherein the zoom lens is configured such that when zooming from a short focal length end toward a long focal length end, the second lens group lens moves toward the third lens group and the fourth lens group moves toward a side of the third lens group, and the fifth lens group corrects the zooming and a shift in a position of an imaging plane of the zoom lens caused by movement of the second lens group and the fourth lens group, and wherein when a distance from a first lens surface of the zoom lens to the imaging plane of the zoom lens at the long focal length end is $\Sigma d$, a synthesized focal length of the first lens group through the fifth lens group is fw, and a synthesized focal length of the first lens group through the fifth lens group is ft, a following conditional formula is satisfied:

$$1.45 < \Sigma d/(ft-fw) < 2.2.$$

44. The portable information terminal apparatus according to claim 43, wherein the zoom lens is configured such that the first lens group is mounted at a fixed position.

45. The portable information terminal apparatus according to claim 43, wherein the zoom lens is configured such that the third lens group of the zoom lens is mounted at a fixed position and includes an aperture diaphragm arranged at an outermost position at a side of the second lens group.

46. The portable information terminal apparatus according to claim 43, wherein the zoom lens is configured such that focusing of the zoom lens is achieved by movement of the fifth lens group.

47. The portable information terminal apparatus according to claim 43, wherein the zoom lens is configured such that when a synthesized focal length of the first lens group is f1 and a synthesized focal length of the first lens group and the second lens group at the long focal length end is f1 2t, a following conditional formula is satisfied:

$$-1.8 < f12t/f1 < -1.1.$$

48. The portable information terminal apparatus according to claim 43, wherein the zoom lens is configured such that when a distance between the first lens group and the second lens group at the short focal length end is d1w, a distance between the first lens group and the second lens group at the long focal length end is d1t, a distance between the third lens group and the fourth lens group at the short focal length end is d3w, and a distance between the third lens group and the fourth lens group at the long focal length end is d3t, a following conditional formula is satisfied:

$$0.3 < (d3w-d3t)/(d1t-d1w) < 0.8.$$

49. The portable information terminal apparatus according to claim 43, wherein the zoom lens is configured such that each of the first lens group and the second lens group includes three pieces of lens, the fourth lens group includes four pieces of lens, the fifth lens group includes one piece of lens, and each of the second lens group through the fifth lens group includes one or more non-spherical surfaces.

50. The portable information terminal apparatus according to claim 43, wherein the zoom lens is configured such that a diameter of an aperture diaphragm at the long focal length end is greater than a diameter of an aperture diaphragm at the short focal length end.

51. The portable information terminal apparatus according to claim 43, further comprising:

a device configured to convert the light of the image of the object received by the light receiving element into digital information.

52. The portable information terminal apparatus according to claim 43, wherein the light receiving element has a number of picture elements equal to or greater than 3 millions.

53. A portable information terminal apparatus comprising:

a camera apparatus configured to photograph an image of an object; and a communication interface configured to transmit via communication information of the image of the object photographed by the camera apparatus, wherein the camera apparatus includes a photographing zoom optical system imaging the image of the object, and a light receiving element receiving a light of the image of the object imaged by the photographing zoom optical system, wherein the photographing zoom optical system includes a zoom lens having a first lens group having a positive refracting power;

a second lens group having a negative refracting power;

a third lens group having a positive refracting power;

a fourth lens group having a positive refracting power; and a fifth lens group having a positive refracting power, wherein the first lens group, the second group lens, the third lens group, the fourth lens group, and the fifth lens group are arranged in succession, wherein the zooms lens is configured to serve as a photographing zoom lens with the first lens group arranged at a side of the object, and wherein the zoom lens is configured such that when zooming from a short focal length end toward a long focal length end, at least a distance between the first lens group and the second lens group increases, and a distance between the second lens group and the third lens group and a distance between the third lens group and the fourth lens group decrease, and when a distance from a first lens surface of the zoom lens to an imaging plane of the zoom lens at the long focal length end is Σd, an image height is y', and a zooming ratio is Z, a following conditional formula is satisfied:

$$\Sigma d/(Z \times y') < 3.5.$$

54. The portable information terminal apparatus according to claim 53,
wherein the zoom lens is configured such that the first lens group is mounted at a fixed position.

55. The portable information terminal apparatus according to claim 53,
wherein the zoom lens is configured such that the third lens group is mounted at a fixed position and includes an aperture diaphragm arranged at a most outside position at a side of the second lens group.

56. The portable information terminal apparatus according to claim 53,
wherein the zoom lens is configured such that when a focal length of the second lens group is f2 and a synthesized focal length of the first lens group through the fifth lens group at the short focal length end is fw, a following conditional formula is satisfied:

$$0.68 < -f2/fw < 2.0.$$

57. The portable information terminal apparatus according to claim 53,
wherein the zoom lens is configured such that focusing of the zoom lens is achieved by movement of the fifth lens group.

58. The portable information terminal apparatus according to claim 53,
wherein the zoom lens is configured such that each of the first lens group and the second lens group includes three pieces of lens, the fourth lens group includes three or four pieces of lens, and the fifth lens group includes one piece of lens.

59. The portable information terminal apparatus according to claim 58,
wherein the zoom lens is configured such that each of the first lens group through the third lens group includes one or more non-spherical surfaces.

60. The portable information terminal apparatus according to claim 58,
wherein the zoom lens is configured such that the first lens group includes a negative lens and a first positive lens that are joined, and a second positive lens.

61. The portable information terminal apparatus according to claim 58,
wherein the zoom lens is configured such that the second lens group includes a first negative lens, and a second negative lens and a positive lens that are joined.

62. The portable information terminal apparatus according to claim 53,
wherein the zoom lens is configured such that a diameter of an aperture diaphragm at the long focal length end is greater than a diameter of an aperture diaphragm at the short focal length end.

63. The portable information terminal apparatus according to claim 53, further comprising:
a device configured to convert the light of the image of the object received by the light receiving element into digital information.

64. The portable information terminal apparatus according to claim 53,
wherein the light receiving element has a number of picture elements equal to or greater than 3 millions.

65. A portable information terminal apparatus comprising:
means for photographing an image of an object; and
means for transmitting via communication information of the image of the object photographed by the photographing means,
wherein the photographing means includes a photographing zoom optical system imaging the image of the object, and a light receiving element receiving a light of the image of the object imaged by the photographing zoom optical system,
wherein the photographing zoom optical system includes a zoom lens having
a first lens group having a positive refracting power;
a second lens group having a negative refracting power;
a third lens group having a positive refracting power;
a fourth lens group having a positive refracting power; and
a fifth lens group having a positive refracting power,
wherein the first lens group, the second group lens, the third lens group, the fourth lens group, and the fifth lens group are arranged in succession,
wherein the zooms lens is configured to serve as a photographing zoom lens with the first lens group arranged at a side of the object, and
wherein the zoom lens is configured such that when zooming from a short focal length end toward a long focal length end, the second lens group lens moves toward the third lens group and the fourth lens group moves toward a side of the third lens group, and the fifth lens group is configured to correct the zooming and a shift in a position of an imaging plane of the zoom lens caused by movement of the second lens group and the fourth lens group, and
wherein when a distance from a first lens surface of the zoom lens to the imaging plane of the zoom lens at the long focal length end is Σd, a synthesized focal length of the first lens group through the fifth lens group is fw, and a synthesized focal length of the first lens group through the fifth lens group is ft, a following conditional formula is satisfied:

$$1.45 < \rho d/(ft-fw) < 2.2.$$

66. A portable information terminal apparatus comprising:
means for photographing an image of an object; and
means for transmit via communication information of the image of the object photographed by the photographing means,
wherein the photographing means includes a photographing zoom optical system imaging the image of the object, and a light receiving element receiving a light of the image of the object imaged by the photographing zoom optical system,
wherein the photographing zoom optical system includes a zoom lens having
a first lens group having a positive refracting power;
a second lens group having a negative refracting power;

a third lens group having a positive refracting power;
a fourth lens group having a positive refracting power; and
a fifth lens group having a positive refracting power,
wherein the first lens group, the second group lens, the third lens group, the fourth lens group, and the fifth lens group are arranged in succession,
wherein the zooms lens is configured to serve as a photographing zoom lens with the first lens group arranged at a side of the object, and
wherein the zoom lens is configured such that when zooming from a short focal length end toward a long focal length end, at least a distance between the first lens group and the second lens group increases, and a distance between the second lens group and the third lens group and a distance between the third lens group and the fourth lens group decrease, and when a distance from a first lens surface of the zoom lens to an imaging plane of the zoom lens at the long focal length end is $\Sigma d$, an image height is $y'$, and a zooming ratio is Z, a following conditional formula is satisfied: $\Sigma d/(Z \times y') < 3.5$.

* * * * *